US007739618B2

(12) United States Patent
Iriya et al.

(10) Patent No.: US 7,739,618 B2
(45) Date of Patent: Jun. 15, 2010

(54) INFORMATION PROCESSING APPARATUS AND INFORMATION PROCESSING METHOD

(75) Inventors: Shinichi Iriya, Kanagawa (JP); Tetsuya Kohno, Kanagawa (JP); Takatoshi Nakamura, Ibaraki (JP); Junichiro Sakata, Tokyo (JP)

(73) Assignee: Sony Corporation, Tokyo (JP)

( * ) Notice: Subject to any disclaimer, the term of this patent is extended or adjusted under 35 U.S.C. 154(b) by 1513 days.

(21) Appl. No.: 10/451,625

(22) PCT Filed: Nov. 8, 2002

(86) PCT No.: PCT/JP02/11640

§ 371 (c)(1),
(2), (4) Date: Dec. 19, 2003

(87) PCT Pub. No.: WO03/040958

PCT Pub. Date: May 15, 2003

(65) Prior Publication Data

US 2004/0107268 A1 Jun. 3, 2004

(30) Foreign Application Priority Data

Nov. 9, 2001 (JP) ............................ P2001-344395

(51) Int. Cl.
*G06F 3/048* (2006.01)
*G06F 3/00* (2006.01)
*G11B 21/08* (2006.01)
(52) U.S. Cl. .................. 715/792; 369/30.6; 369/30.8; 369/30.9; 715/716
(58) Field of Classification Search ................. 715/716, 715/792, 810; 369/24, 27, 30
See application file for complete search history.

(56) References Cited

U.S. PATENT DOCUMENTS 6,118,450 A * 9/2000 Proehl et al. ................. 715/810
6,248,946 B1 6/2001 Dwek (Continued)

FOREIGN PATENT DOCUMENTS

JP 2001-52009 2/2001

(Continued)

OTHER PUBLICATIONS iPod (orginal) user's guide, posted: Oct. 21, 2002.*

(Continued)

*Primary Examiner*—Kieu Vu
*Assistant Examiner*—Haoshian Shih
(74) *Attorney, Agent, or Firm*—Oblon, Spivak, McClelland, Maier & Neustadt, L.L.P.

(57) ABSTRACT

An information processing apparatus having an input configured to receive a first operation and a second operation input by a user, a playback unit configured to obtain predetermined data and play back the data based on the operation input by the user from the input; and a display control unit configured to control, in correspondence with a virtual hierarchical structure for classifying the predetermined data, a display of a display screen indicating each hierarchy level, and for controlling a display of a predetermined mark in the display screen. The display control unit also controls the display of the predetermined mark corresponding to the predetermined data which is played back by the playback unit in a manner different from other non-selected marks while the predetermined mark is being selected.

16 Claims, 38 Drawing Sheets

U.S. PATENT DOCUMENTS

| | | | |
|---|---|---|---|
| 6,587,403 B1 * | 7/2003 | Keller et al. | 369/30.06 |
| 6,731,312 B2 * | 5/2004 | Robbin | 715/792 |
| 2002/0046315 A1 * | 4/2002 | Miller et al. | 711/1 |
| 2003/0058781 A1 * | 3/2003 | Millikan et al. | 369/272 |
| 2007/0013671 A1 * | 1/2007 | Zadesky et al. | 345/173 |

FOREIGN PATENT DOCUMENTS

| | | |
|---|---|---|
| JP | 2001-54096 | 2/2001 |
| JP | 2001-266470 | 9/2001 |
| WO | WO 00/63766 | 10/2000 |

OTHER PUBLICATIONS

"Apple Presents iPod" http://web.archive.org/web/20011109115712/www.apple.com/pr/library/2001/oct/23ipod.html.*

* cited by examiner

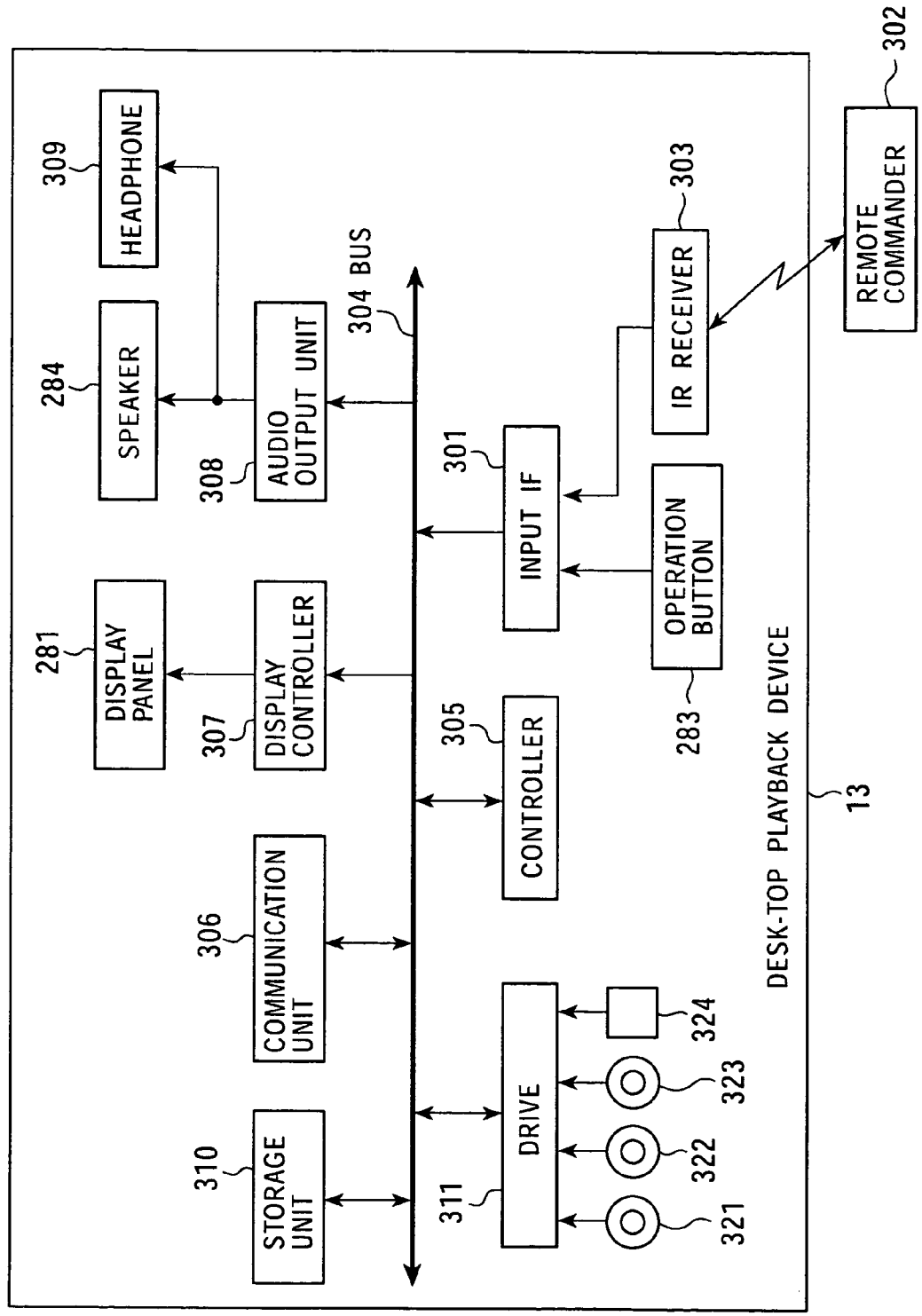

FIG. 24

| MUSIC PIECE ID | ADDRESS | PLAYBACK START POSITION |
|---|---|---|
| ID0001 | x x x x x x x | △△△△△△△△ |
| ID0002 | x x x x x x x | △△△△△△△△ |
| ID0003 | x x x x x x x | △△△△△△△△ |
| ID0004 | x x x x x x x | △△△△△△△△ |
| ID0005 | x x x x x x x | △△△△△△△△ |
| ID0006 | x x x x x x x | △△△△△△△△ |
| ⋮ | ⋮ | ⋮ |

FIG. 25

| | | | |
|---|---|---|---|
| USER A'S FAVORITES | DRIVE | | ID0098<br>ID0076<br>ID0008<br>⋮ |
| | CLASSIC | COMPOSER A | ID0032<br>ID0101<br>⋮ |
| | | COMPOSER B | ID0025<br>ID0119<br>⋮ |
| | | C ORCHESTRA | ID0004<br>ID0111<br>⋮ |
| | | D ORCHESTRA | ID0028<br>ID0100<br>⋮ |
| | | OTHERS | ID0066<br>ID0088<br>⋮ |
| | FAVORITES | | ID0081<br>ID0044<br>ID0098<br>⋮ |
| USER B'S FAVORITES | HAPPY SONGS | | ID0034<br>ID0131<br>ID0044<br>⋮ |
| | MELANCHOLIC SONGS | | ID0081<br>ID0077<br>ID0101<br>⋮ |
| | FAVORITES | | ID0098<br>ID0113<br>ID0111<br>⋮ |
| USER C'S FAVORITES | FAVORITES | | ID0028<br>ID0111<br>ID0034<br>⋮ |
| MORNING SONGS | | | ID0034<br>ID0098<br>ID0003<br>⋮ |
| NIGHT SONGS | | | ID0032<br>ID0081<br>ID0099<br>⋮ |
| EVERYONE'S FAVORITES | | | ID0111<br>ID0131<br>ID0100<br>⋮ |

FIG. 26

| STATION NAME | USER A'S FAVORITES | USER B'S FAVORITES | USER C'S FAVORITES | MORNING SONGS | NIGHT SONGS | EVERYONE'S FAVORITES |
|---|---|---|---|---|---|---|
| 1 | ID0081 FAVORITES | ID0077 MELANCHOLIC SONGS | ID0028 FAVORITES | ID0098 - | ID0064 - | ID0081 - |
| 2 | ID0111 CLASSIC/C... | ID0034 HAPPY SONGS | ID0034 FAVORITES | ID0076 - | ID0099 - | ID0077 - |
| 3 | ID0076 FOR DRIVING | ID0111 FAVORITES | ID0055 FAVORITES | ID0003 - | ID0031 - | ID0098 - |
| 4 | ID0008 FOR DRIVING | ID0044 HAPPY SONGS | ID0111 FAVORITES | ID0009 - | ID0032 - | ID0064 - |
| 5 | ID0088 CLASSIC/OTHERS | ID0098 FAVORITES | ID0044 FAVORITES | ID0034 - | ID0081 - | ID0028 - |
| 6 | ID0044 FAVORITES | ID0113 FAVORITES | | ID0025 - | | ID0131 - |
| 7 | ID0098 FOR DRIVING | ID0044 HAPPY SONGS | | | | ID0099 - |
| 8 | ID0032 CLASSIC/A... | ID0131 HAPPY SONGS | | | | ID0100 - |
| 9 | ID0100 CLASSIC/D... | ID0077 MELANCHOLIC SONGS | | | | ID0034 - |
| 10 | ID0066 CLASSIC/OTHERS | ID0081 MELANCHOLIC SONGS | | | | ID0111 - |
| 11 | ID0025 CLASSIC/COMPOSITION... | ID0122 FAVORITES | | | | ID0076 - |
| 12 | ID0101 CLASSIC/COMPOSITION... | ID0101 HAPPY SONGS | | | | ID0034 - |
| 13 | ID0119 CLASSIC/COMPOSITION... | ID0131 HAPPY SONGS | | | | ID0055 - |
| ... | ... | ... | ... | ... | ... | ... |

INFORMATION PROCESSING APPARATUS AND INFORMATION PROCESSING METHOD

TECHNICAL FIELD

The present invention relates to information processing apparatuses and information processing methods, and in particular, to an information processing apparatus and an information processing method that are suitable for clients to make a request for music data stored in a server and to receive it and play it back.

BACKGROUND ART

Along with an increased storage capacity of personal computers and an improved audio playback technique, the number of users who record music data in personal computers and play it back is increasing.

When many pieces of music data are recorded, they are classified into a plurality of folders, as shown in FIG. 1, according to, for example, the category, the artist, or the album, and a plurality of levels of classification are further provided so as to construct a hierarchical structure. This enables the user to search for a desired piece of music.

If a plurality of pieces of music data are not classified in a hierarchical structure by using folders unlike the example shown in FIG. 1, it is very difficult for the user to select a desired piece from all the pieces of music data. If, for example, the user remembers the file name (such as the name of the song) of a music data file and desires to listen to it, the user can search for the file name. However, if the user does not know the name of a song even if the user remembers the name of a composer, or if the user desires to listen to the performance of a certain orchestra, the user is unable to find the desired piece of music data unless a plurality of pieces of music data are classified in a hierarchical structure, as shown in FIG. 1, that is, a roughly classified folder, i.e., "classic", is further classified into intermediate folders, such as "by composer" and "by orchestra", and folders by composer and folders by orchestra are further provided for the intermediate folders "by composer" and "by orchestra".

When the user has found the desired piece of music data by tracing the hierarchical structure, the user is able to play it back to enjoy it by performing, for example, a click operation on an icon indicating the desired piece of music data.

If the music data is copy-protected, it can be copied to a removable disk, such as a CD-R, within a preset number of copies. The user is able to search a folder structure, such as that shown in FIG. 1, for a desired piece of music data, and copy it to a removable disk so as to enjoy it in a room away from a personal computer.

However, when music data is sorted out in a hierarchical structure shown in FIG. 1, if, for example, the user desires to play back a music piece A, a complicated operation is required, i.e., the "by composer" folder is selected from the "classic" folder, then, a "composer B" folder is opened from the "by composer" folder, and finally, the music piece A is selected.

Also, if the music piece A is performed by "C orchestra", the user is unable to search for the music piece A by using the "by orchestra" folder unless data of the music piece A is contained in the "C orchestra" folder, which is a category different from the "composer B". Accordingly, it is necessary to record the same data in a plurality of folders, thereby wasting a limited storage capacity.

In a complicated hierarchical structure, it is very difficult for the user to know the level of the structure to which a folder currently referred by the user belongs. For example, if the user traces an incorrect level to search for a certain piece of music, it is sometimes necessary to return to the previous level depending on the file system.

When a data file of a certain piece of music is selected and a playback operation is performed after tracing such a complicated hierarchical structure, the music is played back from the beginning. Even if the user listens to only the first portion of music (i.e., the introduction in many pieces of pop music), it is difficult to determine whether the music which is currently played back is the music desired by the user. If the music played back is not the music desired by the user, the user has to trace the complicated hierarchical structure again to search for the desired piece of music.

From another point of view, since music data is precisely classified into folders, the user has to trace the folders in a hierarchical structure to reach the bottommost level in order to play back the music data. That is, it is necessary that the user understands the database structure to a certain degree, and consciously selects a music data file to perform a playback operation. Accordingly, when the user desires to casually listen to music as BGM (BackGround Music), for example, when the user listens to radio broadcasting, the user may feel it is a nuisance to trace a hierarchical structure.

In radio broadcasting, it is possible to listen to a program to one's taste of a broadcast station to one's taste, and it is also possible to find a new piece of music to one's taste while unknown music is on. When the user has to select a piece of music to be played back, even if unknown music data is recorded in a user's personal computer, it is difficult to select only unknown pieces from many pieces of music data.

If the user desires to enjoy music in a room away from the personal computer, it is necessary to copy music data on a removable disk. Then, if a home network is constructed in a household to record music data in a server and to allow a client to play it back, it is difficult for the user to easily perform the operation unless the user understands the configuration of a client-server system to a certain degree and also understands the hierarchical structure of the music data recorded in the server to a certain degree.

DISCLOSURE OF INVENTION

The present invention has been made in view of the above-described background. It is an object of the present invention to allow a user to enjoy music with a simple operation when playing back music data recorded in a server by a client without being aware of a client-server system or being aware of a hierarchical (directories and folders) structure unique to a personal computer.

An information processing apparatus of the present invention includes: input means for receiving a first operation and a second operation input by a user; playback means for obtaining predetermined data to play it back based on the operation input by the user from the input means; and display control means for controlling, in correspondence with a virtual hierarchical structure for classifying the predetermined data, the display of a display screen indicating each hierarchy level, and for controlling the display of a predetermined mark in the display screen. The display control means controls the display of the predetermined mark corresponding to the predetermined data which is played back by the playback means in a manner different from other non-selected marks while the predetermined mark is being selected. When the first operation is input from the input means, the display control means controls the selection of the predetermined mark to be changed, and the playback means plays back the predetermined data corresponding to the newly selected mark. When the second operation is input from the input means, the display control means controls the display of the display screen indicating a different hierarchy level based on the hierarchical structure.

The information processing apparatus may further include: sending means for sending a signal indicating a request to send predetermined data possessed by a different information processing apparatus based on the operation input by the user from the input means; and receiving means for receiving the predetermined data sent from the different information processing apparatus. The playback means may play back the predetermined data received by the receiving means. The display control means may control the display of a display screen indicating each hierarchy level in correspondence with a virtual hierarchical structure for classifying the predetermined data possessed by the different information processing apparatus.

The predetermined mark may be an icon.

The predetermined mark may be a thumbnail of an image corresponding to the predetermined data which is played back by the playback means.

The display control means may control only the selected mark to be displayed and the other marks to be unseen.

The display control means may control the selected mark to be displayed in an enlarged size.

The display control means may control the selected mark to be displayed with an increased level of brightness.

The first operation may be an operation for designating one of top and bottom directions in the display screen, or for designating one of left and right directions in the display screen.

An information processing method of the present invention includes: an input control step of controlling an input of a first operation and a second operation by a user; a playback step of obtaining predetermined data based on the input operation by the user, which is controlled by the processing of the input control step; and a display control step of controlling, in correspondence with a virtual hierarchical structure for classifying the predetermined data, the display of a display screen indicating each hierarchy level, and of controlling the display of a predetermined mark in the display screen. The processing of the display control step controls the display of the predetermined mark corresponding to the predetermined data which is played back by the processing of the playback step in a manner different from other non-selected marks while the predetermined mark is being selected. When the input of the first operation is controlled by the processing of the input control step, the processing of the display control step controls the display of the display screen so that the selection of the predetermined mark is changed, and the processing of the playback step plays back the predetermined data corresponding to the newly selected mark. When the input of the second operation is controlled by the processing of the input control step, the processing of the display control step controls the display of the display screen indicating a different hierarchy level based on the hierarchical structure.

A program of the present invention allows a computer to execute: an input control step of controlling an input of a first operation and a second operation by a user; a playback step of obtaining: predetermined data based on the input, operation by the user, which is controlled by the processing of the input control step; and a display control step of controlling, in correspondence with a virtual hierarchical structure for classifying the predetermined data, the display of a display screen indicating each hierarchy level, and of controlling the display of a predetermined mark in the display screen. The processing of the display control step controls the display of the predetermined mark corresponding to the predetermined data which is played back by the processing of the playback step in a manner different from other non-selected marks while the predetermined mark is being selected. When the input of the first operation is controlled by the processing of the input control step, the processing of the display control step controls the display of the display screen so that the selection of the predetermined mark is changed, and the processing of the playback step plays back the predetermined data corresponding to the newly selected mark. When the input of the second operation is controlled by the processing of the input control step, the processing of the display control step controls the display of the display screen indicating a different hierarchy level based on the hierarchical structure.

According to the information processing apparatus, the information processing method, and the program of the present invention, a first operation and a second operation are input from the user, and predetermined data is obtained and is played back based on the operation input by the user. In accordance with a virtual hierarchical structure for classifying the predetermined data, a display screen indicating each hierarchy level and a predetermined mark in the display screen are displayed. While a mark corresponding to the predetermined data which is being played back is being selected, it is displayed in a manner different from other non-selected marks. When the input of the first operation is controlled, the selection of the predetermined mark is changed, and the predetermined data corresponding to the newly selected mark is played back. When the input of the second operation is controlled, a display screen indicating a different hierarchy level is displayed based on the hierarchical structure.

BRIEF DESCRIPTION OF THE DRAWINGS

FIG. 16 is a block diagram illustrating the configuration of the desk-top playback device.

FIG. 24 illustrates a music data list recorded in a music database.

FIG. 25 illustrates a link information list recorded in a link information database.

FIG. 26 illustrates a ranking list recorded in a ranking information database.

BEST MODE FOR CARRYING OUT THE INVENTION

Embodiments of the present invention are described below with reference to the drawings.

Figure 1:
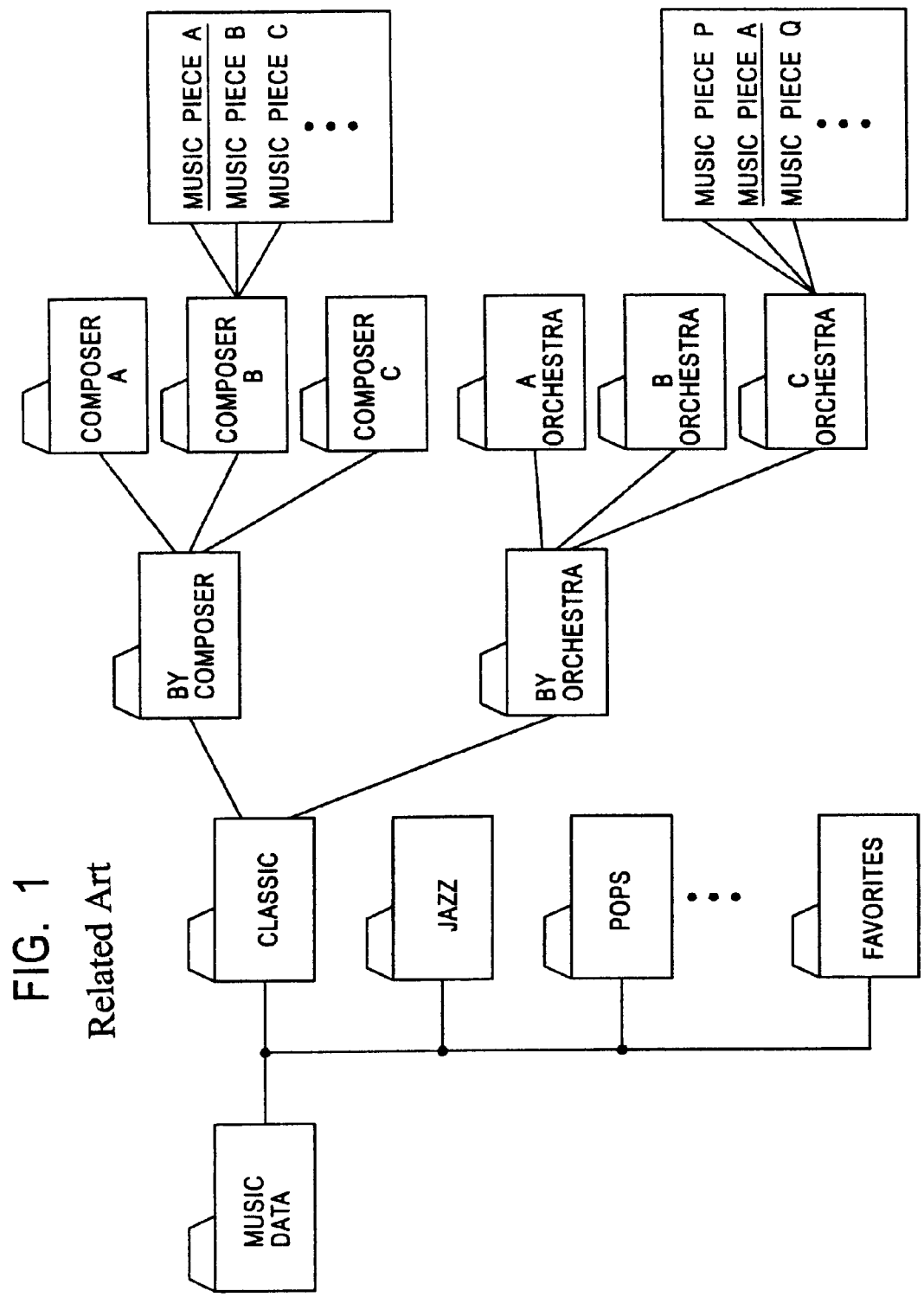
FIG. 1 illustrates a known recording method for music data.
Figure 2:
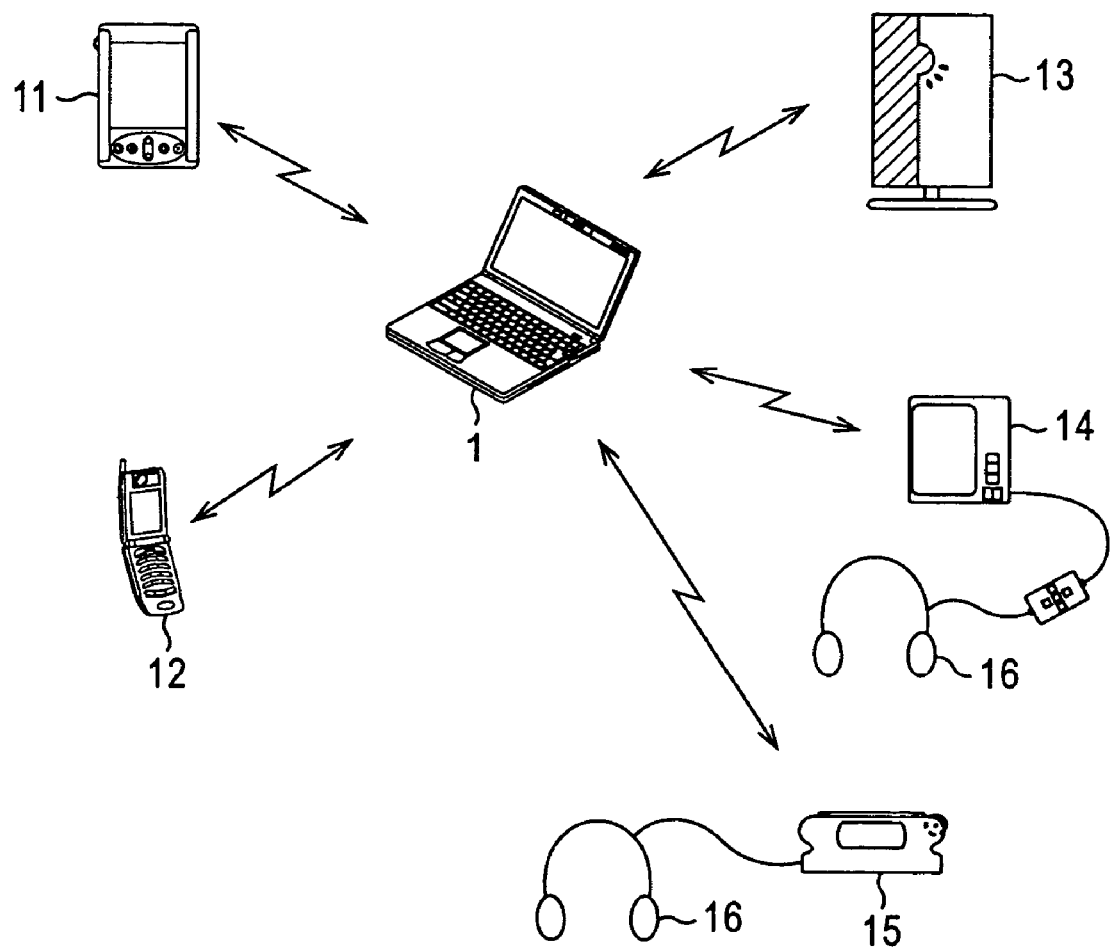
FIG. 2 illustrates an example of a household network.

FIG. 2 illustrates the configuration of a home network to which the present invention is applied.

A personal computer 1 has a plurality of databases for recording music data and information for managing the music data. The personal computer 1 is able to send and receive information to and from a PDA (Personal Digital (Data) Assistants) 11, a cellular telephone 12, a desk-top playback device 13, a portable playback device 14, and a simplified playback device, 15 by performing wireless communication (any method, for example, IEEE (Institute of Electrical and Electronics Engineers) 802.11a, infrared communication, or Bluetooth™ may be used).

The PDA 11, the cellular telephone 12, the desk-top playback device 13, the portable playback device 14, and the simplified playback device 15 make a request to the personal computer 1 for the music data based on a user's operation, and receive and play back the music data sent from the personal computer 1. For example, the PDA 11, the cellular telephone 12, the desk-top playback device 13, the portable playback device 14, and the simplified playback device 15 are possessed by a plurality of users in a household, and the users can receive the music data from the personal computer 1 to enjoy music in a place away from the personal computer 1.

FIGS. 3 through 6 are external views of the personal computer 1.

Figure 3:
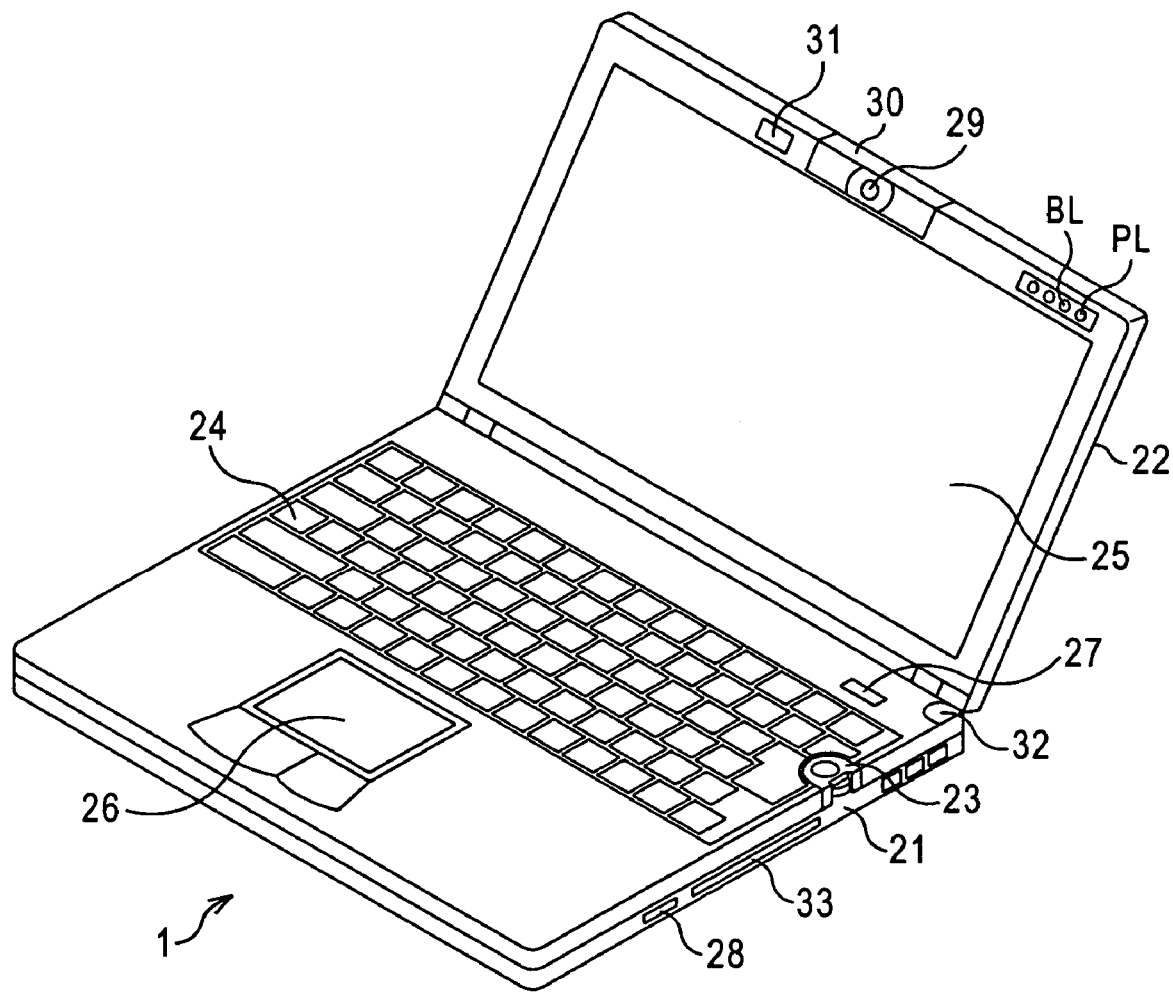
FIG. 3 is an external perspective view of a personal computer shown in FIG. 2.
Figure 4:
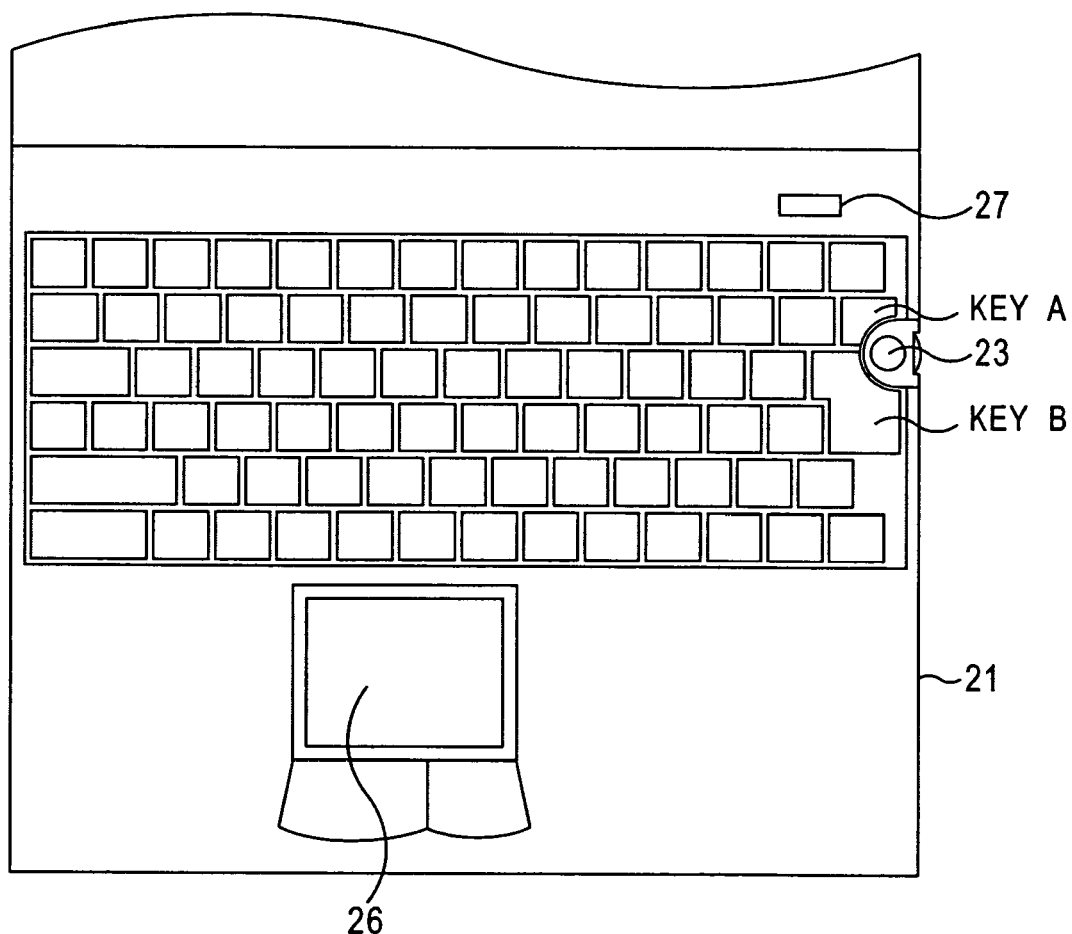
FIG. 4 is a plan view of the main unit of the personal computer shown in FIG. 2.
Figure 5:
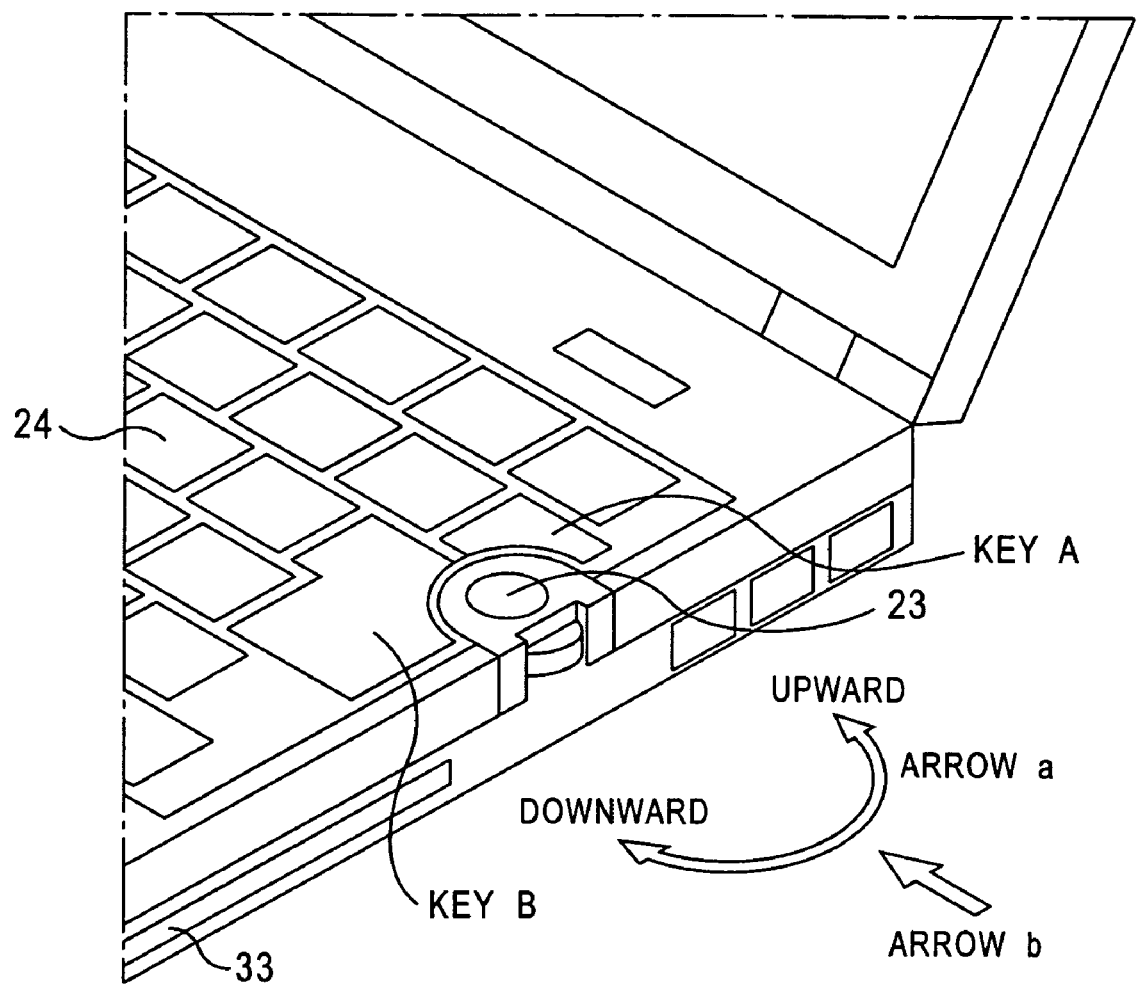
FIG. 5 is an enlarged view illustrating of the portion near a jog dial of the personal computer shown in FIG. 2.
Figure 6:
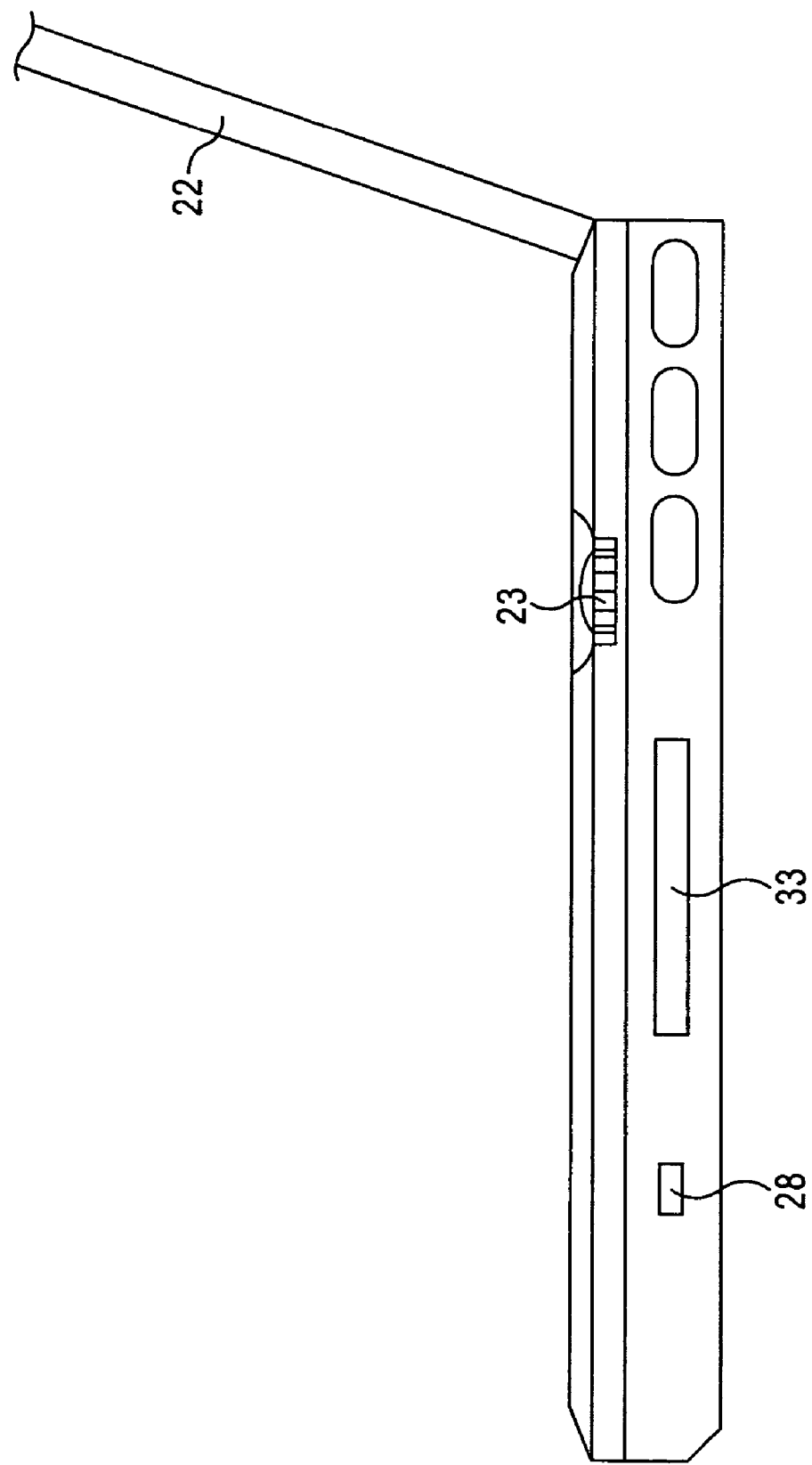
FIG. 6 is a side view illustrating the configuration of the right side of the personal computer shown in FIG. 2.

The personal computer 1 is basically formed of a main unit 21 and a display unit 22, which is pivotable on the main unit 21. FIG. 3 is an external perspective view illustrating the display unit 22 opened from the main unit 21. FIG. 4 is a plan view of the main unit 21. FIG. 5 is an enlarged view illustrating a jog dial 23, which is described below, provided for the main unit 21. FIG. 6 is a side view illustrating the jog dial 23 provided for the main unit 21.

A keyboard 24, which is operated when various characters and symbols are input, a touch pad 26, which serves as a pointing device to be operated for moving a pointer (mouse cursor) displayed on an LCD 25, and a power switch 27 are disposed on the top surface of the main unit 21. The jog dial 23 and an IEEE1394 port 28 are disposed on a side surface of the main unit 21. Instead of the touch pad 26, a stick pointing device may be provided.

The LCD (Liquid Crystal Display) 25 is provided on the front surface of the display unit 22, and a power lamp PL, a battery lamp BL, a message lamp ML (not shown), and other LEDs are disposed at the top right of the display unit 22. The message lamp ML and the other LEDs are provided if necessary. Moreover, an image capturing unit 30 provided with a CCD video camera 29 having CCDs (charge coupled devices), and a microphone 31 are disposed at the top center of the display unit 22. A shutter button 32 for operating the CCD video camera 29 is provided at the top right of the main unit 21 shown in FIG. 3.

The image capturing unit 30 is rotatably fixed at the display unit 22. For example, by a user's operation, the image capturing unit 30 can be rotated from a position at which the CCD video camera 29 is able to capture an image of the user operating the personal computer 1 to a position at which the CCD video camera 29 is able to capture images in the same direction as the viewpoint of the user operating the personal computer 1.

The jog dial 23 is fixed between a key A and a key B disposed at the right side of the keyboard 24 in FIG. 4 on the main unit 21 such that the top surface of the jog dial 23 is almost flush with the key A and the key B. The jog dial 23 performs predetermined processing (for example, scrolling the screen) in response to a rotating operation of the dial 23 indicated by the arrow a in FIG. 5, and performs predetermined processing (for example, setting the selection of the icon) in response to a shifting operation of the jog dial 23 indicated by the arrow b in FIG. 5.

The IEEE1394 port 28 has a structure based on the standard defined in IEEE1394, and a cable based on the standard defined in IEEE1394 is connected to the IEEE1394 port 28.

An example of the internal configuration of the personal computer 1 is described below with reference to FIG. 7.

A central processing unit (CPU) 51 is formed of, for example, a Pentium® processor produced by Intel Corporation, and is connected to a host bus 52. A bridge 53 (so-called "north bridge") is also connected to the host bus 52. The bridge 53 has an AGP (Accelerated Graphics Port) 50, and is also connected to a PCI (Peripheral Component Interconnect/Interface) bus 56.

The bridge 53 is formed of, for example, 440BX, which is AGP Host Bridge Controller manufactured by Intel Corporation, and controls the CPU 51, a RAM (Random Access Memory) 54 (so-called "main memory"), etc. The bridge 53 also controls a video controller 57 via the AGP 50. The bridge 53 and a bridge (so-called "south bridge (PCI-ISA Bridge)") 58 form a so-called "chip set".

The bridge 53 is also connected to a cache memory 55. The cache memory 55 is formed of a memory, such as an SRAM (Static RAM), which is able to perform a reading or writing operation faster than the RAM 54, and caches (temporarily stores) programs or data used by the CPU 51.

The CPU 51 has a built-in primary cache, which is operated faster than the cache memory 55, and is controlled by the CPU 51.

The RAM 54 is formed of, for example, a DRAM (Dynamic RAM), and stores programs run by the CPU 51 or data required for the operation of the CPU 51. More specifically, the RAM 54 stores, for example, an e-mail program 54A, an auto-pilot program 54B, a jog dial state monitor program 54C, a jog-dial driver 54D, an, operating program (OS) 54E, a communication: program 54F, a web browser 54G, and other application programs 54H (including a server program, which is discussed below), these programs being loaded from an HDD 67 with a predetermined timing.

The e-mail program 54A is a program for sending and receiving messages (e-mail) via a modem 75, a public line network, an Internet service provider, an e-mail server, and the Internet.

The auto-pilot program 54B is a program for sequentially starting a plurality of preset processes (or programs) in a preset order so as to process them.

The jog-dial state monitor program 54C receives from the above-described application programs messages indicating whether the programs are associated with the jog dial 23, and if the programs are associated with the jog dial 23, the jog-dial state monitor program 54C causes the LCD 25 to display the types of operations to be performed by the jog dial 23.

The jog-dial state monitor program 54C also detects an event of the jog dial 23 (for example, the rotation of the jog dial 23 in the direction indicated by the arrow a in FIG. 5 or the pressing of the jog dial 23 in the direction indicated by the arrow b in FIG. 5), and performs processing according to the detected event. The jog-dial driver 54D implements various functions in accordance with the operations of the jog dial 23.

The OS (Operating System) 54E is a program for controlling the basic operation of the computer, for example, Windows® 95 or Windows® 98 by Microsoft Corporation, or Mac® OS by Apple Computer, Inc.

The communication program 54F performs processing for peer-to-peer communication, and, in order to establish peer-to-peer communication connection, the communication program 54F also controls the e-mail program 54A to send e-mail having the attached IP address of the personal computer 1 to a communicating party, and to obtain the IP address of predetermined e-mail sent from a communicating party.

The communication program 54F controls the web browser 54G to perform communication based on the function of the web browser 54G.

The web browser 54G views the data of a predetermined web page (displays the data on the display unit 22) under the control of the communication program 54F.

The application programs 54H are formed of various application programs, such as a server program, which is described below.

The video controller 57, which is connected to the bridge 53 via the AGP 50, receives data (such as image data or text data), supplied from the CPU 51 via the AGP 50 and the bridge 53, generates image data corresponding to the received data, and stores the generated image data, or the received data in 'a built-in video memory'. The video controller 57 causes the LCD 25 of the display unit 22 to display an image corresponding to the image data stored in the video memory.

The video controller 57 also supplies the video data from the CCD video camera 29 to the RAM 54 via the PCI bus 56.

A sound controller 64 is connected to the PCI bus 56.

The sound controller 64 receives sound from the microphone 31, generates data corresponding to the sound, and outputs the data to the RAM 54. The sound controller 64 drives a speaker 65 to output the sound.

The modem 75 is also connected to the PCI bus 56. The modem 75 is connected to a public line network, and performs communication processing via the public line network or the Internet.

A PC-card slot interface 111, which is connected to the PCI bus 56, supplies data from an interface card 112 installed in a slot 33 to the CPU 51 or the RAM 54, and also outputs data from the CPU 51 to the interface card 112. A drive 113 and a wireless communication module 114 are connected to the interface card 112.

The drive 113 is connected to the PCI bus 56 via the PC-card slot interface 111 and the interface card 112. The drive 113 reads data recorded in a magnetic disk 121, an optical disc 122, a magneto-optical disk 123, or a semiconductor memory 124 (including a Memory Stick® 131, which is described below with reference to FIG. 8) loaded in the drive 113, and supplies the read data to the RAM 54 via the interface card 112, the PC-card slot interface 111, and the PCI bus 56. The drive 113 is also able to store data generated by the processing of the CPU 51 (for example, audio data generated by the processing, which is described below) in the magnetic disk 121, the optical disc 122, the magneto-optical disk 123, or the semiconductor memory 124 (memory stick 131) loaded in the drive 113.

A memory stick slot may be separately provided, and the memory stick 131 may be connected without the interface card 112 or the drive 113.

The wireless communication module 114 is a module for wirelessly communicating with the PDA 11, the cellular telephone 12, the desk-top playback device 13, the portable playback device 14, and the simplified playback device 15, which have been described with reference to FIG. 2, based on the standard of, for example, IEEE802.11a. The wireless communication module 114 is connected to the PCI bus 56 via the PC-card slot interface 111 and the interface card 112.

If the wireless communication module 114 is connectable to a USB port 107 or the IEEE1394 port 28, it may wirelessly communicate with the PDA 11, the cellular telephone 12, the desk-top playback device 13, the portable playback device 14, and the simplified playback device 15, which have been described with reference to FIG. 2.

The bridge 58 (so-called "south bridge") is also connected to the PCI bus 56. The bridge 58 is formed of, for example, PIIX4E by Intel Corporation, and has a built-in IDE (Integrated Drive Electronics) controller/configuration register 59, an IDE interface 61, and a USB interface 68. The bridge 58 controls various I/O (Input/Output) devices, such as devices connected to an IDE bus 62, and devices connected via an ISA/EIO (Industry Standard Architecture/Extended Input Output) bus 63 or an I/O interface 69.

The IDE controller/configuration register 59 is formed of two IDE controllers, i.e., a so-called "primary IDE controller" and a so-called "secondary IDE controller", and a configuration register (neither of them is shown).

The HDD 67 is connected to the primary IDE controller via the IDE bus 62. When a so-called "IDE device", such as a CD ROM drive or an HDD (not shown), is connected to another IDE bus, the connected IDE device is electrically connected to the secondary IDE controller.

The HDD 67 records therein an e-mail program 67A, an auto-pilot program 67B, a jog-dial state monitor program 67C, a jog-dial driver 67D, an OS 117E, a communication program. 67F, a web browser 67G, and other application programs 67H (including a server program, which is described below).

The e-mail program 67A, the auto-pilot program 67B, the jog-dial state monitor program 67C, the jog-dial driver 67D, the OS 67E, the communication program 67F, the web browser 67G, and the other application programs 67H recorded in the HDD 67 are loaded in the RAM 54.

The I/O interface 69 is also connected to the ISA/EIO bus 63. The I/O interface 69 is formed of an embedded controller, in which a ROM 70, a RAM 71, and a CPU 72 are interconnected to each other.

The ROM 70 stores an IEEE1394 interface program 70A, an LED control program 70B, a touch-pad input monitor program 70C, a key-input monitor program 70D, a wake-up program 70E, and a jog-dial state monitor program 70F.

The IEEE1394 interface program 70A sends and receives data (data stored in a packet) compliant with the IEEE1394 standard. The LED control program 70B controls the power lamp PL, the battery lamp BL, the message lamp ML, and other LEDs to be turned ON or OFF, the message lamp ML and other LEDs being provided if necessary. The touch-pad input monitor program 70C is a program for monitoring an input from the touch pad 26 in response to a user's operation.

The key-input monitor program 70D is a program for monitoring an input from the keyboard 24 or another key switch. The wake-up program 70E is a program for checking whether a preset time is reached based on current time data supplied from a timer circuit (not shown) of the bridge 58, and when the preset time is reached, the wake-up program 70E controls the power source of each chip forming the personal computer 1 so as to start predetermined processing (or program). The jog-dial state monitor program 70F is a program for constantly monitoring whether a rotation encoder of the jog dial 23 is rotated or whether the jog dial 23 is pressed.

A BIOS (Basic Input/Output System) 70G is also written in the ROM 70. The BIOS 70G controls the delivering (input/output) of data between the OS or an application program and peripheral devices (touch pad 26, keyboard 24, or HDD 67).

The RAM 71 contains an LED control register, a touch-pad input status register, a key-input status register, a time setting register, a jog-dial state monitor. I/O register, an IEEE1394 I/F register, etc. as registers 71A through 71F. For example, when the jog dial 23 is pressed to start the e-mail program 54A, a predetermined value is stored in the LED control register, and the switching of the message lamp ML is controlled in accordance with the stored value. When the jog dial 23 is pressed, a predetermined operation key flag is stored in the key-input status register. A predetermined time is set in the time setting register in response to the operation performed on the keyboard 24 by the user.

The I/O interface 69 is connected to the jog dial 23, the touch pad 26, the keyboard 24, the IEEE1394 port 28, and the shutter button 32 via a connector (not shown), and outputs a signal corresponding to the operation on the jog dial 23, the touch pad 26, the keyboard 24, or the shutter button 32 to the ISA/EIO bus 63. The I/O interface 69 also controls the sending and receiving of data with devices connected via the IEEE1394 port 28. The I/O interface 69 is also connected to the power lamp PL, the battery lamp BL, the message lamp ML, a power control circuit 73, and other LEDs.

The power control circuit 73 is connected to a built-in battery 74 or an AC power source, and supplies required power to each block and also controls the recharging of the built-in battery 74 or the second battery of a peripheral device. The I/O interface 69 also monitors the power switch 27 operated when the power is turned ON or OFF.

The I/O interface 69 starts the IEEE1394 interface program 70A, the LED control program 70B, the touch-pad input monitor program 70C, the key-input monitor program 70D, the wake-up program 70E, and the jog-dial state monitor program 70F by a built-in power source even when the power is OFF. That is, these programs are constantly operated.

Accordingly, even when the OS 54E is not run by the CPU 51 since the power switch 27 is OFF, the I/O interface 69 runs the jog-dial state monitor program 70F. Accordingly, when the jog dial 23 is pressed, for example, in a power-saving state or while the power is OFF, the personal computer 1 starts predetermined software processing or script file processing.

Thus, in the personal computer 1, since the jog dial 23 is provided with a programmable power key (PPK) function, a dedicated key is not required.

Although a description has been given above, assuming that the personal computer 1 has the image capturing unit 30, the provision of the image capturing unit 30 is not essential.

The personal computer 1 does not have to be a notebook personal computer, such as that described with reference to FIGS. 3 through 6, and may be a desk-top personal computer.

Figure 8:
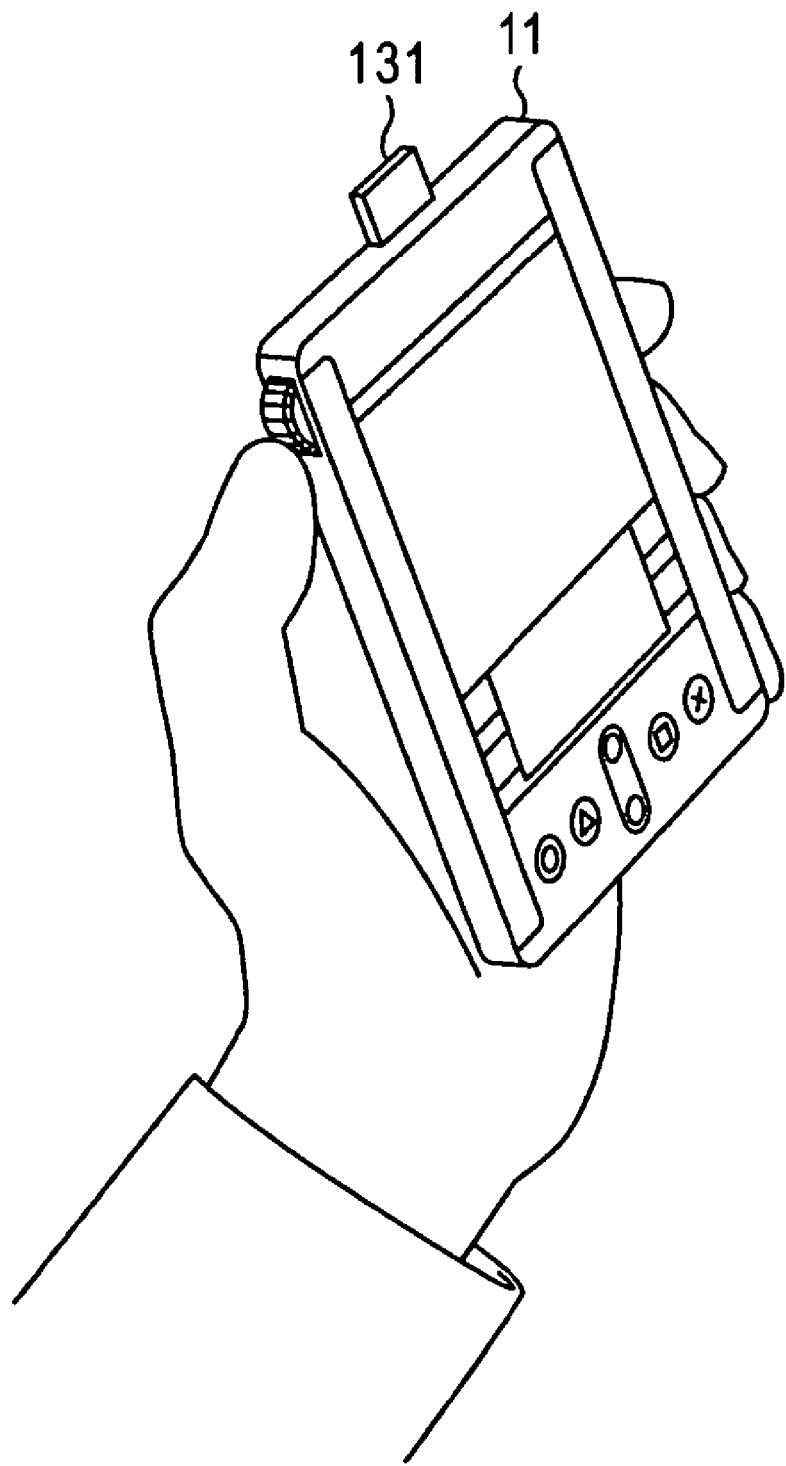
FIG. 8 is an external view of a PDA shown in FIG. 2.
Figure 9:
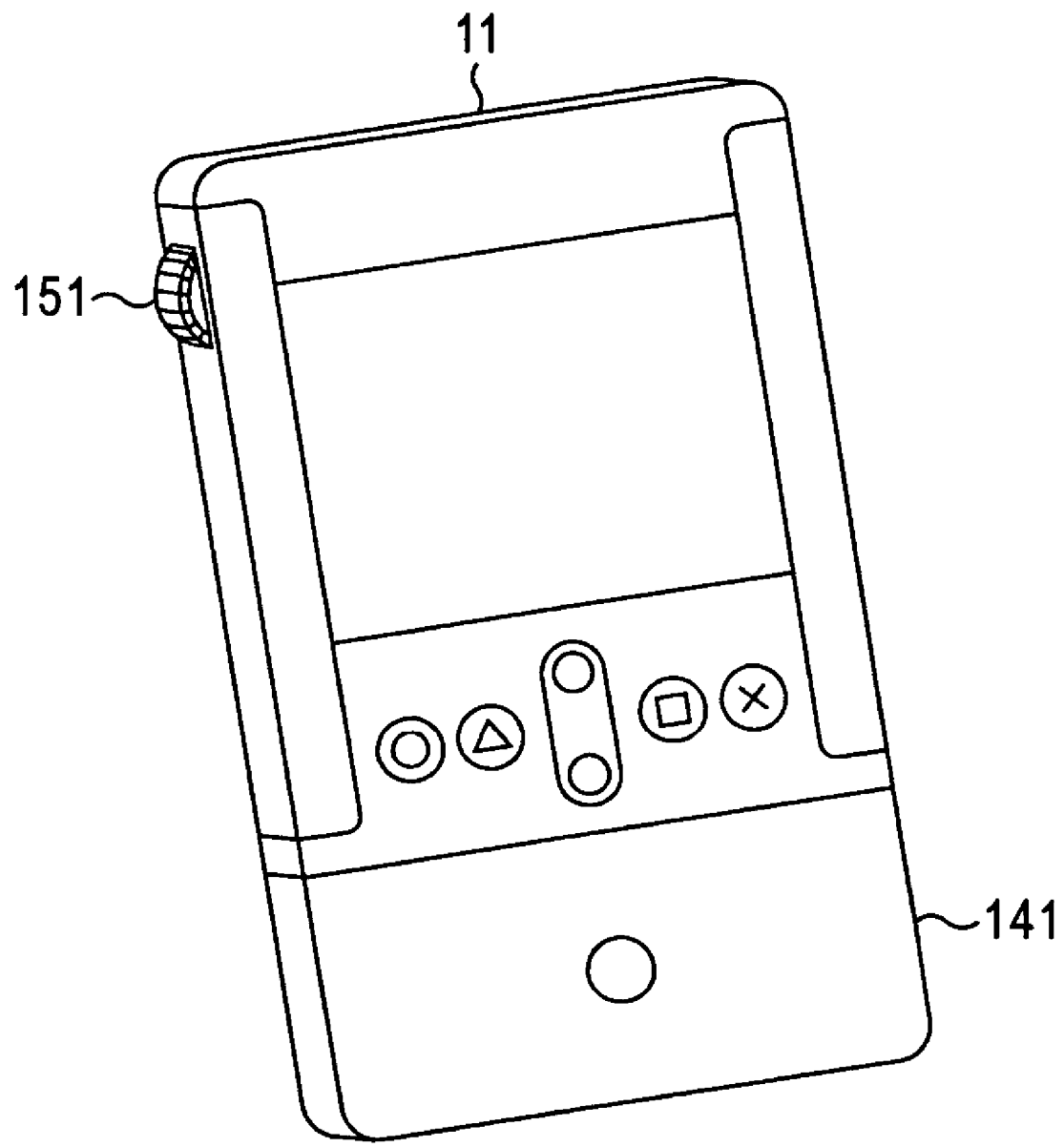
FIG. 9 is an external view of the PDA installed in a cradle.
Figure 10:
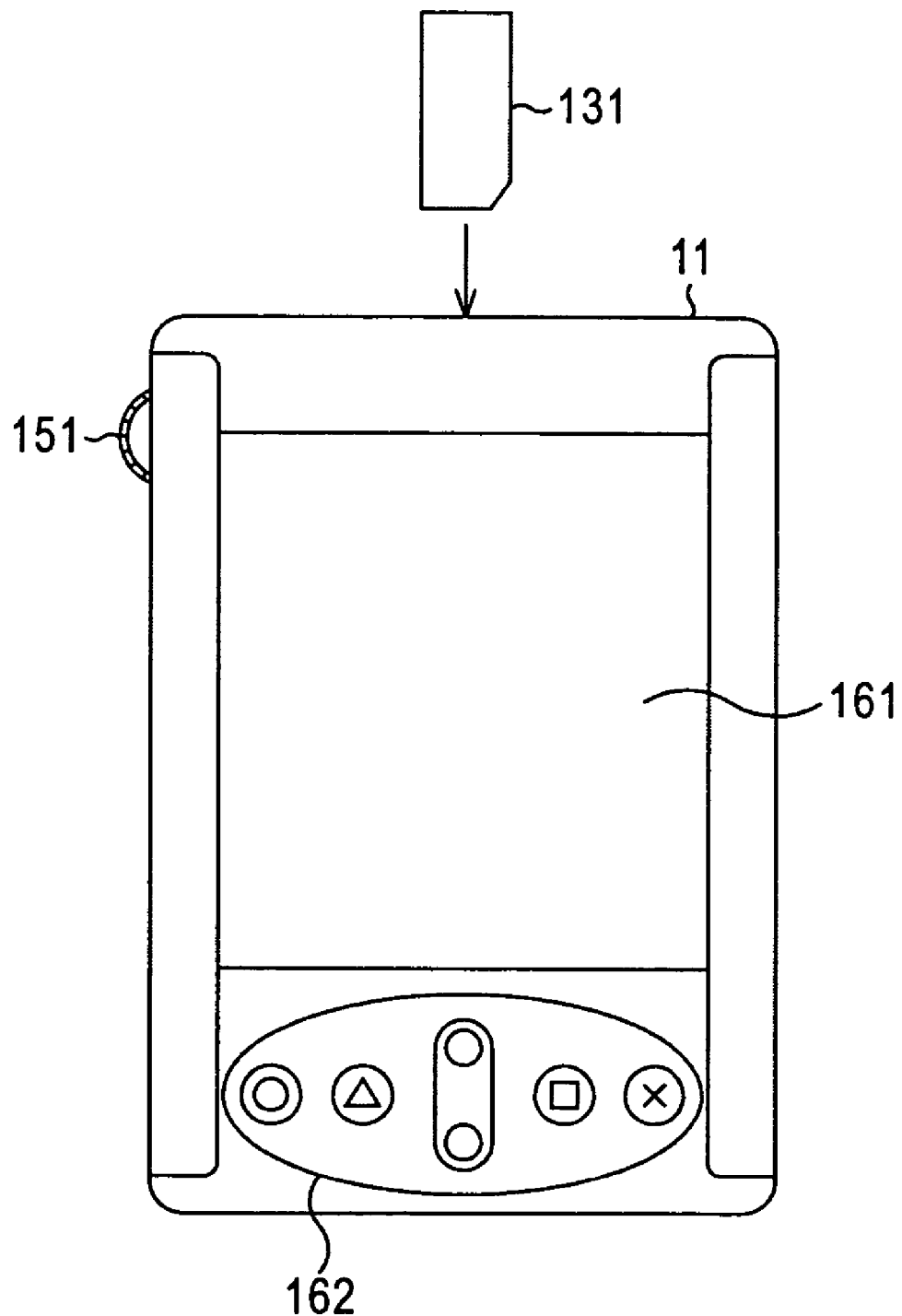
FIG. 10 is an external view of the PDA.

FIGS. 8 through 10 are external views of the PDA 11. FIG. 8 is a perspective view of the PDA 11 which is being held in a hand. FIG. 9 is a perspective view of the PDA 11 installed in a cradle 141. FIG. 10 is a front view of the PDA 11.

The housing of the PDA 11 is formed such that it can be held and operated by one hand. A slot for receiving the memory stick 131 containing a built-in semiconductor memory is provided at the top of the PDA 11.

The memory stick 131 is one type of flash memory card developed by Sony Corporation, which is the assignee of the present application. The memory stick 131 stores therein a non-volatile flash memory device, which is one type of EEPROM (Electrically Erasable and Programmable Read Only Memory), in a 21.5 (width)×50 (length)×2.8 (thickness) [mm] small and thin plastic casing. The memory stick 131 is able to read and write various data, such as images, audio, and music, via 10 pin terminals.

The memory stick 131 employs a unique serial protocol that ensures the compatibility in a device in which the memory stick 131 is used even if the specifications of the built-in flash memory are changed in response to an increased capacity. High-speed performance, such as the maximum writing speed of 1.5 [MB/S] and the maximum reading speed 2.45 [MB/S], is implemented, and high reliability is guaranteed by the provision of an erroneous-erasing preventing switch.

The PDA 11 is connected to the cradle 141, as shown in FIG. 9, so that the bottom surface of the PDA 11 is in contact with the top surface of the cradle 141. A USB (Universal Serial Bus) port (riot shown), which is connected to the cradle 141, is provided on the bottom surface of the PDA 11. The cradle 141 is a docking station for allowing the PDA 11 to send and receive information to and from the personal computer 1 by being connected to the personal computer 1 by wired connection so as to update the data of the PDA 11 and the personal computer 1 (to synchronize data by hot sync).

The PDA 11 is provided with a display unit 161, keys 162, and a jog dial 151.

The display unit 161 is formed of a thin display portion, such as a liquid crystal display device, and displays images, such as icons, thumbnails, and text (for example, a predetermined GUI (Graphic User Interface) for assisting user's operations when a client program, which is described below, is run). A touch pad is provided at the upper portion of the display unit 161. By pressing the touch pad with a finger or a pen, predetermined data or an operation instruction is input into the PDA 11.

The keys 162 are formed of input keys, which are used for selecting an icon or a thumbnail displayed on the display unit 161.

The jog dial 151 is operated for selecting an icon or a thumbnail displayed on the display unit 161 in accordance with a rotation operation of the jog dial 151 or a pressing operation toward the main unit.

The internal configuration of the PDA 11 is described below with reference to FIG. 11.

A CPU (Central Processing Unit) 171 runs an operating system or various programs, such as developed application programs (for example, the client program, which is discussed below) stored in a Flash ROM (Read Only Memory) 173 or an EDO DRAM (Extended Data Out Dynamic Random Access Memory) 174 in synchronization with a clock signal supplied from an oscillator 172.

The Flash ROM 173 is formed of a flash memory, which is one type of EEPROM (Electrically Erasable Programmable Read Only Memory), and basically stores programs used by the CPU 171 and fixed data of computation parameters. The EDO DRAM 174 stores programs used by the CPU 171 and variable parameters used during the execution of the programs.

A memory stick interface 175 reads data from the memory stick 131 loaded in the PDA 11, and also writes data supplied from the PDA 171 to the memory stick 131.

A USB (Universal Serial Bus) interface 176 receives data or programs from a drive 183, which is a USB device connected to the PDA 11, and also supplies data from the CPU 171 to the drive 183 in synchronization with a clock signal supplied from an oscillator 177. The USB interface 176 receives data or programs from the cradle 141, which is a USB device connected to the PDA 11, and also supplies data from the CPU 171 to, the cradle 141 in synchronization with a clock signal supplied from the oscillator 177.

The drive 183 is also connected to the USB interface 176. The drive 183 reads data or a program recorded in a magnetic disk 191, an optical disc 192, a magneto-optical disk 193, or a semiconductor memory 194 loaded in the drive 183, and supplies the data or the program to the CPU 171 or the EDO DRAM 174 via the USB interface 176. The drive 183 also records, data or a program supplied from the CPU 171 to the magnetic disk 191, the optical disc 192, the magneto-optical disk 193, or the semiconductor memory 194 loaded in the drive 183.

The Flash ROM 173, the EDO DRAM 174, the memory stick interface 175, and the USB interface 176 are connected to the CPU 171 via an address bus and a data bus.

The display unit 161 receives data from the CPU 171 via an LCD bus, and displays images or characters corresponding to the received data. The display unit 161 displays a predetermined GUI for assisting the user's operation when the client program, which is discussed below, is run. When the touch pad disposed at the upper portion of the display unit 161 is operated, a touch pad controller 178 receives data (indicating, for example, touched coordinates) corresponding to the operation from the display unit 161, and supplies a signal corresponding to the received data to the CPU 171 via a serial bus.

An EL (Electro Luminescence) driver 179 operates electric-field emitting devices disposed at the rear side of the liquid crystal display of the display unit 161 so as to control the brightness of the display unit 161.

An infrared communication unit 180-1 sends data received from the CPU 171 to another device (for example, a different PDA) via a UART (Universal asynchronous receiver transmitter) by means of an infrared, and also receives data sent from another device by means of an infrared and supplies the data to the CPU 171.

A communication unit 180-2 sends data received from the CPU 171 to another device (for example, the personal computer 1) according to a predetermined communication method, such as IEEE802.11a, infrared communication, or Bluetooth, and also receives data of a predetermined communication method sent from another device and supplies the data to the CPU 171.

That is, the PDA 11 is able to communicate with other devices via the UART by means of an infrared, or by using a different wireless communication method.

The communication unit 180-1 and the communication unit 180-2 are hereinafter simply referred to as the "communication unit 180" unless it is necessary to distinguish them.

An audio playback unit 182 is formed of, for example, a speaker and a decoder circuit for audio data. When prestored audio data, audio data received via the Internet, or the client program, which is discussed below, is started, the audio playback unit 182 decodes music data received from the personal computer 1 and play's it back to output the sound. For example, the audio playback unit 182 plays back audio data supplied from the CPU 171 via a buffer 181, and outputs the sound corresponding to the data.

The keys 162 are formed of, for example, input keys, and are operated by the user when inputting various instructions into the CPU 171.

The jog dial 151 supplies data in accordance with a rotation operation or a pressing operation toward the main unit to the CPU 171.

A power source circuit 186 converts the voltage of power supplied from a battery 184 loaded in the power source circuit 186 or an AC (Alternating current) adapter 185 connected to the power source circuit 186, and supplies power to the CPU 171, the oscillator 172, the Flash ROM 173, the EDO DRAM 174, the memory stick interface 175, the USB interface 176, the oscillator 177, the touch pad controller 178, the EL driver 179, the communication unit 180, the buffer 181, and the speaker 182.

Figure 12:
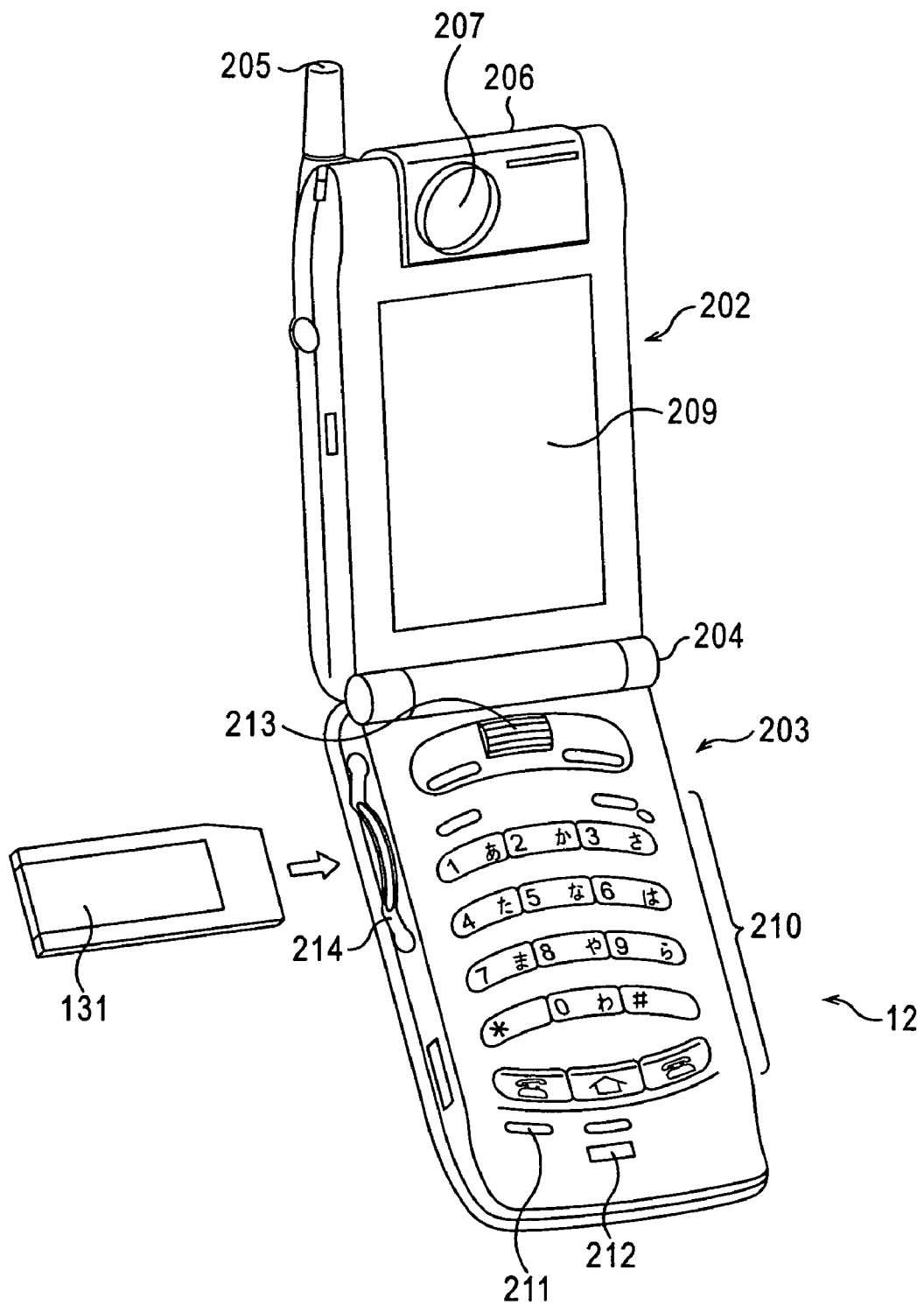
FIG. 12 is an external view of a cellular telephone shown in FIG. 2.

The external configuration of the cellular telephone 12 is now described. The cellular telephone 12 is formed of, as shown in FIG. 12, a display unit 202 and a main unit 203, which are foldable by a hinge 204 disposed at the center of the cellular telephone 12.

The display unit 202 includes a transceiver antenna 205, disposed at the upper left of the display unit 202, which can be pulled and pushed from and into the display unit 202. The cellular telephone 12 sends and receives radio waves via the antenna 205 to and from one of the base stations, which are fixed wireless stations.

A liquid crystal display 209 is provided on the front surface of the display unit 202. The liquid crystal display 209 displays the radio reception state, the remaining amount of battery, the names and telephone numbers of communicating parties, which are registered in a telephone directory, the transmission log, e-mail messages, simplified homepages, images captured by a CCD camera 207 of a camera unit 206, which are discussed below, and predetermined GUIs for assisting the user's operation when the client program, which is discussed below, is started.

The main unit 203 is provided with operation keys 210, such as numeric keys from "0." to "9", a calling key, a redial key, a hang-up/power key, a clear key, and an e-mail key, on the surface of the main unit 203. Various instructions in accordance with the operations on the operation keys 210, are input into the cellular telephone 120

A memo button 211 and a microphone 212 are provided below the operation keys 210 of the main unit 203. When the memo button 211 is operated, the cellular telephone 12 records the voice of a communicating party. The cellular telephone 12 collects user's voice by using the microphone 212.

A rotatable jog dial 213 is disposed above the operation keys 210 of the main unit 203 such that it slightly projects from the surface of the main unit 203. In accordance with the rotation operation of the jog dial 213, the cellular telephone 12 performs various operations, such as scrolling a telephone directory list or an e-mail message displayed on the liquid crystal display 209, page changing of homepages, or moving the cursor line on the GUI screen displayed when the client program, which is discussed below, is started.

For example, the main unit 203 selects a desired telephone number from a plurality of telephone numbers of a telephone directory list displayed on the liquid crystal display 209 in accordance with the rotation operation of the jog dial 213 by the user, and when the jog dial 213 is pressed toward the main unit 203, the main unit 203 sets the selected telephone number and automatically calls the set telephone number.

A battery pack (not shown) is attached to the rear side of the main unit 203, and when the hang-up/power key is turned ON, power is supplied to the circuits from the battery pack so that the cellular telephone 12 becomes operable.

A memory stick slot 214 into and from which the memory stick 131 can be inserted and removed is provided at the top left surface of the main unit 203. When the memo button 211 is pressed, the cellular telephone 212 records the voice of a communicating party in the memory stick 131. The cellular telephone 12 also records an e-mail message or a simplified homepage in the memory stick 131 according to the user's operation.

The display unit 202 may also be provided with the camera unit 206 that is rotatable within the angle of almost 180 degrees at the top center of the display unit 202 (the provision of the camera unit 206 is not essential). The cellular telephone 12 is able to capture a desired subject by using the CCD camera 207 of the camera unit 206.

Figure 13:
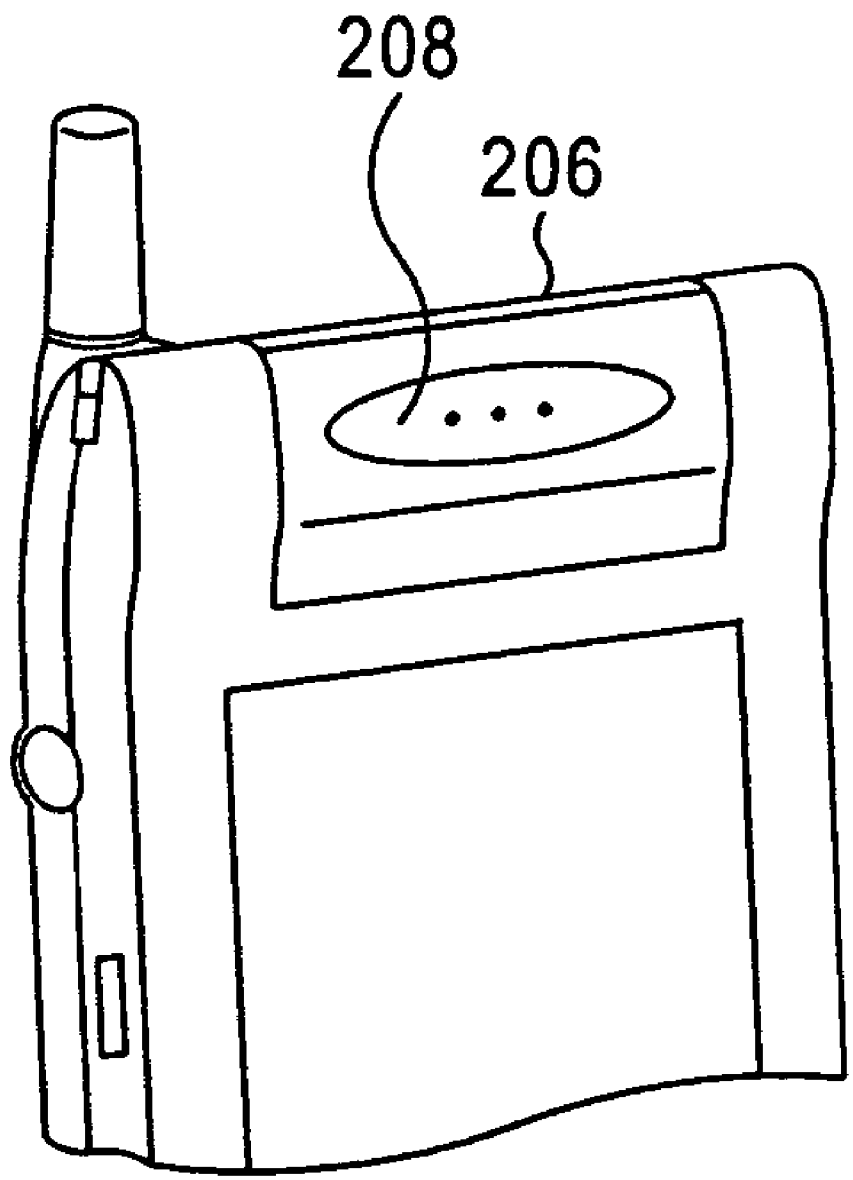
FIG. 13 is an external view of a camera unit of the cellular telephone.

When the camera unit 206 is positioned by being rotated almost by 180 degrees by the user, a speaker 208 disposed at the rear center of the camera unit 206 faces the user, as shown in FIG. 13. Then, the cellular telephone 12 is switched to the normal audio communication mode.

Figure 14:
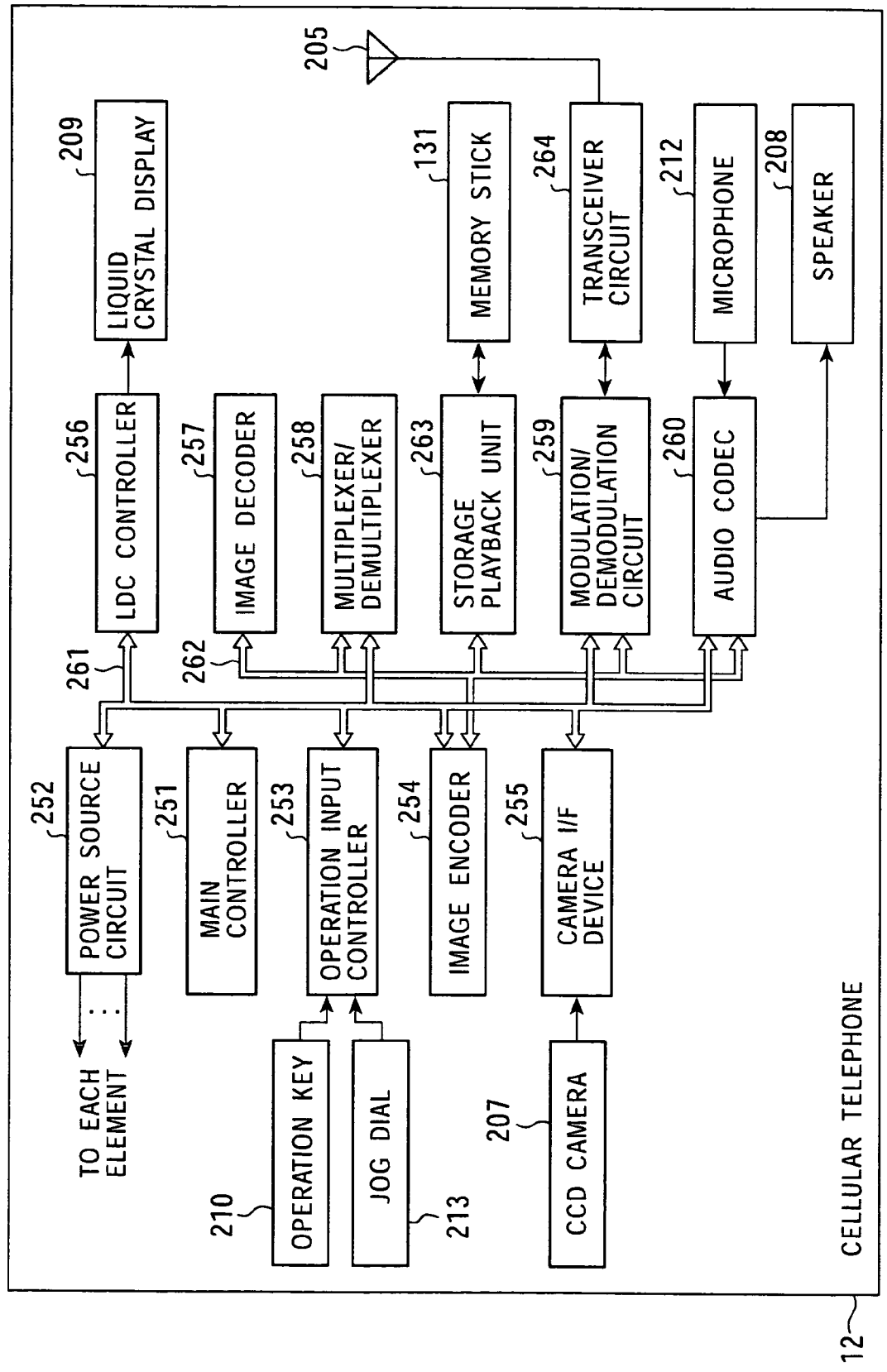
FIG. 14 is a block diagram illustrating the configuration of the cellular telephone.

FIG. 14 is a block diagram illustrating the internal configuration of the cellular telephone 12. A description is given below, assuming that the cellular telephone 12 is provided with the camera unit 206. However, the provision of the camera unit 206 is not essential.

In the cellular telephone 12, as shown in FIG. 14, a main controller 251 for centrally controlling the display unit 202 and the main unit 203 is connected via a main bus 261 to a power source circuit 252, an operation input controller 253, an image encoder 254, a camera I/F (interface) 255, an LCD (Liquid Crystal Display) controller 256, a multiplexer/demultiplexer 258, a modulation/demodulation circuit 259, and an audio codec 260. The main controller 251 is also connected via a synchronous bus 262 to the image encoder 254, an image decoder 257, the multiplexer/demultiplexer 258, a storage playback unit 263, the modulation/demodulation circuit 259, and the audio codec 260.

When the hang-up/power key is turned ON by the user, the power source circuit 252 supplies power to the individual elements from the battery pack so as to start the cellular telephone 12.

In the audio communication mode, under the control of the main controller 251, which is formed of a CPU, a ROM, and a RAM, the cellular telephone 12 converts an audio signal collected by the microphone 212 into digital audio data by using the audio codec 260. After performing spread spectrum on the digital audio data by using the modulation/demodulation circuit 259, and also performing digital-to-analog conversion and frequency conversion on the digital audio data by using a transceiver circuit 264, the cellular telephone 12 transmits the digital audio data via the antenna 205.

In the audio communication mode, the cellular telephone 12 also amplifies a signal received by the antenna 205 in the transceiver circuit 264 so as to perform frequency conversion and analog-to-digital conversion on the received signal. The cellular telephone 12 then performs de-spread spectrum on the digital signal in the modulation/demodulation circuit 259, and converts the digital signal into an analog audio signal in the audio codec 260. The cellular telephone 12 then controls the speaker 208 to output the sound corresponding to the analog audio signal.

When sending e-mail in the data communication mode, the cellular telephone 12 sends e-mail text data input by the operation performed on the operation keys 210 or the jog dial 213, to the main controller 251 via the operation input controller 253.

The main controller 251 performs spread spectrum on the text data by using the modulation/demodulation circuit 259, performs digital-to-analog conversion and frequency conversion on the text data by using the transceiver circuit 264, and then, transmits the text data to a base station via the antenna 205.

When receiving e-mail in the data communication mode, the cellular telephone 12 performs de-spread spectrum on a signal received from a base station via the antenna 205 by using the modulation/demodulation circuit 259 so as to reproduce the original text data, and outputs it to the LCD controller 256. The LCD controller 256 controls the liquid crystal display 209 to display the received e-mail message.

In the cellular telephone 12, it is possible to record data corresponding to received e-mail into the memory stick 131 via the storage playback unit 263 according to the user's operation.

In the cellular telephone 12, when sending image data in the data communication mode, image data captured by the CCD camera 207 is supplied to the image encoder 254 via the camera interface 255.

When image data is not sent, the cellular telephone 12 is able to directly display image data captured by the CCD camera 207 on the liquid crystal display 209 via the camera interface 255 and the LCD controller 256.

The image encoder 254 performs compression-coding on the image data supplied from the CCD camera 207 according to a predetermined coding method, for example, MPEG (Moving Picture Experts Group) 2 or MPEG4, so as to convert the image data into coded image data, and sends it to the multiplexer/demultiplexer 258.

Simultaneously, the cellular telephone 12 sends the sound collected by the microphone 212 while the image was captured by the CCD camera 207 to the multiplexer/demultiplexer 258 via the audio codec 260 as digital audio data.

The multiplexer/demultiplexer 258 multiplexes the coded image data supplied from the image encoder 254 with the audio data supplied from the audio codec 260 according to a predetermined method. The modulation/demodulation circuit 259 then performs spread spectrum on the resulting multiplexed data, and the transceiver circuit 264 performs digital-to-analog conversion and frequency conversion on the multiplexed data. The resulting signal is then transmitted via the antenna 205.

When receiving moving-picture file data linked to, for example, a simplified homepage in the data communication mode, the cellular telephone 12 performs de-spread spectrum on a signal received from a base station via the antenna 205 by using the modulation/demodulation circuit 259, and sends the resulting multiplexed data to the multiplexer/demultiplexer 258.

The multiplexer/demultiplexer 258 demultiplexes the multiplexed data into the coded image data and the audio data, and supplies the coded image data to the image decoder 257 via the synchronous bus 262 and supplies the audio data to the audio codec 260 via the synchronous bus 262.

The image decoder 257 decodes the coded image data into playback moving picture data according to a decoding method corresponding to the coding method, such as MPEG2 or MPEG4. The image decoder 257 then supplies the playback moving picture data to the liquid crystal display 209 via the LCD controller 256, and displays the data on the liquid crystal display 209. Thus, the cellular telephone 12 is able to display, for example, moving picture data contained in a moving picture file linked to a simplified homepage.

Simultaneously, the audio codec 260 converts the audio data into an analog audio signal, and then supplies it to the speaker 208. Thus, the cellular telephone 12 is able to play back, for example, audio data contained in a moving picture file linked to a simplified homepage.

As in the case of e-mail, the cellular telephone 12 is able to record the received data of, for example, a simplified homepage into the memory stick 131 via the storage playback unit 263 according to the user's operation.

The cellular telephone 12 is also able to record various application programs (for example, the client program, which is described below) in the RAM or the ROM of the main controller 251, which is formed of the CPU, the ROM, and the RAM, and executes the programs by using the CPU.

When the client program, which is discussed below, is run by the main controller 251, as in the data communication mode, the modulation/demodulation circuit 259 performs spread spectrum on a request signal sent to the personal computer 1, and the transceiver circuit 264 performs digital-to-analog conversion and frequency conversion on the signal. The resulting signal is then transmitted via the antenna 205. Also, as in the data communication mode, music data sent from the personal computer 1 is received by the antenna 205, and the transceiver circuit 264 amplifies the music data and performs frequency conversion and analog-to-digital conversion on the music data. The modulation/demodulation circuit 259 then performs de-spread spectrum on the music data, and the audio codec 260 converts the music data into an analog audio signal. The sound corresponding to the music data converted into the analog audio signal is then output from the speaker 208.

Alternatively, a communication unit that is able to perform wireless communication according to a predetermined communication method, for example, IEEE802.11a, infrared communication, or Bluetooth, may be provided to perform wireless communication with the personal computer 1 according to a method different from the data communication mode.

Figure 15A:
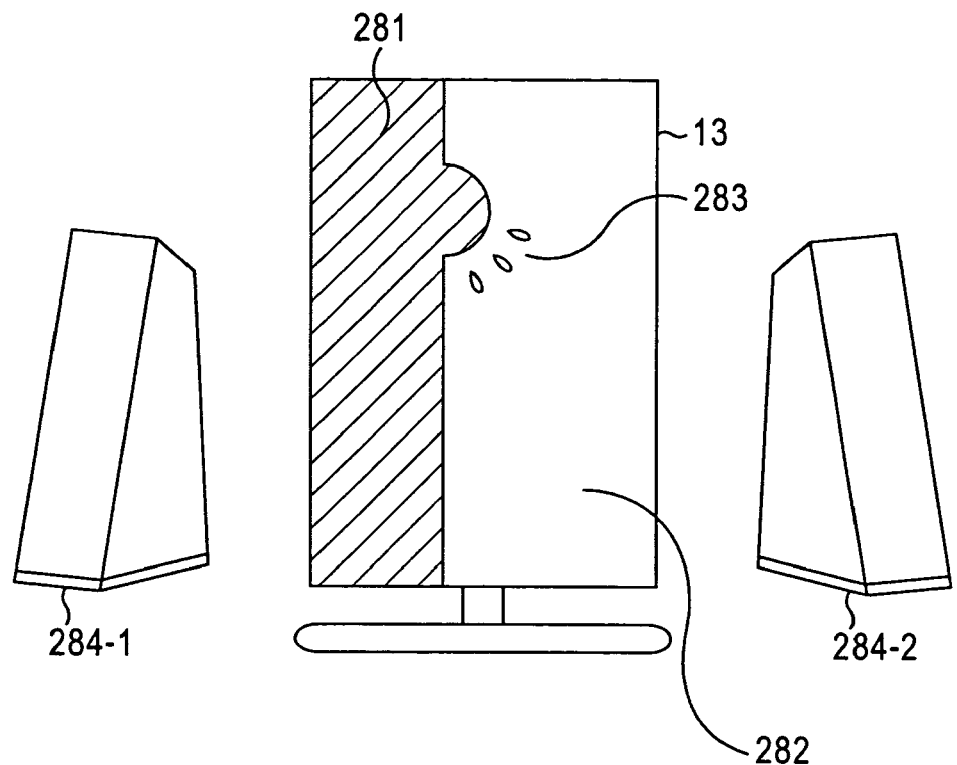
FIG. 15A is an external view of a desk-top playback device shown in FIG. 2.
Figure 15B:
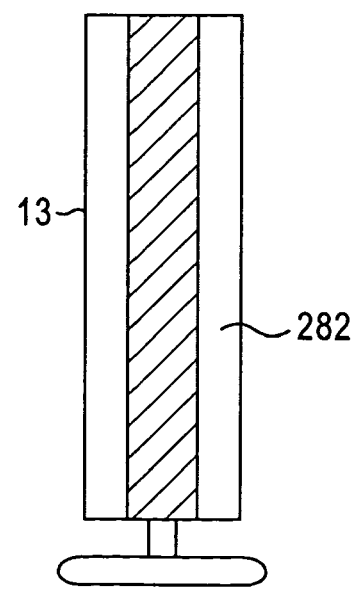
FIG. 15B is an external view of the desk-top playback device shown in FIG. 2.

FIGS. 15A and 15B are external views of the desk-top playback device 13.

FIG. 15A is a front view of the desk-top playback device 13. The desk-top playback device 13 plays back music data sent from the personal computer 1, and outputs the sound from speakers 284-1 and 284-2. The desk-top playback device 13 includes a display panel 281 and a front panel 282 on the front surface of the desk-top playback device 13. A GUI screen, which is discussed below, is displayed on the display panel 281.

The front panel 282 is provided with, not only an operation button 283, but also an IR (Infra Red) receiver (not shown) for receiving an infrared signal indicating a user's operation sent from a remote commander, which is discussed below with reference to FIGS. 17A and 17B. The front panel 282 may have a built-in speaker and an output terminal leading to a headphone (not shown), in which case, sound can be output without the need to connect the speakers 284-1 and 284-2.

FIG. 15B is a side view of the desk-top playback device 13. The desk-top playback device 13 is formed to be very thin, as shown in FIG. 15B, which increases the flexibility to select the installation place though the size of the display panel 281 is sufficiently large.

FIG. 16 is a block diagram illustrating the configuration of the desk-top playback device 13. An input IF (Interface) 301 receives a signal indicating a user's operation from the operation button 283 or an IR receiver 303 which has received an infrared signal from a remote commander 302, and outputs the signal to a controller 305 via a bus 304.

The controller 305 is a so-called "microcomputer" formed of a CPU, a ROM, and a RAM, and controls the overall operation of the desk-top playback device 13. The controller 305 runs the client program, which is discussed below, and in accordance with a signal indicating a user's operation input from the input IF 301, the controller 305 sends a music-data request signal to the personal computer 1 via a communication unit 306, or reads image data corresponding to a GUI screen, which is discussed below, from a storage unit 310 and outputs the read image data to a display controller 307 via the bus 304 and displays it on the display panel 281. The controller 305 also outputs music data received by the communication unit 306 to an audio output unit 308 via the bus 304, controls the audio output unit 308 to play back the music data in accordance with the data format, and outputs the sound from the speaker 284 or a headphone 309.

The communication unit 306 performs wireless communication with the personal computer 1 according to a predetermined communication method, for example, IEEE802.11a, infrared communication, or Bluetooth. The communication unit 306 sends a music-data request signal input from the controller 305 via the bus 304 to the personal computer 1, and receives music data from the personal computer 1 and outputs it to the controller 305 via the bus 304.

The display controller 307 outputs image data to the display panel 281, and controls the image data to be displayed under the control of the controller 305. Under the control of the controller 305, the audio output unit 308 plays back input audio data based on the format, outputs the audio data to the speaker 284 or the headphone 309, and controls the sound to be output.

GUI data to be displayed on the display panel 281 is stored in a storage unit 310, and also, various types of information required for the control performed by the controller 305 are stored in the storage unit 310.

A drive 311 is also connected to the controller 305 via the bus 304. The drive 311 reads data or a program recorded in a magnetic disk 321, an optical disc 322, a magneto-optical disk 323, or a semiconductor memory 324 loaded in the drive 311, and supplies the data or the program to the controller 305 via the bus 304. The drive 311 also records data or a program supplied from the controller 305 to the magnetic disk 321, the optical disc 322, the magneto-optical disk 323, or the semiconductor memory 324 loaded in the drive 311.

Figure 17A:
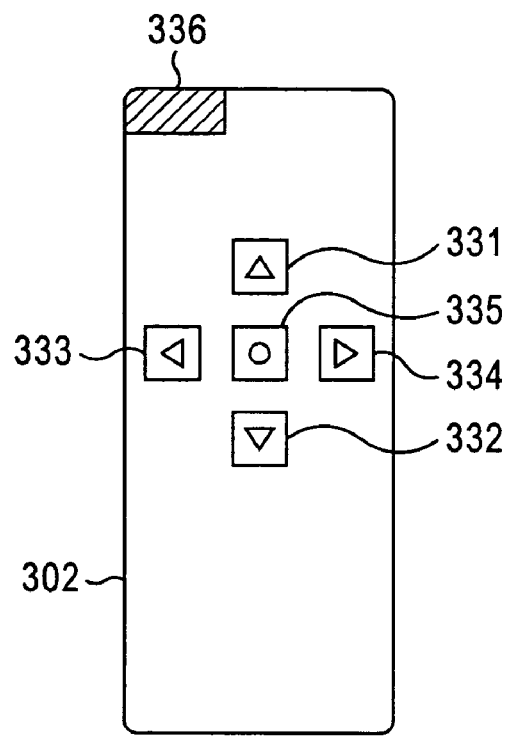
FIG. 17A illustrate a remote commander.
Figure 17B:
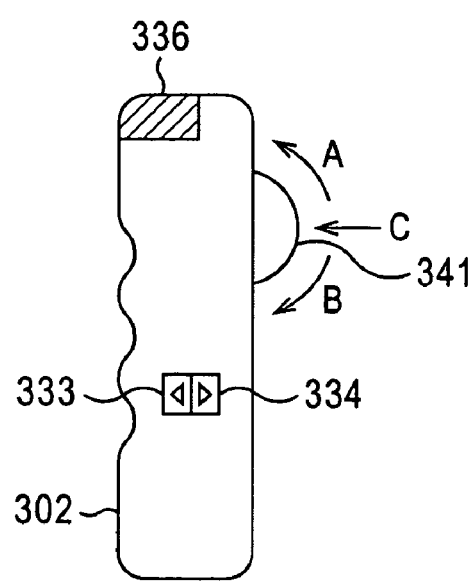
FIG. 17B illustrates the remote commander.

FIGS. 17A and 17B are external views of the remote commander 302. The remote commander 302 includes, as shown in FIG. 17A, cursor buttons 331 and 332, a zoom-out button 333, a zoom-in button 334, and a restart button 335. The user operates the cursor buttons 331 and 332, the zoom-out button 333, the zoom-in button 334, and the restart button 335 by referring to a GUI displayed on the display panel 281.

The cursor buttons 331 and 332 are operated by the user for changing the selection of an icon or a thumbnail, which are discussed below, displayed on the display panel 281. The zoom-out button 333 and the zoom-in button 334 are operated by the user when a zoom-out or zoom-in operation is designated, i.e., when the GUI screen currently displayed on the display panel 281 is changed. The restart button 335 is operated by the user when the user wishes to listen to a piece of music which is currently played back in the desk-top playback device 13 from the beginning. When the user operates one of the above-described buttons, an infrared signal is output from an IR transmitter 336 to the IR receiver 303 of the desk-top playback device.

The remote commander 302 may be provided with, as shown in FIG. 17B, a jog dial 341 instead of the cursor buttons 331 and 332 and the restart button 335. The jog dial 341 is a rotating/pressing operation device, and is rotatable in the directions indicated by the arrows A and B and is also pressable in the direction indicated by the arrow C. The rotation operation on the jog dial 341 in the direction indicated by the arrow A is equivalent to the input operation on the cursor button 331 of FIG. 17A, and, the rotation operation on the jog dial 341 in the direction indicated by the arrow B is equivalent to the input operation on the cursor button 332 of FIG. 17A. The pressing operation on the jog dial 341 is equivalent to the input operation on the restart button.

Figure 18:
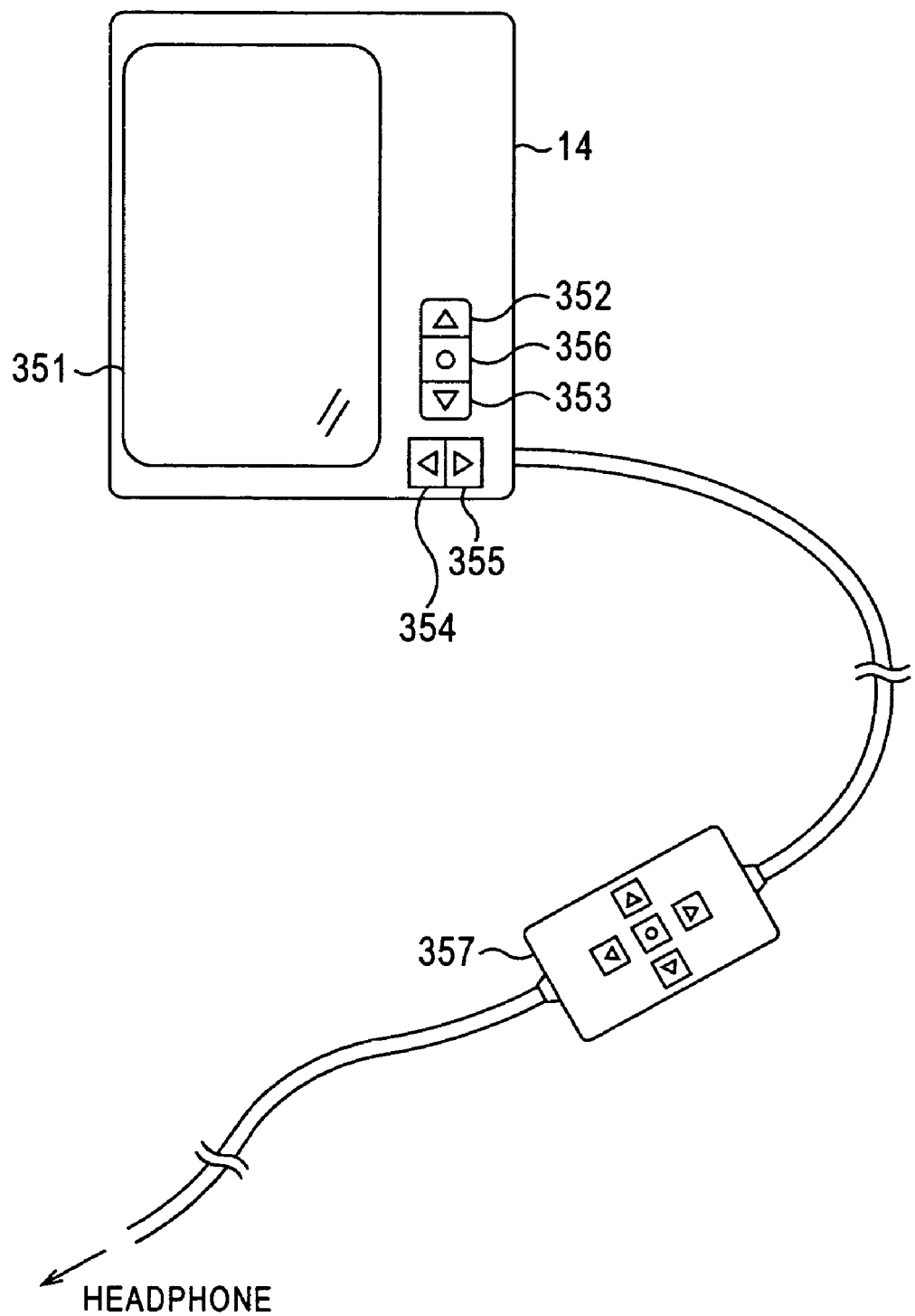
FIG. 18 is an external view of a portable playback device shown in FIG. 2.

FIG. 18 is an external view of the configuration of the portable playback device 14. The size of the portable playback device 14 is small enough to be held in a pocket.

A GUI screen for assisting the user's operation is displayed on a display panel 351. Since the display area of the display panel 351 is much smaller than the display panel 281 of the desk-top playback device 13 described with reference to FIGS. 15A and 15B, a simple GUI may be displayed compared to the GUI displayed on the display panel 281 of the desk-top playback device 13.

The portable playback device 14 is provided with cursor keys 352 and 353, a zoom-out key 354, a zoom-in key 355, and a restart key 356. A remote commander 357 provided with keys similar to the cursor keys 352 and 353, the zoom-out, key 354, the zoom-in key 355, and the restart key 356 is also provided in a mid portion of a cable for connecting the portable playback device 14 to a headphone 16 so as to allow the user to operate the portable playback device 14 while keeping it in a pocket or a bag. The user operates the cursor keys 352 and 353, the zoom-out key 354, the zoom-in key 355, or the restart key 356 by referring to the GUI displayed on a display panel 351, or operates the remote commander 357 without referring to the display panel 351.

The cursor keys 352 and 353 are operated by the user when the icon or the thumbnail displayed on the display panel 351 is changed. The zoom-out key 354 and the zoom-in key 355 are displayed by the user when the GUI screen currently displayed on the display panel 351 is changed, i.e., when a zoom-out or zoom-in operation is designated. The restart key 356 is operated by the user when the user wishes to listen to a piece of music which is currently played back in the portable playback device 14 from the beginning. Basically, the keys provided for the remote commander 357 are configured similarly to the cursor keys 352 and 353, the zoom-out key 354, the zoom-in key 355, and the restart key 356.

Figure 19:
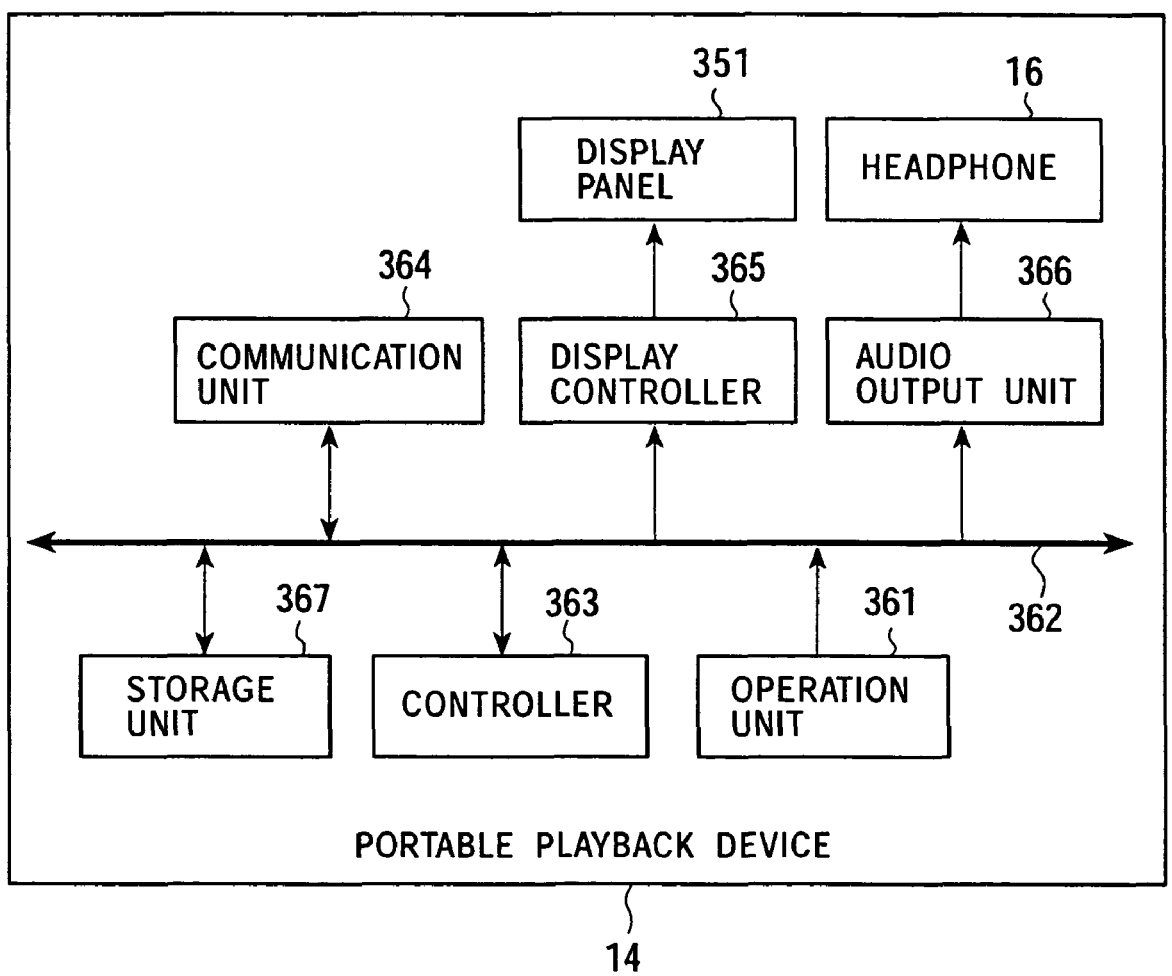
FIG. 19 is a block diagram illustrating the configuration of the portable playback device.

FIG. 19 is a block diagram illustrating the configuration of the portable playback device 14. An operation unit 361 corresponds to the cursor keys 352 and 353, the zoom-out key 354, the zoom-in key 355, the restart key 356, and the remote commander 357 shown in FIG. 18, and outputs a signal indicating an input user's operation to a controller 363 via a bus 362.

The controller 363 is a so-called "microcomputer" formed of a CPU, a ROM, and a RAM, and controls the overall operation of the portable playback device 14. The controller 363 starts the client program, which is discussed below, and in accordance with a signal indicating an input user's operation on the operation unit 361, the controller 363 sends a music-data request signal to the personal computer 1 via a communication unit 364, or reads image data corresponding to the GUI screen, which is discussed below, from a storage unit 367, and outputs the image data to a display controller 365 via the bus 362 and displays it on the display panel 351. The controller 363 also outputs music data received by the communication unit 364 to an audio output unit 366 via the bus 362, controls the audio output unit 366 to play back the music data in accordance with the data format, and outputs the sound from the headphone 16.

The communication unit 364 performs wireless communication with the personal computer 1 according to a predetermined communication method, for example, IEEE802.11a, infrared communication, or Bluetooth. The communication unit 364 sends a music-data request signal input from the controller 363 via the bus 362 to the personal computer 1, and receives music data from the personal computer 1 and outputs it to the controller 363 via the bus 362.

The display controller 365 outputs image data to the display panel 351 and controls the image data to be displayed under the control of the controller 363. Under the control of the controller 363, the audio output unit 366 plays back input audio data based on the format, outputs the audio data to the headphone 16, and controls the sound to be output.

GUI data displayed on the display panel 351 is stored in the storage unit 367, and various types of information required for the control operation by the controller 363 are also stored in the storage unit 367.

Figure 20:
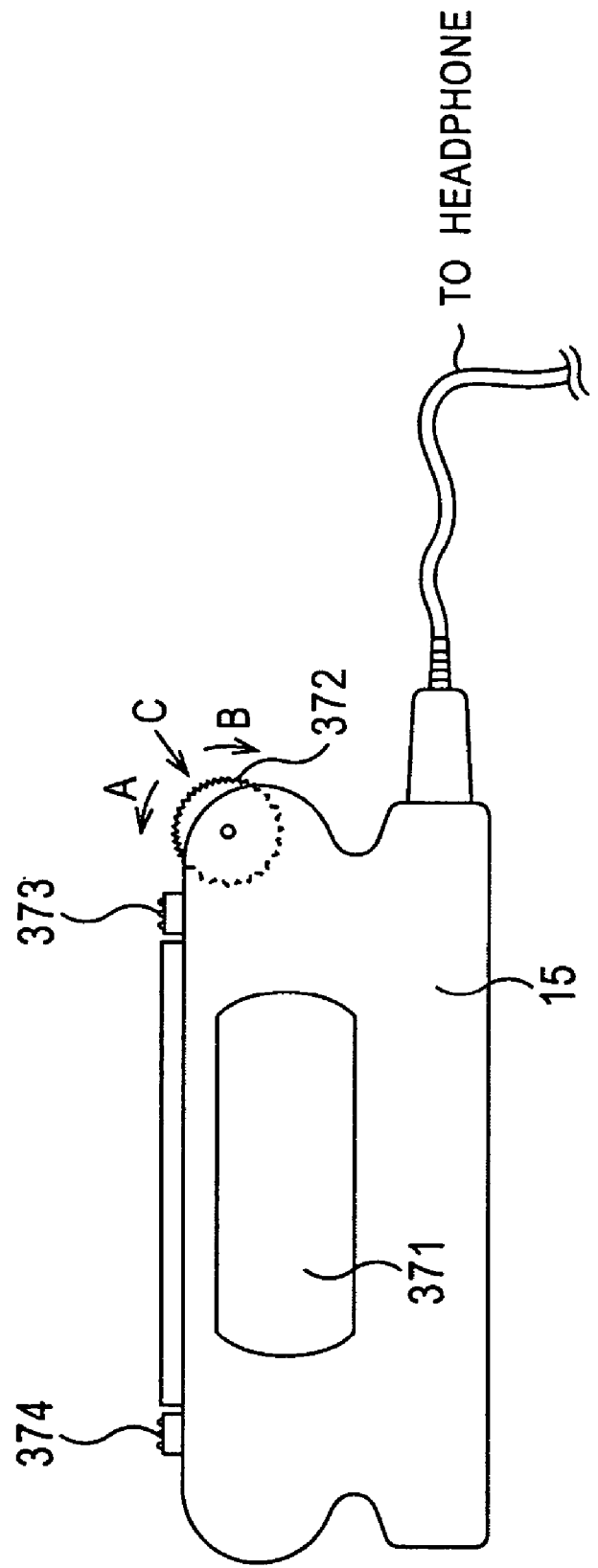
FIG. 20 is an external view of a simplified playback device shown in FIG. 2.

FIG. 20 is an external view of the simplified playback device 15. A jog dial 372 is a rotating/pressing operation device, and is rotatable in the direction indicated by the arrows A and B. When the jog dial 372 is rotated by the user, the selection of an icon or a thumbnail displayed in a display window 371 is changed according to the rotation angle. The command associated with the selected item is then output to the personal computer 1.

A zoom button 373 can be moved in two directions, and is operated by the user for designating a zoom out or zoom-in operation. A restart button 374 is operated by the user when the user wishes to play back music which is currently played back in the simplified playback device 15 from the beginning. By pressing the jog dial 372 in the direction indicated by the arrow C, a function similar to that when the restart button 374 is pressed may be implemented.

The display window 371 is formed of an LCD (Liquid. Crystal Display) or a plurality of LEDs (Light Emitting Diodes). The headphone 16 is connected via a jack, and is attachable and detachable to and from the simplified playback device 15 by inserting and removing the jack into and from the simplified playback device 15.

Figure 21:
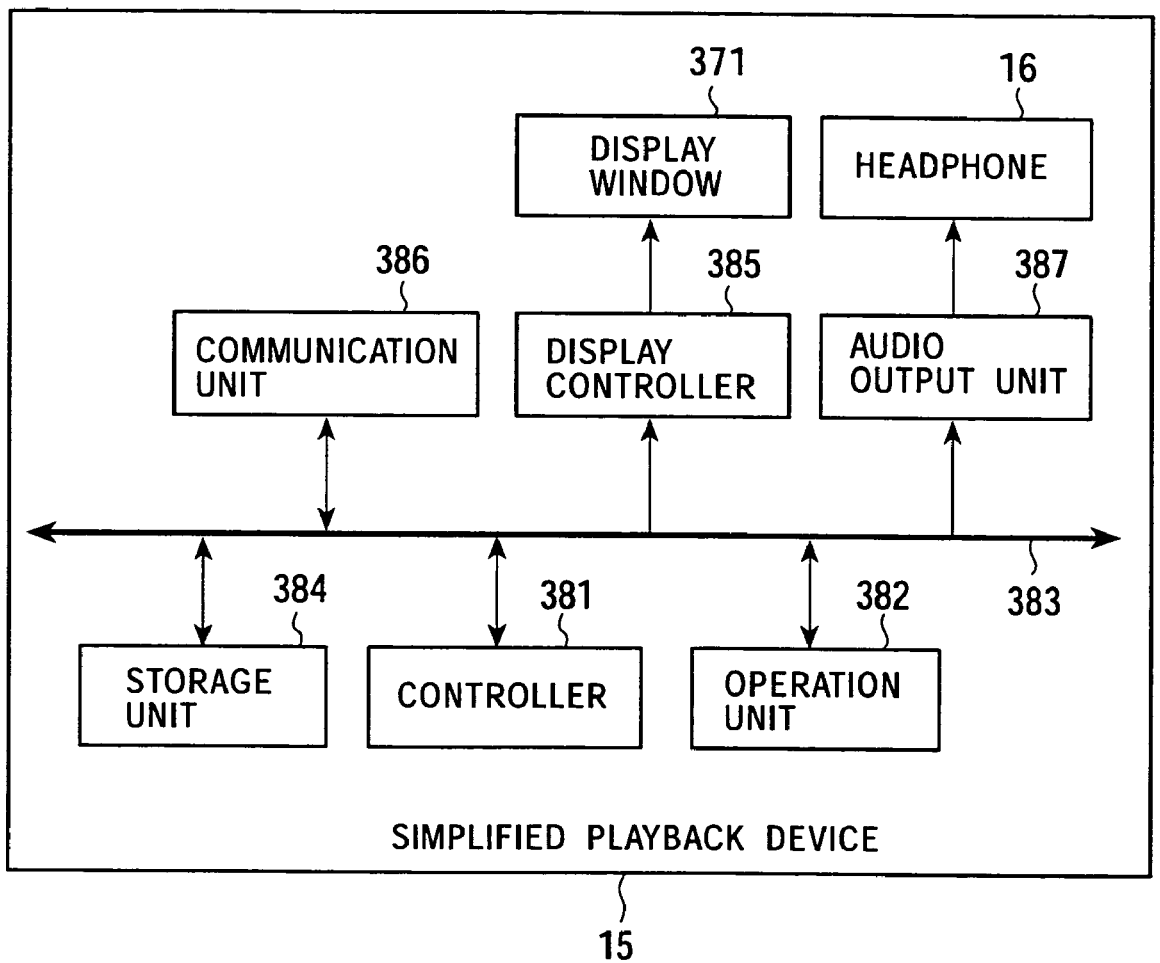
FIG. 21 is a block diagram illustrating the configuration of the simplified playback device.

FIG. 21 is a block diagram illustrating the configuration of the simplified playback device 15. A controller 381 is a so-called "microcomputer" formed of a CPU, a ROM, and a RAM, and controls the overall operation of the simplified playback device 15. An operation unit 382 is equivalent to the jog dial 372, the zoom button 373, and the restart button 374. The controller 381 starts the client program, which is discussed below, and in accordance with a signal input from the operation unit 382 via a bus 383, the controller 381 outputs an image or text stored in a storage unit 384 to a display controller 385 and displays it in the display window 371, or sends a music-data request signal to the personal computer 1 via a communication unit 386. The controller 381, also outputs music data sent from the personal computer 1 to an audio output unit 387, controls the audio output unit 387 to play it back, and sends it to the headphone 16 and outputs it as the sound.

The communication unit 386 performs wireless communication with the personal computer 1 according to a predetermined communication method, for example, IEEE802.11a, infrared communication, or Bluetooth. The communication unit 386 sends a music-data request signal input from the controller 381 via the bus 382 to the personal computer 1, and receives music data from the personal computer 1 and outputs it to the controller 381 via the bus 382.

The display controller 385 outputs GUI data containing image data or text data to the display window 371, and controls such data to be displayed under the control of the controller 381. The audio output unit 387 plays back input audio data based on the format, and controls the sound to be output to the headphone 16 under the control of the controller 381.

GUI data to be displayed in the display window 371 is stored in the storage unit 384, and various types of information required for the control operation by the controller 381 are also stored in the storage unit 384.

Figure 22:
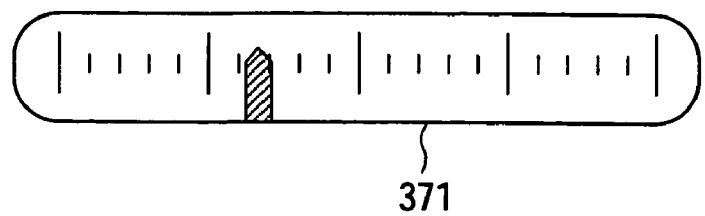
FIG. 22 illustrates an example of a different mode of a display window provided for the simplified playback device.

A description has been given, assuming that the display window 371 is formed of an LCD or a plurality of LEDs. However, the display window 371 may be formed of be a scale and a needle, as shown in FIG. 22. In this case, although characters and images cannot be displayed in the display window 371, the needle moves on the scale according to the rotation of the jog dial 372.

In the simplified playback device 15, the provision of the zoom button 373 may be omitted. In this case, the selection of a piece of music (or the selection of a station, which is described below) is determined only by the position of the needle, which is sufficient for the user who wishes to randomly listen to various pieces of music.

The user is able to randomly listen to music by changing the position of the needle, and if there is a piece of music that pleases the user, the user can operate the restart button 374 to listen to that piece of music from the be ginning.

Figure 23:
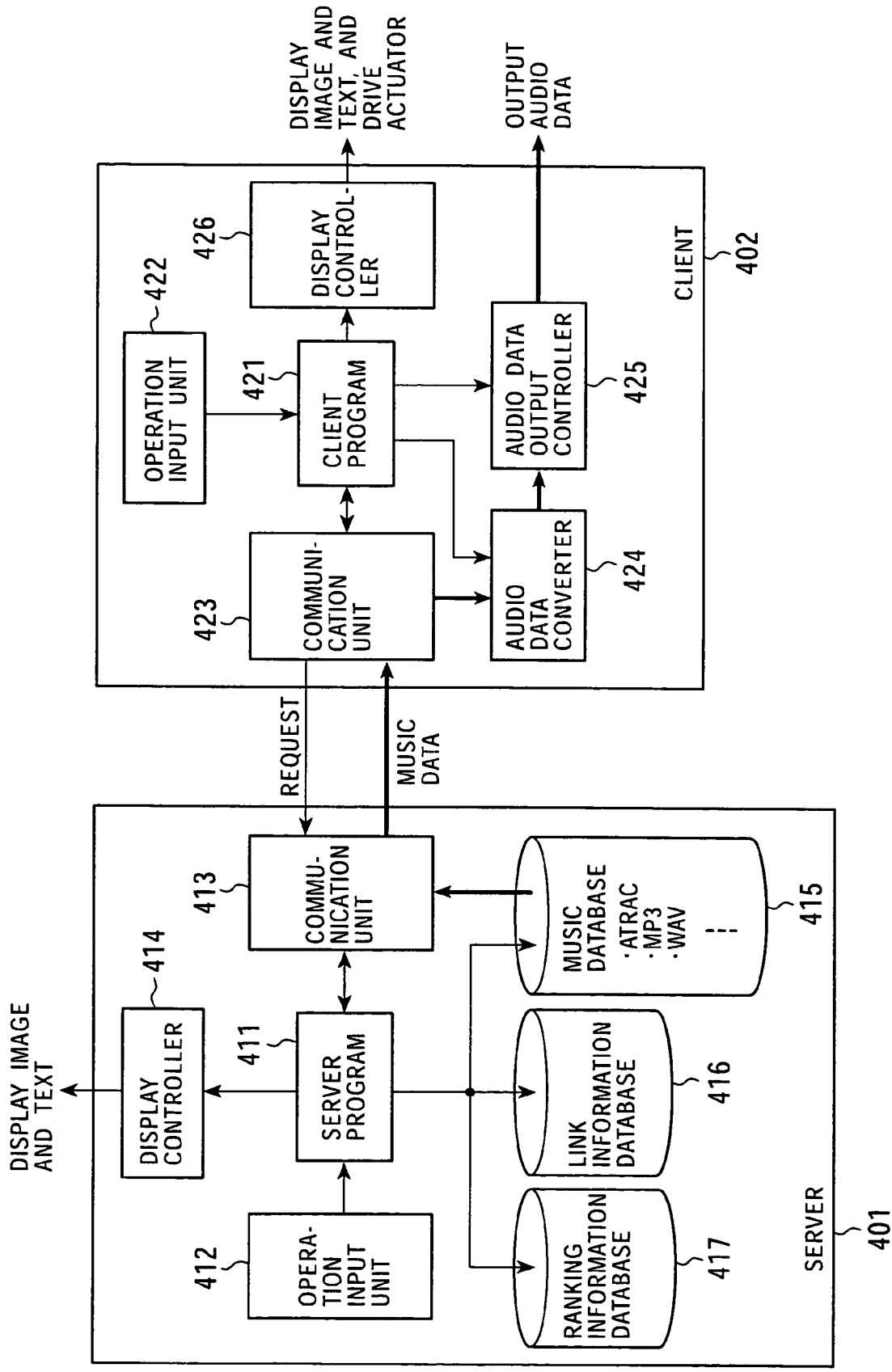
FIG. 23 is a functional block diagram illustrating the functions of a client and a server.

FIG. 23 is a functional block diagram illustrating the relationship between a server and a client and the functions of the server and the client in a client-server system to which the present invention is applied. In this system, a server 401 is equivalent to the personal computer 1 shown in FIG. 2, and a client 402 is equivalent to one of the PDA 11, the cellular telephone 12, the desk-top playback device 13, the portable playback device 14, and the simplified playback device 15 shown in FIG. 2.

A server program 411 of the server 401 controls the sending of music data to the client 402 and the registration of information into a music database 415, a link information database 416, and a ranking information database 417. The server program 411 controls a display controller 414 to display a display screen, for assisting the user to register music data on the LCD 25, and in accordance with a signal indicating a user's operation input from an operation input unit 412, the server program 411 records music data in the music database 415 according to a format, for example, ATRAC (Advanced TRansform Acoustic Coding), MP3 (MPEG Audio Layer-3), or WAV, and updates the link information database 416, and also updates the ranking information database 417 based on a request signal input from the client 402 via a communication unit 413.

The server program 411 also receives a request signal from the client 402 via the communication unit 413, and searches the music database 415 for music data requested by the client 401 by referring to the link information database 416 and the ranking information database 417, and sends the music data to the client 402 via the communication unit 413.

FIG. 24 is a music data list recorded in the music database 415 together with the music data. In the music data list, the music piece ID uniquely assigned to each piece of music, the address information indicating the head position at which the corresponding music data is recorded, and the playback start position information of the music data are registered.

When music data is requested, the playback start position information is first checked, and then, music data corresponding to a so-called "melodious portion" or a climax portion rather than the first portion of the music piece is sent to the client 402 so as to allow the user to easily understand which piece of music is being played back or to understand the image of the piece of music. Then, if the user likes the tune and sends an instruction to play back the music from the beginning, a request signal is generated and sent so that the music can be played back from the beginning. Then, the server program 411 sends the whole music data to the client 402 based on the address information indicating the head position at which the music data is recorded.

Alternatively, in addition to the audio data corresponding to the whole music, a so-called "melodious portion" or a climax portion that allows the user to easily understand which piece of music is being played back or to understand the image of the piece of music, i.e., partial audio data, may be prepared in the music database 415. In this case, address information indicating the recording position of the partial audio data rather than the playback start position information is registered in the music data list.

Multiple registration of the same piece of music in the music data list or in the music database 415 is prevented.

FIG. 25 is a link information list recorded in the link information database 416. In the link information list, IDs associated with music data are registered by being classified into a virtual hierarchical structure based on the user registration. That is, although the music data itself is not recorded in a hierarchical structure, a virtual hierarchical structure is constructed in the link information list. The number of hierarchical levels varies, as shown in FIG. 25. In this example, the primary level, which is the roughest classification ("user A's favorites", "user B's favorites", "user C's favorites", "morning songs", "evening songs", and "everyone's favorites" in FIG. 25) is referred to as a "station", and the intermediate classification and the detailed classification divided from the station leading to the music data ("for driving", "classic", "composer A", and "happy songs" in FIG. 25) are referred to as hierarchical categories. In the link information list, the same piece of music ID may be registered in different places.

FIG. 26 is a ranking list recorded in the ranking information database 417. The ranking is determined for each station, and is indicated together with the hierarchical categories if necessary. The ranking is occasionally updated under the control of the server program 411 according to the requests sent from the client 402.

When recording music data in the music database 415, the user is able to register the music data in a desired station or a desired hierarchical category according to the GUI displayed on the LCD 25 by the display controller 414. The user is also able to form a new station or a hierarchical category, or register the same piece of music in a plurality of stations or a plurality of hierarchical categories, or register a piece of music that is already registered in a station or a hierarchical category in a different station or a different hierarchical category. The server program 411 of the server 401 updates the music database 415, the link information database 416, and the ranking database 417 based on a user's operation input from the operation input unit 412.

For example, by preparing a station for each member of a family in the link information database 416 of the server 401 and by registering favorite music data of each member in the station, the members can individually enjoy music in a room away from the server 401 (that is, the personal computer 1).

The initial ranking for newly, registered music data can be set in any manner according to the system. For example, the ranking may be established when new music data is registered, or it may be started from the topmost level of the corresponding station so as to allow the user to frequently listen to the music. Alternatively, new music data may be started from the bottommost level.

The server program 411 can generate a new station or register music data in a generated station, not only from user registration, but also based on the status of requests made from the client 402. For example, a station collected from music pieces that are requested to play back from the beginning during 7:00 to 9:00 in the morning can be set as "morning songs", or a station collected from music pieces that are requested to play back from the beginning from 9:00 to 11:00 in the evening may be set as "night songs". In this case, only the music pieces that are requested a predetermined number of times rather than only one time under predetermined conditions may be registered in a corresponding station.

The predetermined conditions are not restricted to the time span, such as "morning" or "evening" and may be the day of the week, the month, or the season. Music pieces that are simply requested a predetermined number of times during a predetermined period may be registered in the "everyone's favorites" station.

As described above, the databases are updated based on the status of requests made from a plurality of clients, and thus, databases reflecting all the users' favorites (for example, all the members of a family) utilizing the client-server system rather than a single user's favorites can be constructed.

Referring back to FIG. 23, the configuration of the client 402 is described below.

A client program 421 of the client 402 controls a music-data request signal to be sent to the server 401 and to be received and played back from the server 401, and controls a GUI to be displayed by a display controller 426.

When the client 402 is provided with a display portion for displaying images or text (for example, the display panel 281 of the desk-top playback device 13), the client program 421 controls the display controller 426 to read image data from a built-in storage unit (for example, the storage unit 310 of the desk-top playback device 13), to display the GUI for assisting the user to select music data, and to change the display of the GUI according to a signal indicating a user's operation input from an operation input unit 422.

When the client 402 is not provided with a display portion for displaying images or text, but with the simple display window 371 shown in FIG. 22, the client program 402 moves the position of the needle of the display window 371 (drives the actuator for moving the needle) according to a signal indicating a user's operation input from the operation input unit 422.

For example, when the position of the needle indicates that a station is to be selected, the user moves the position of the needle to change the station, and a music-data request signal is sent so that the music data is played back from a predetermined position in order of descending precedence in the station. When the position of the needle indicates the music data, the user moves the position of the needle to change the piece of music, and a request signal is sent so that the selected piece of music is played back from a predetermined position.

The client program 421 also sends a music-data request signal to the server 401 via a communication unit 423 according to a signal indicating a user's operation input from the operation input unit 422. When the communication unit 423 receives music data of a format, for example, ATRAC, MP3, or WAV, from the server 401, the received music data is output to an audio data converter 424.

The audio data converter 424 converts the received music data into an analog audio signal according to a method suitable for the format of the music data, and outputs it to an audio data output controller 425. The audio data output controller 425 controls the sound to be output from, for example, the speaker 284 or the headphone 16.

The user of the client 402 refers to the GUI controlled by the display controller 426 (or the needle moving along the scale), or if the portable playback device 14 is used, the user operates the operation input unit 422 (for example, the remote commander 302 or 357) so that the user can listen to various pieces of music recorded in the music database 415 of the server 401.

The relationship between the server 401 and the client 402 described with reference to FIG. 23 can be identified as, for example, the relationship between a radio station and a radio. That is, the user of the client 402 merely selects the station (tuning) by performing a very simple operation, such as a cursor operation using a remote commander so as to receive music data of a desired program (a station or a hierarchical category) and to play it back without the need to select the music data itself. If the user wishes to change the piece of music, the user only performs tuning so that a desired piece of music is immediately received and is played back.

A description is given, with reference to FIGS. 27 through 33, of a GUI whose display is controlled by the display controller 426 when, for example, the desk-top playback device 13 is used as the client 402.

Figure 27:
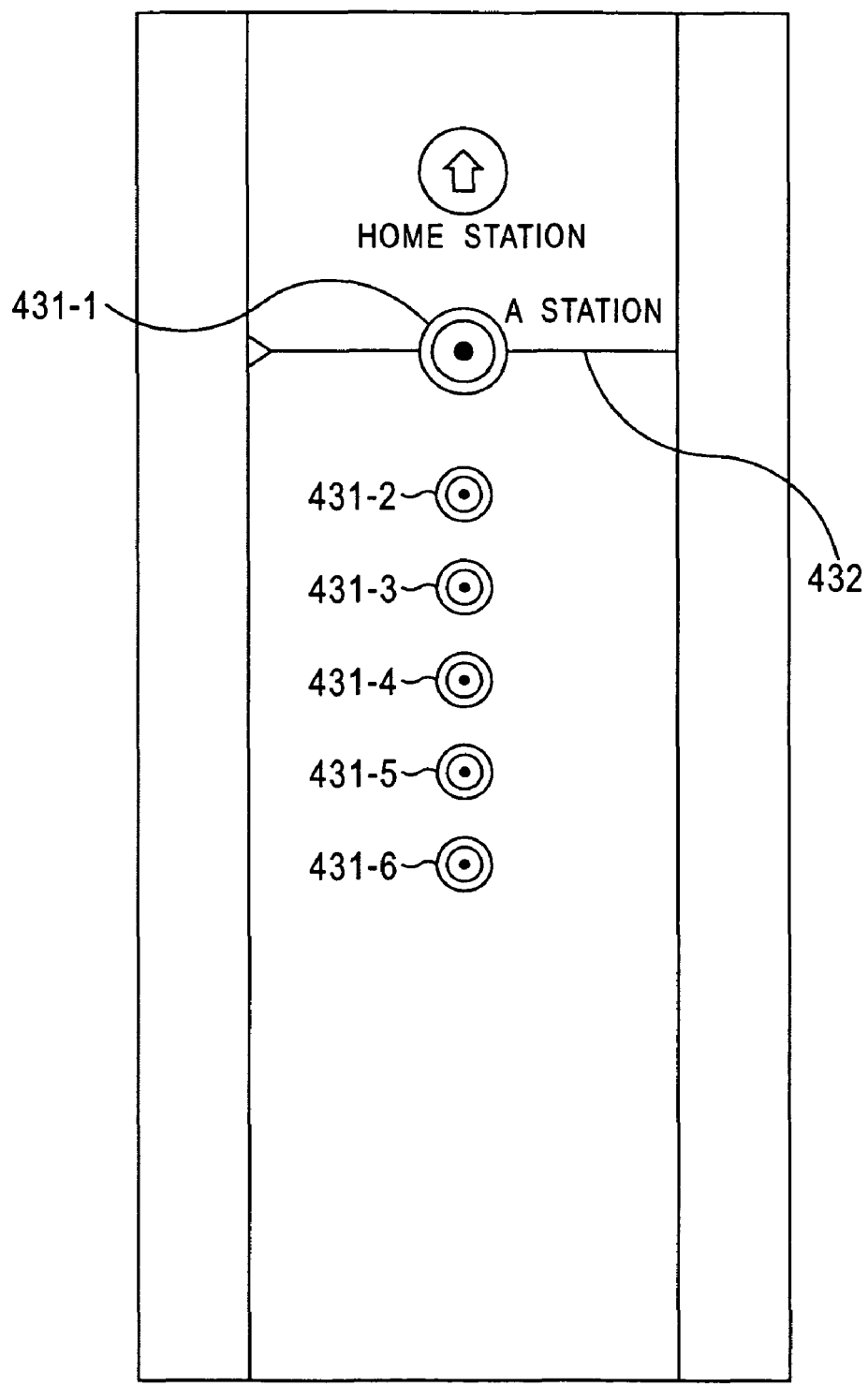
FIG. 27 illustrates a GUI to be displayed.

FIG. 27 illustrates the initial screen of the client 402 that makes a request for music data to the server 401 in which the music data and the information thereof described with reference to FIGS. 24 through 26 are registered in the music database 415, the link information database 416, and the ranking information database 417. Icons 431-1 through 431-6 displayed on the display screen shown in FIG. 27 correspond to the stations of the link information list described with reference to FIG. 25.

For example, while a music piece registered in the "user A's favorites" station is being played back, a cursor line 432 is adjusted to the icon 431-1 corresponding to the "user A's favorites" station, as shown in FIG. 27, and the icon 421-1 is displayed in an enlarged size, and the station name (in this example, "A station") associated with the icon is displayed. In this example, the icon associated with the music data that is currently played back is displayed in an enlarged size. Alternatively, it may be displayed in a different color, inverted, or highlighted (increasing the brightness) so as to distinguish from the other icons.

When power is supplied to the client 402, for example, to the desk-top playback device 13, a request for music data having the highest rank in a predetermined station is made according to the processing described below. In this case, as discussed above, the music data is not played back from the beginning, but a so-called "melodious portion" or a characteristic portion is played back. If the user likes the tune by listening to the "melodious portion" or the characteristic portion, the user presses, for example, the restart button 335 or the jog dial 341 of the remote commander 302 described with reference to FIGS. 17A and 17B so as to make a request for the music data to be played back from the beginning to the server 401.

Then, the user is able to move the cursor line 432 to change the station (selecting the radio station if radio broadcasting is received) by pressing the cursor button 331 or 332 or rotating the jog dial 341 of the remote commander 302 described with reference to FIGS. 17A and 17B.

Figure 28:
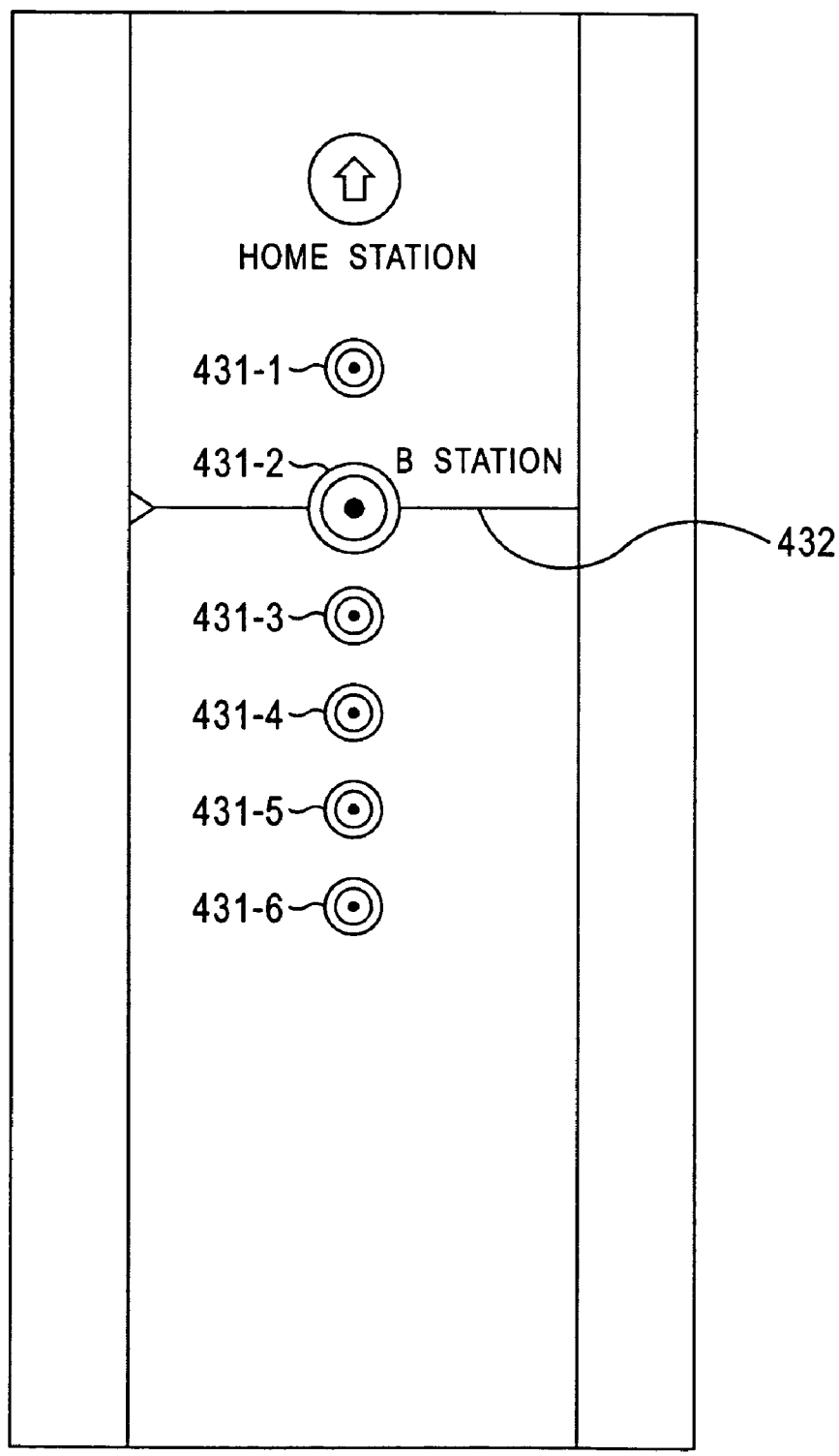
FIG. 28 illustrates a GUI to be displayed.

FIG. 28 illustrates the display screen when the cursor line 432 is moved to B station (corresponding to the "user B's favorites" of the link information list described with reference to FIG. 25) by pressing the cursor button 332 or the rotating the jog dial 341 of the remote commander 302 in the direction indicated by the arrow B in FIG. 17B by the user. In this case, the icon 431-2 corresponding to the selected B station is displayed in an enlarged size, and a so-called "melodious portion" or a characteristic portion of a music piece having the highest rank is played back.

In the music database 415 of the server 401, not only music data reflecting the favorites of a user of a certain client 402, but also music data reflecting the favorites of a user of another client 402, is recorded. If music data is recorded in folders, as in known art, the user has to search for music data in the bottommost layer by tracing the hierarchical structure to play it back. Accordingly, a very complicated operation is required for tracing a hierarchical structure constructed by another user to play back music data registered by this user. In this system, however, it is possible to listen to music pieces registered by another user only by performing a very simple operation, such as vertically moving the cursor line 432.

Figure 29:
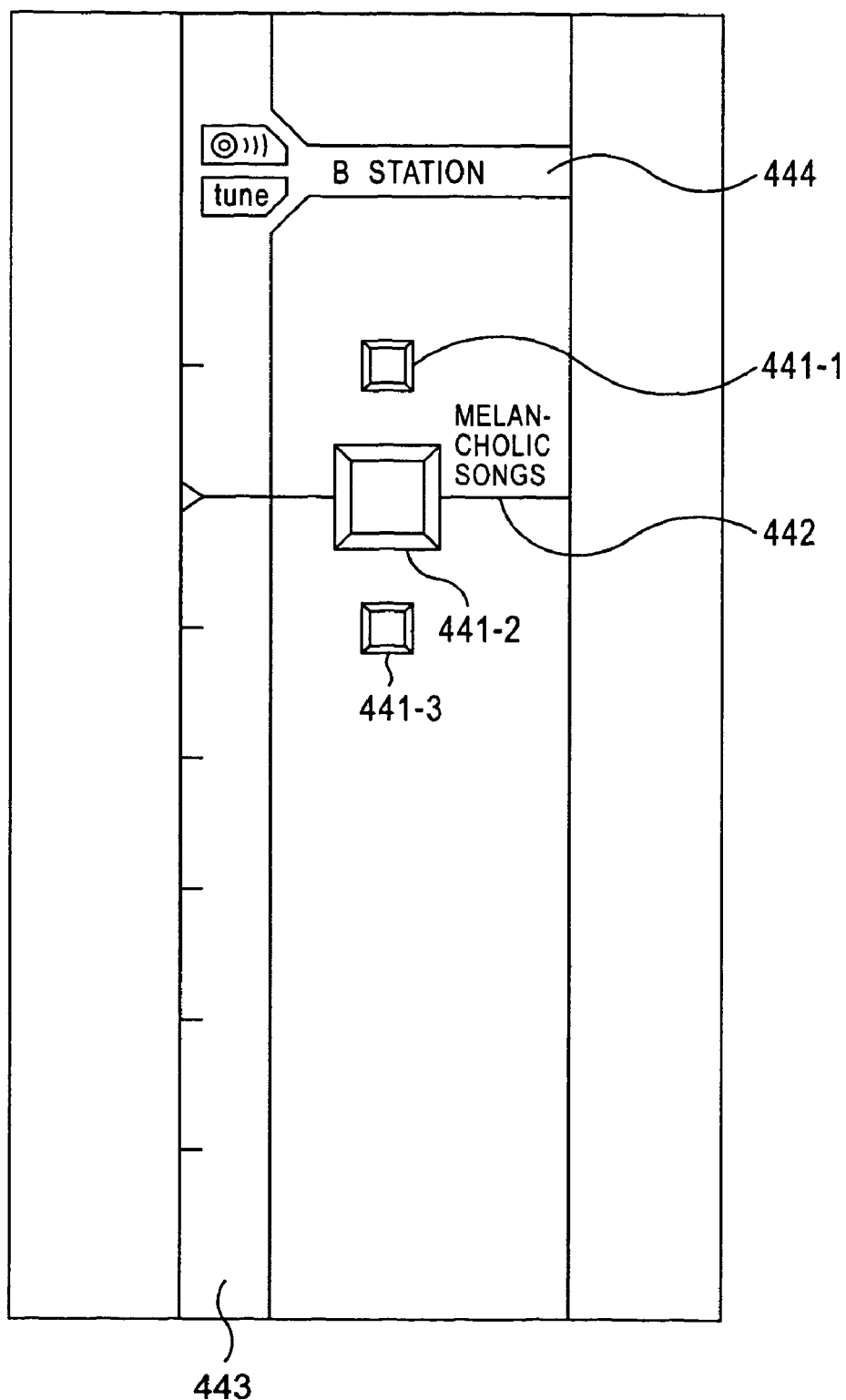
FIG. 29 illustrates a GUI to be displayed.

If the user presses the zoom-in button 334 of the remote commander 302 in the state shown in FIG. 28, icons 441-1 through 441-3 corresponding to hierarchical categories positioned at a lower level of the station "user B's favorites" are displayed, as shown in FIG. 29. If the music piece which is currently played back belongs to a hierarchical category "melancholic songs", a cursor line 442 is adjusted to the icon 441-2 corresponding to the hierarchical category "melancholic songs" when the GUI is changed, and the icon 441-2 is displayed in an enlarged size. An indicator area 443 is also provided to allow the user to intuitively understand the level of the category in the hierarchical structure. In the indicator 443, a scale having predetermined increments is indicated, and the station name containing the displayed hierarchical area is indicated in a text display area 444.

Figure 30:
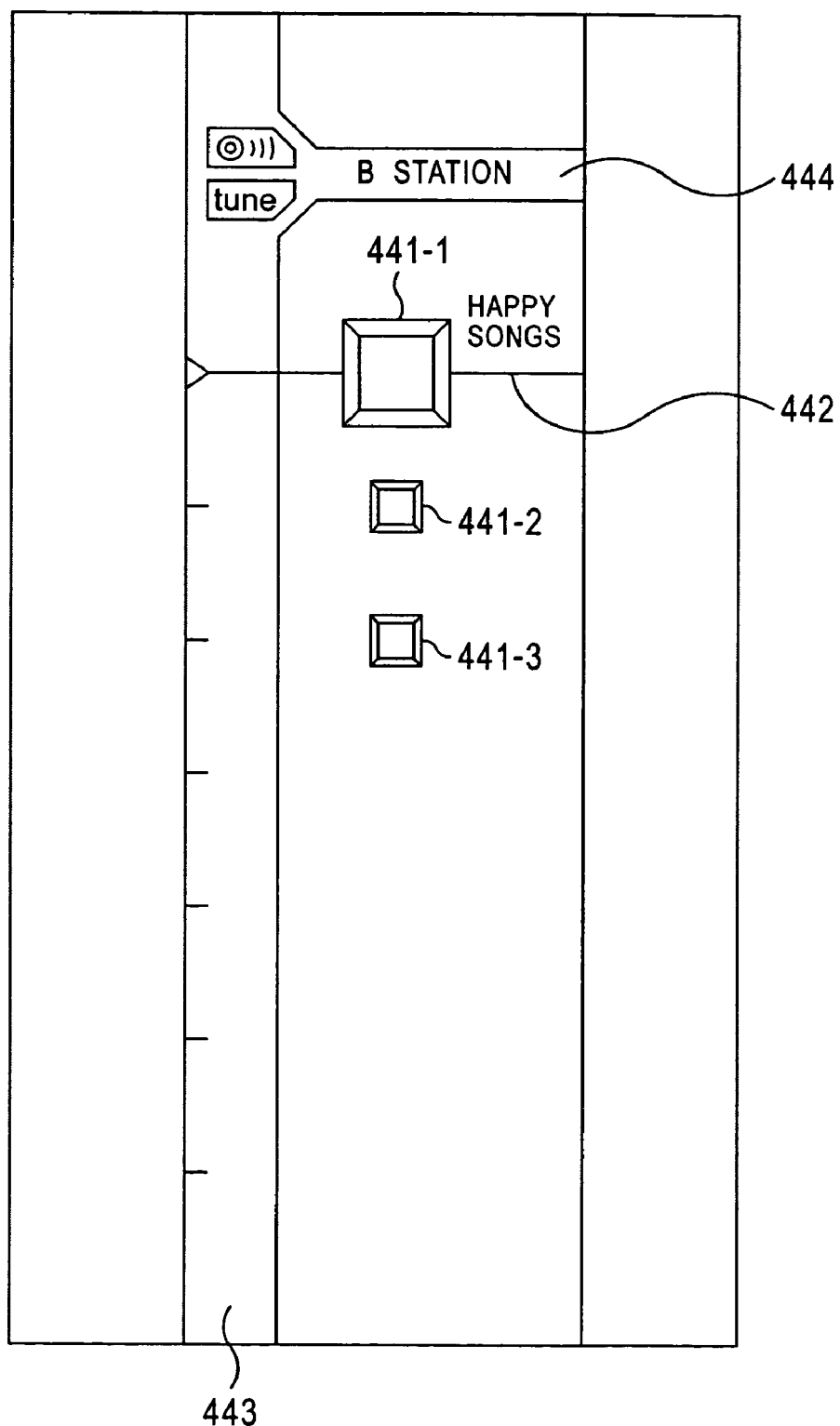
FIG. 30 illustrates a GUI to be displayed.

Also in this case, the user can move the cursor line 442 to change the hierarchical category by pressing the cursor button 331 or 332 or rotating the jog dial 341 of the remote commander 302 described with reference to FIGS. 17A and 17B. When the hierarchical category is changed, the icon 441, corresponding to the newly selected hierarchical category "happy songs" is displayed in an enlarged size, as shown in FIG. 30.

The user is able to display the data of the selected hierarchical category "happy songs" by zooming in on the icon. In this case, the data of the hierarchical category "happy songs" is the bottommost layer, which corresponds to the level of the music data.

Figure 31:
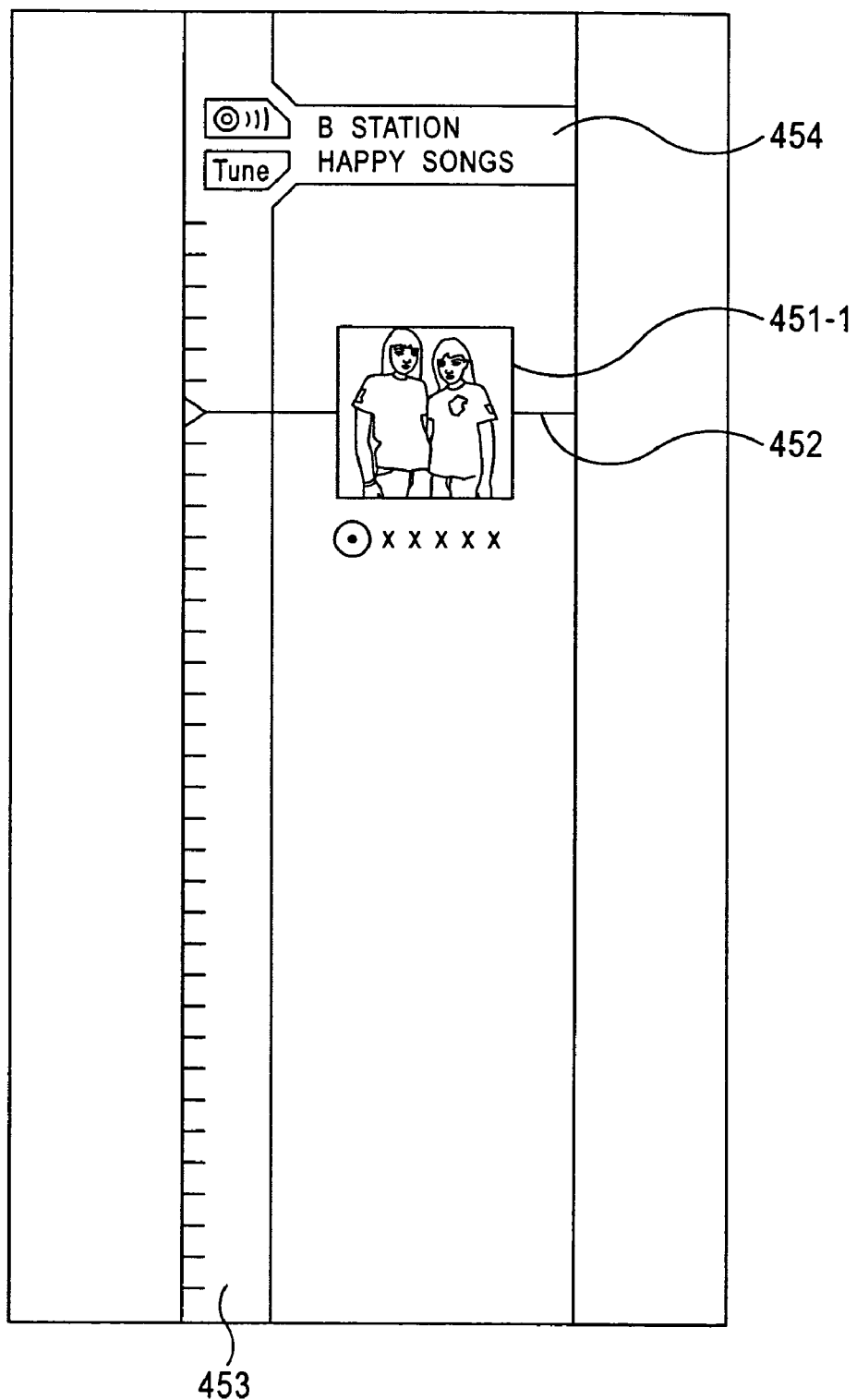
FIG. 31 illustrates a GUI to be displayed.

In this case, as shown in FIG. 31, a thumbnail 451 (for example, a CD jacket or an artist photograph) associated with the music piece which is currently played back may be displayed. As in the display screen in which the hierarchical categories are displayed, as shown in FIG. 29 or 30, an indicator area 453 and a text display area 454 are provided. The increment of the scale displayed in the indicator area 453 is narrower than that of the indicator area 443 shown in FIGS. 29 and 30. That is, the user is able to intuitively understand the level of the music data which is currently played back by the increments of the scale displayed in the indicator area even if there are many hierarchical levels.

Figure 32:
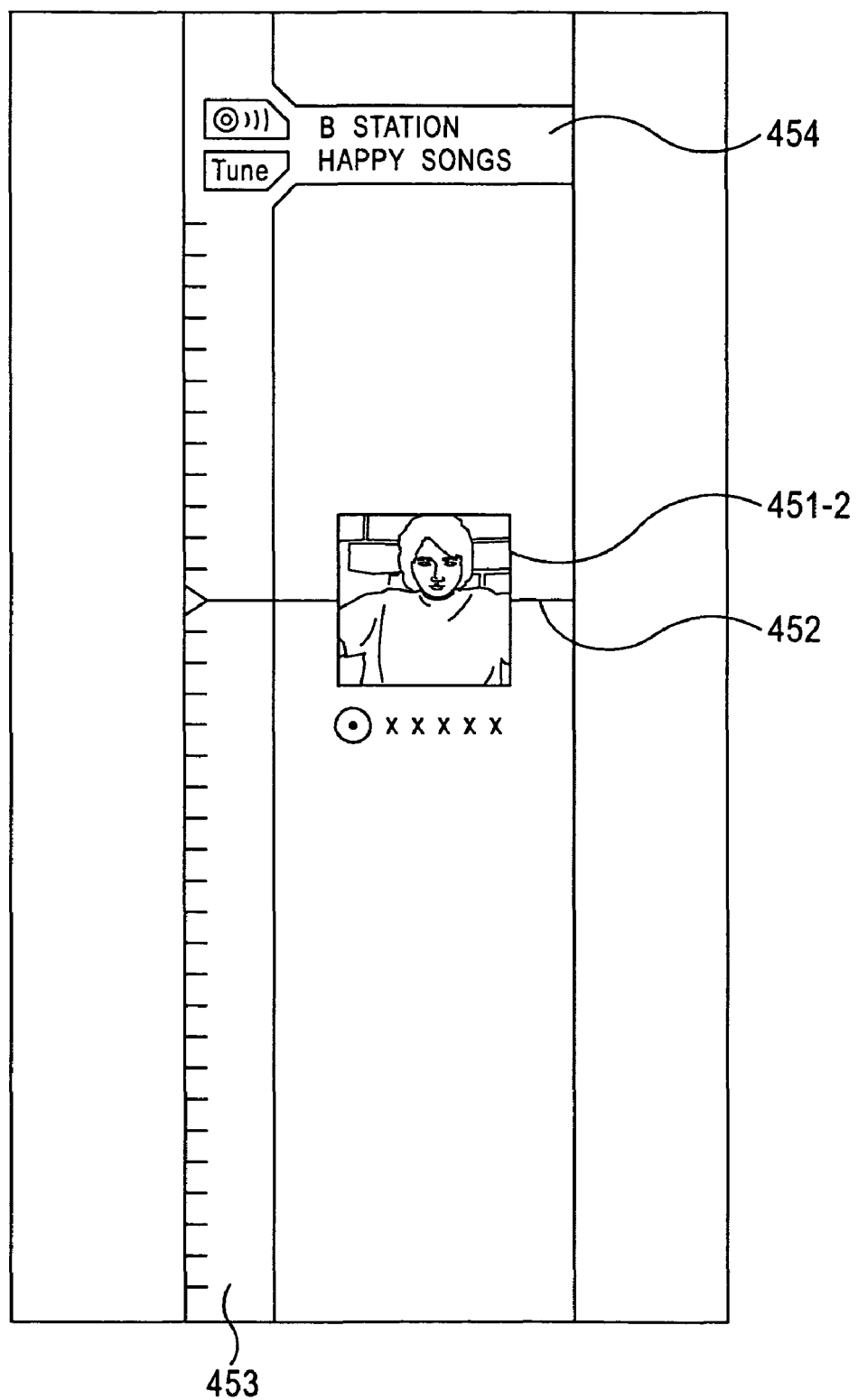

Also in this case, the user is able to move a cursor line 452 to make a request for a different piece of music data to the server 401 by pressing the cursor button 331 or 332 or rotating the jog dial 341 of the remote commander 302 described with reference to FIGS. 17A and 17B. When the cursor line 452 is moved, a request is made for music data corresponding to the position of the cursor line 452 to the server 452, and the music data is received and played back (not from the beginning, but from a so-called "melodious portion"). Simultaneously, a thumbnail 451-2 associated with the music data that is currently played back is displayed, as shown in FIG. 32.

Figure 33:
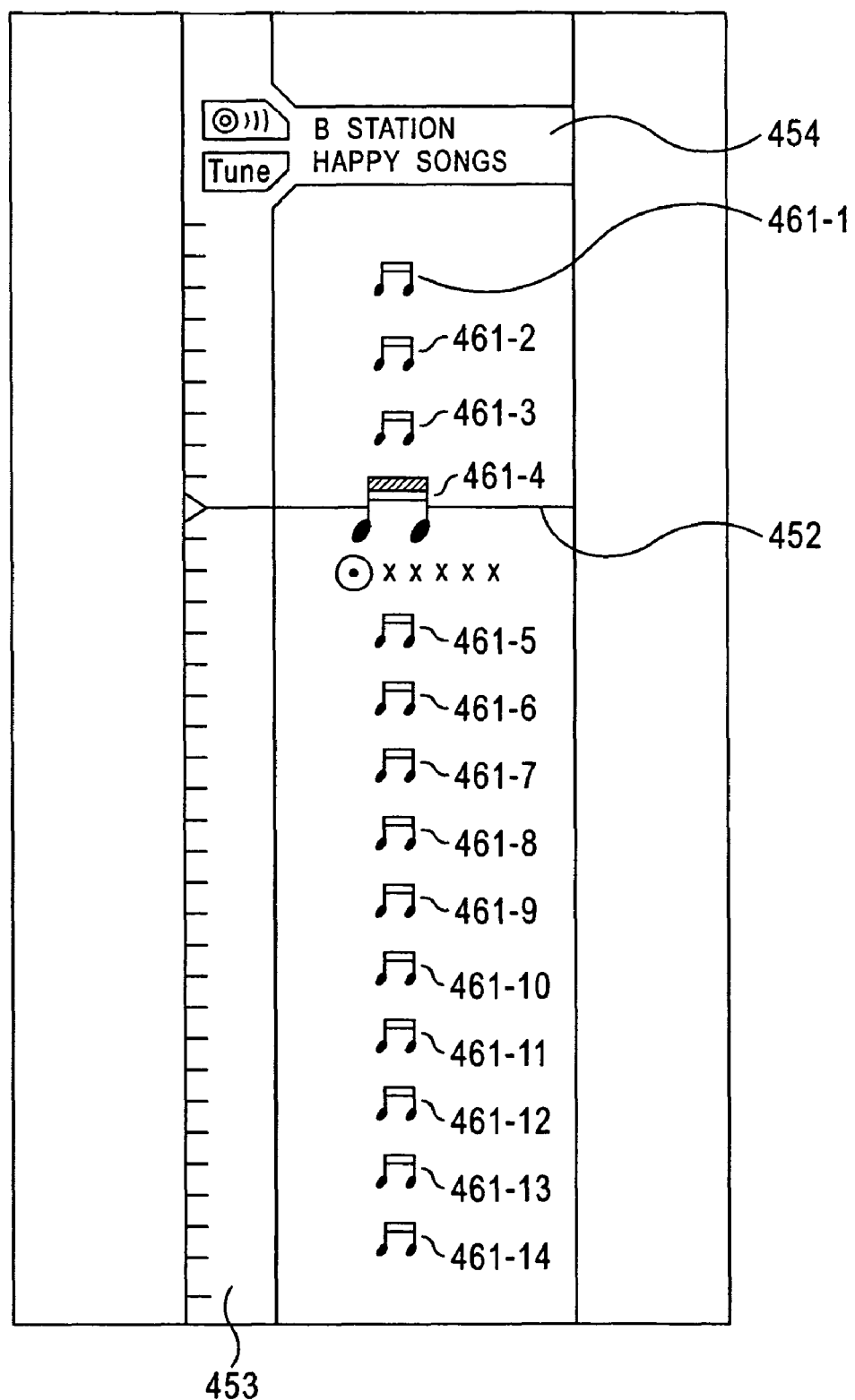
FIG. 33 illustrates a GUI to be displayed.

In this example, a thumbnail corresponding to music data is displayed in the bottommost layer. Alternatively, as in stations or hierarchical categories, in the level of music data, a plurality of icons 461-1 through 461-14 may be displayed in an enlarged size, as shown in FIG. 33, and the cursor line 452 may be moved to display the icon (icon 461-4 in FIG. 33) corresponding to the position of the cursor line 452.

In each GUI screen, if a mark, such as an icon or a thumbnail, cannot be wholly displayed in the screen, it may be adapted that the mark can be scrolled on the screen.

In FIGS. 28 through 33, a description has been given of GUIs when the desk-top playback device 13 is used as the client 402. When the PDA 11, the cellular telephone 12, the portable playback device 14, or the simplified playback device 15 is used as the client 402, GUIs similar to those described above may be displayed, or if the display area is small, GUIs including simplified marks (icons or thumbnails) may be displayed.

Figure 34:
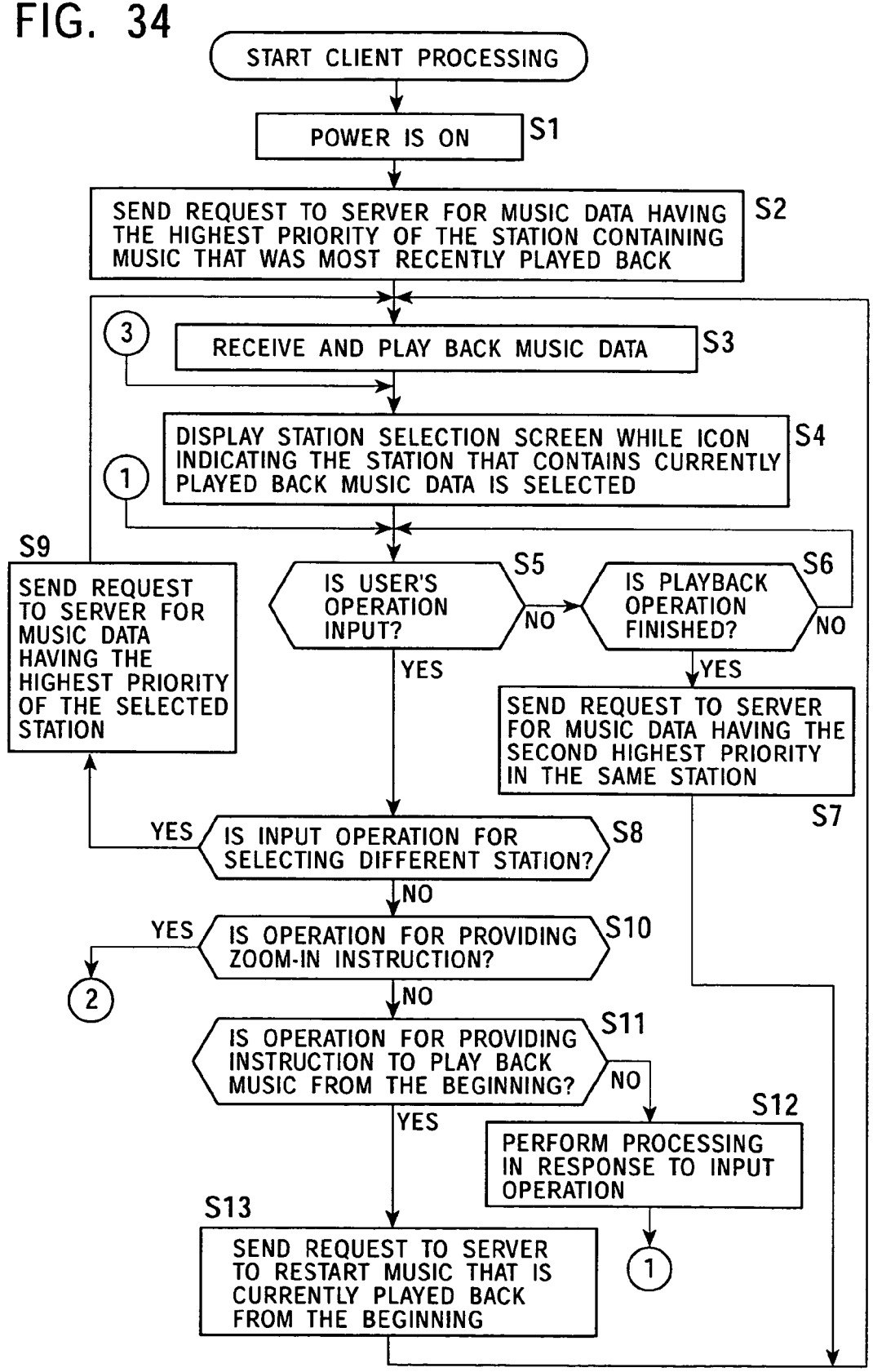
FIG. 34 is a flowchart illustrating the processing by a client.
Figure 35:
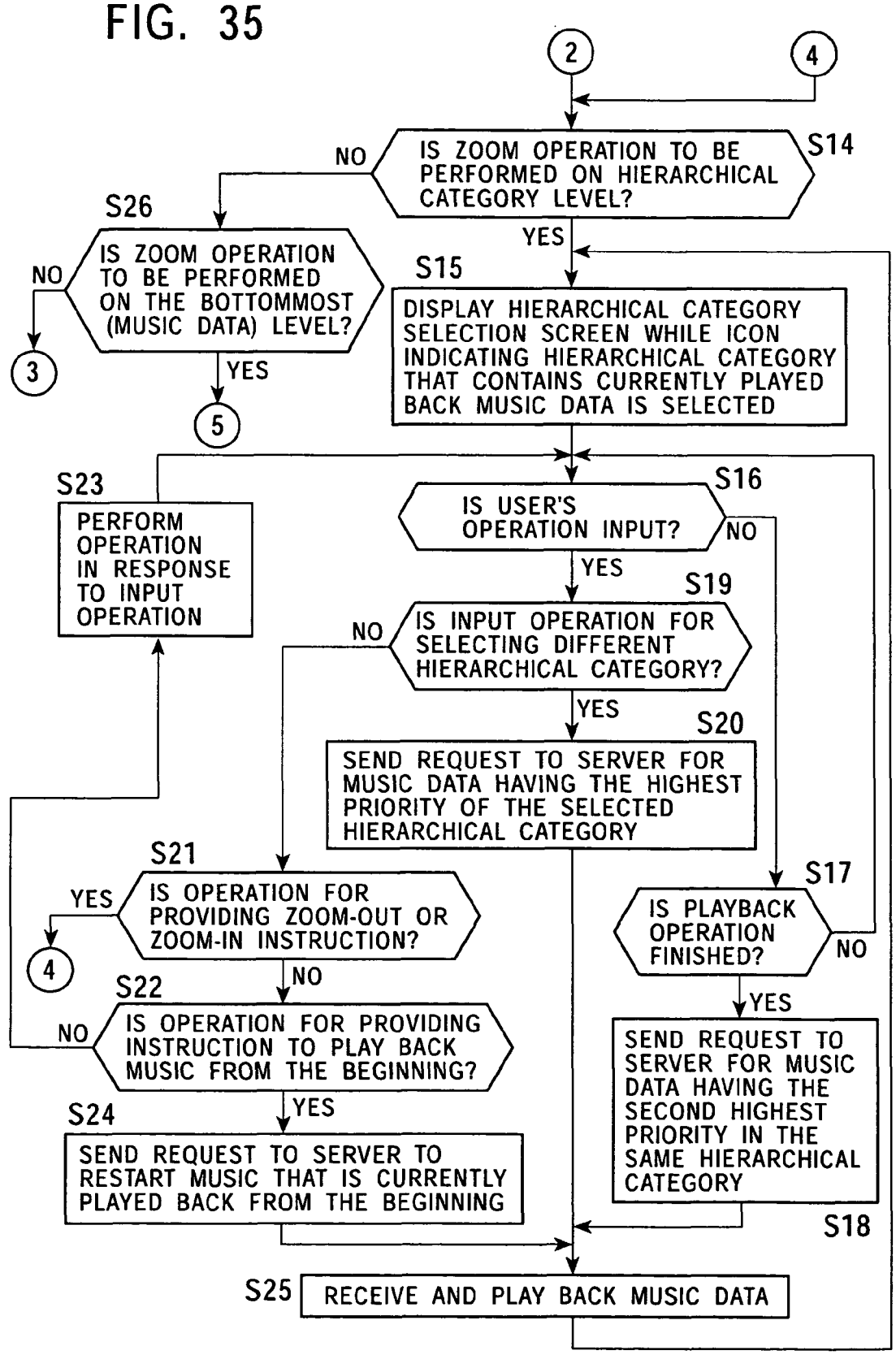
FIG. 35 is a flowchart illustrating the processing by the client.
Figure 36:
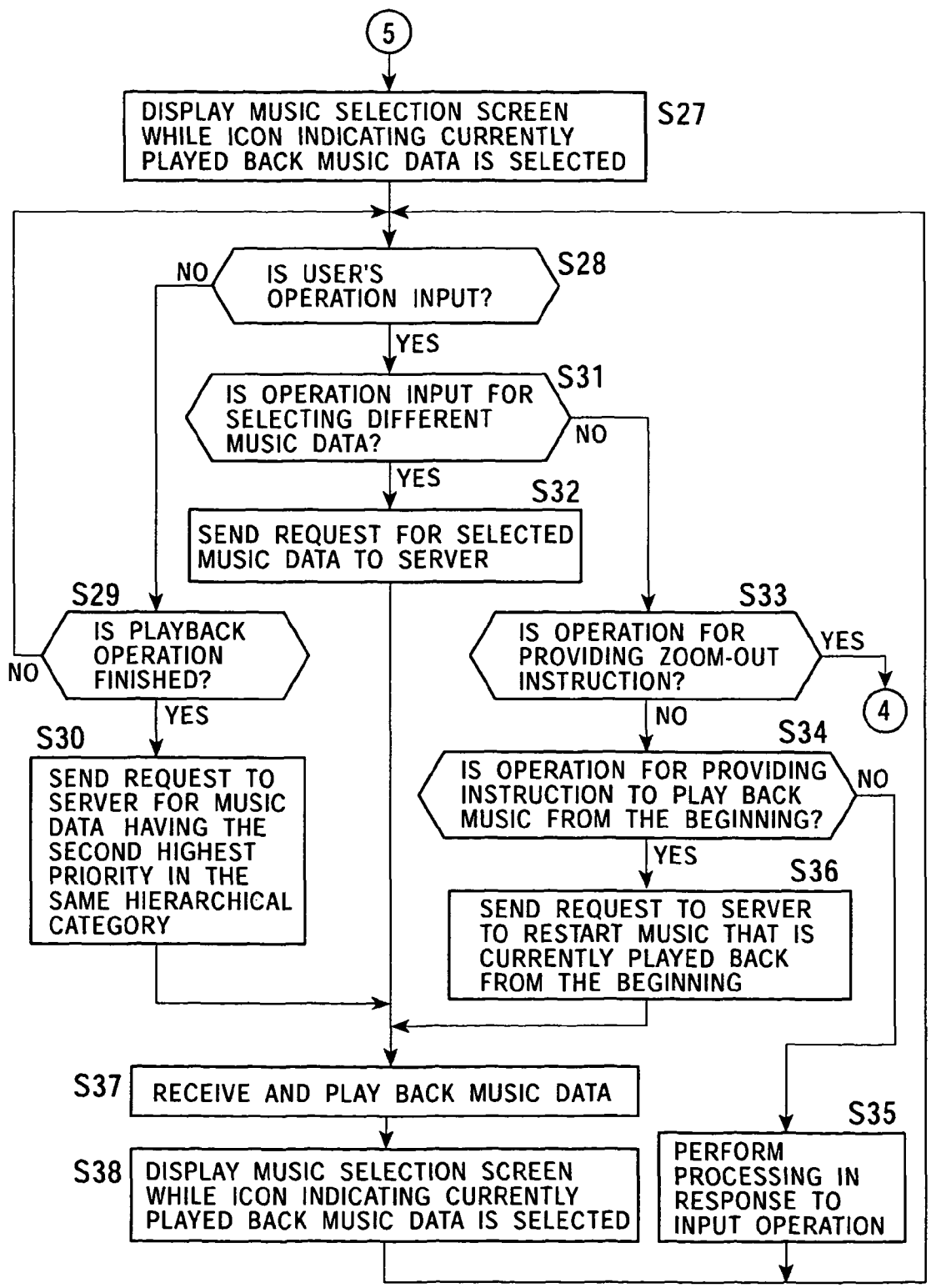
FIG. 36 is a flowchart illustrating the processing by the client.

The processing performed by the client 402 is described below with reference to the flowcharts of FIGS. 34 through 36, assuming that the desk-top playback device 13 is used as the client 402.

In step S1, power is supplied to the client 402.

In step S2, the client program 421 of the client 402 detects the station containing a piece of music that was most recently played back by referring to a log recorded in a built-in memory (not shown), and sends a request for music data having the highest priority in the station to the server 401 via the communication unit 423.

Upon receiving the request from the client 402, the server 401 searches for the corresponding music data and sends it. For example, if the station containing a music piece that was most recently played back by the client 402 is "user A's favorites", the server program 411 of the server 401 detects that the music piece ID of the music data having the currently highest priority is "ID0081" by referring to the ranking information database 417 shown in FIG. 26, and searches for the music data "ID0081" from the music database 415. The server program 411 then reads part of the music data, i.e., a so-called "melodious portion" or the most characteristic portion, and sends it to the client 402 via the communication unit 413.

In step S3, the communication unit 423 receives the music data, and the client program 421 controls the audio data converter 424 and the audio data output controller 425 to play back the received music data. More specifically, audio data converter 424 converts the music data input from the communication unit 423 into an analog audio signal according to a method suitable for the format, and outputs the analog audio signal to the audio data output controller 425. The audio data output controller 425 outputs the analog audio signal to, for example, the speaker 284 or the headphone 16 and plays back the received music data.

In step S4, the client program 421 controls the display controller 426 to output a station selection screen to the display panel 281 while the icon indicating the station containing the current music data is being selected, and displays the station selection screen on the display panel 281. For example, if the station containing the music piece that was most recently played back by the client 402 is "user A's favorites", the GUI screen shown in FIG. 27 is, displayed on the display panel 281.

In step S5, the client program 421 determines whether a user's operation has been input based on a signal input from the operation input unit 422.

If it is determined in step S5 that a user's operation has not been input, the client program 421 determines in step S6 whether the playback operation performed on the music piece is finished, that is, whether the playback operation of the music data received in step S3 is finished.

If it is determined in step S6 that the playback operation performed on the current music piece is not finished, the process returns to step S5, and the subsequent processing is repeated.

If it is determined in step S6 that the playback operation is finished, in step S5, the client program 421 sends a request for music data having the second highest priority in the same station to the server 401 via the communication unit 423. The server program 411 of the server 401 then sends a so-called "melodious portion" or the most characteristic portion of the corresponding music data to the client 402 based on the received request. Thus, after step S7, the process returns to step S3, and the subsequent processing is repeated.

Figure 37A:
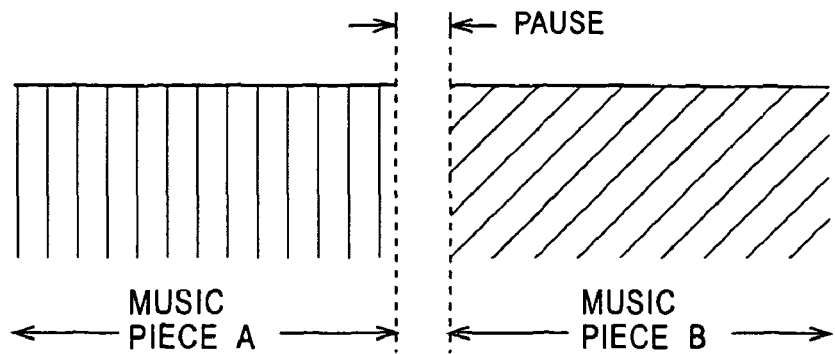
FIG. 37A illustrates a state in which there is a pause between two pieces of music.

A description is now given of the processing of the audio data output controller 425 when the music piece to be played back is changed, for example, after returning to step S3. If, for example, there is a pause between two pieces of music, as shown in FIG. 37A, when music piece A is changed to music piece B, the user has an unnatural feeling as if the needle for the record jumps and the playback operation is suspended.

Figure 37B:
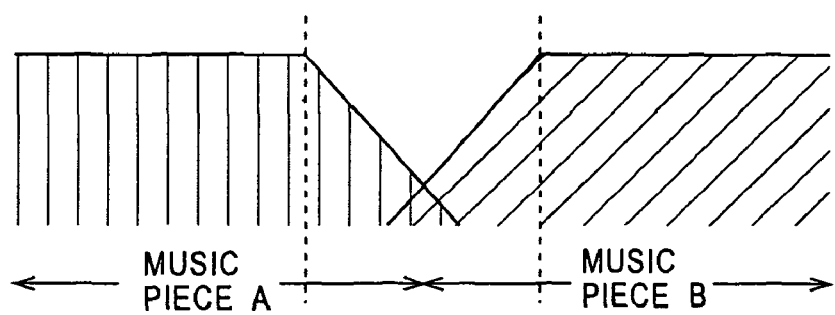
FIG. 37B illustrates a state in which crossfading is performed.

To avoid such an unnatural feeling, crossfading, for example, is performed, as shown in FIG. 37B, to gradually decrease the volume of the music piece A and to gradually increase the volume of the music piece B. In this case, it is difficult for the user to recognize the switching point of the two pieces of music, and the user feels as if music were changed without noticing it.

Figure 37C:
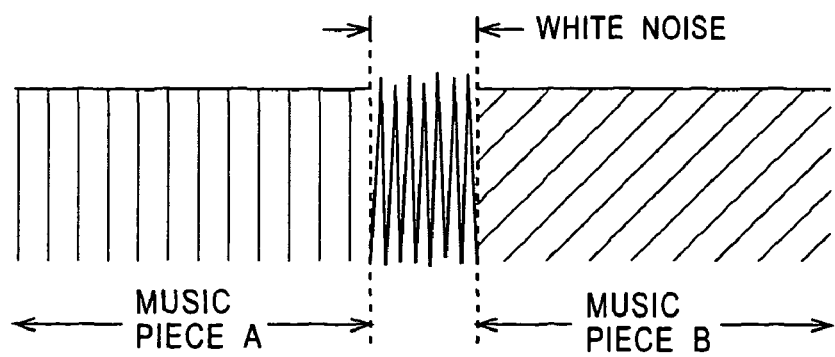
FIG. 37C illustrates a state in which white noise is inserted into a playback switching point of two pieces of music.

Accordingly, when changing music pieces, the audio data output controller 425 inserts very short white noise between two pieces of music, as shown in FIG. 37C, and then outputs the sound. This enables the user to recognize that the music has changed without having an unnatural feeling. In particular, as discussed below, when music data to be played back is changed by performing tuning, and the user feels as if radio tuning were performed since short noise is inserted between two pieces of music. The user can be naturally aware that the music data has been changed.

If it is determined in step S5 that a user's operation has been input, the client program 421 determines in step S8 whether the user's operation input in step S5 has been performed for selecting a different station, that is, whether the user's operation has been performed for moving the cursor line 432 in FIG. 27.

If it is determined in step S8 that the user's operation has been performed for selecting a different station, in step S9, the client program 421 sends a request for music data having the highest priority of the selected station to the server 401 via the communication unit 423. The server program 411 of the server 401 then sends a so-called "melodious portion" or the most characteristic portion of the corresponding music data to the client 402 based on the received request. Accordingly, after step S9, the process returns to step S3, and the subsequent processing is repeated. If the newly selected station is, for example, "user B's favorites", in step S4, the GUI screen described with reference to FIG. 28 is displayed on the display panel 281.

If it is determined in step S8 that the user's operation is not for selecting a different station, the client program 421 determines in step S10 whether the user's operation has been performed for designating a zoom-in operation, i.e., whether the zoom-in button 334 shown in FIGS. 17A and 17B has been pressed. If it is determined in step S10 that the user's operation has been performed for designating a zoom-in operation, the process proceeds to step S14.

If it is determined in step S10 that the user's operation is not for designating a zoom-in operation, the client program 421 determines in step S11 whether the user's operation has been performed for giving an instruction to play back music from the beginning.

If it is determined in step S11 that the user's operation is not for giving an instruction to play back music from the beginning, it means that the user's operation is for changing the volume or the tone. Accordingly, in step S12, the client program 421 performs processing corresponding to the input operation. The process then returns to step S5, and the subsequent processing is repeated.

If it is determined in step S11 that the user's operation has been performed for giving an instruction to play back music from the beginning, in step S13, the client program 421, sends a request to restart the music piece that is currently played back from the beginning to the server 401 via the communication unit 423. The server program 411 of the server 401 then sends the whole music data to the client 402 based on the received request. Accordingly, after step S13, the process returns to step S3, and the subsequent processing is repeated.

If it is determined in step S10 that the user's operation has been performed for designating a zoom-in operation, the client program 421 determines in step S14 whether the zoom operation is to be performed on a hierarchical category level.

If it is determined in step S14 that the zoom operation is to be performed on a hierarchical category level, in step S15, the client program 421 displays the hierarchical category selection screen while the icon indicating the hierarchical category containing the music data that is currently played back is being selected. It is now assumed that the GUI screen shown in FIG. 28 is displayed on the display panel 281, and that an instruction to perform a zoom-in operation is input while the music piece indicated by "ID0077" having the highest priority of the station "user B's favorites" is being played back. Then, the icon 441-2 indicating the hierarchical category "melancholic songs" is selected on the display screen in step S15, as described with reference to FIG. 29, since the music piece indicated by "ID0077" is contained in the hierarchical category "melancholic songs".

Then, the client program 421 determines in step S16 whether a user's operation has been input based on a signal input from the operation input unit 422.

If it is determined in step S16 that a user's operation has not been input, the client program 421 determines in step S17 whether a playback operation on the music piece which is currently played back is finished.

If it is determined in step S17 that the playback operation is not finished, the process returns to step S16, and the subsequent processing is repeated.

If it is determined in step S17 that the playback operation is finished, in step S18, the client program 421 sends a request for music data having the second highest priority in the same hierarchical category to the server 401 via the communication unit 423. Then, the server program 411 of the server 401 sends a so-called "melodious portion" or the most characteristic portion of the corresponding music data to the client 402 based on the received request. Accordingly, after step S18, the process proceeds to step S25.

If it is determined in step S16 that a user's operation has been input, the client program 421 determines in step S19 whether the user's operation input in step S16 has been performed for selecting a different hierarchical category, that is, whether the user's operation has been performed for moving the cursor line 442 shown in FIG. 29.

If it is determined in step S19 that the user's operation has been performed for selecting a different hierarchical category, in step S20, the client program 421 sends a request for music data having the highest priority of the selected hierarchical category to the server. Then, the server program 411 of the server 401 sends a so-called "melodious portion" or the most characteristic portion of the corresponding music data to the client 402 based on the received request. Accordingly, after step S20, the process proceeds to step S25.

If it is determined in step S19 that the user's operation is not for selecting a different hierarchical category, the client program 421 determines in step S21 whether the user's operation has been performed for designating a zoom-out or zoom-in operation. If it is determined in step S21 that the user's operation has been performed for designating a zoom-out or zoom-in operation, the process returns to step S14, and the subsequent processing is repeated.

If it is determined in step S21 that the user's operation is not for designating a zoom-out or zoom-in operation, the client program 421 determines in step S22 whether the user's operation has been performed for giving an instruction to play back music from the beginning.

If it is determined in step S22 that the user's operation is not for giving an instruction to Play back music from the beginning, it means that the user's operation is for changing, for example, the volume or the tone. Accordingly, in step S23, the client program 421 performs processing corresponding to the input operation. The process then returns to step S16, and the subsequent processing is repeated.

If it is determined in step S22 that the user's operation has been performed for giving an instruction to restart music that is currently played back from the beginning, in step S24, the client program 421 sends a request to restart music that is currently played back from the beginning to the server 401 via the communication unit 423. Then, the server program 411 of the server 401 sends the whole music data to the client 402 based on the received request.

In step S18, S20, or S24, music data is sent from the server 401. Accordingly, after step S18, S20, or S24, in step S25, the communication unit 423 receives the music data, and the client program 421 controls the audio data converter. 424 and the audio data output controller 425 to play back the received music data. The process then returns to step S15, and the subsequent processing is repeated.

If it is determined in step S14 that the zoom operation is not to be performed on a hierarchical category level, the client program 421 determines in step, S26 whether the zoom operation is to be performed on the bottommost level (music data). If it is determined in step, S26, that the zoom operation is not to be performed on the bottommost level (music data), it means that the zoom operation is to be performed on the station level. Accordingly, the process returns to step S4, and the subsequent processing is repeated.

If it is determined in step S26 that the zoom operation is to be performed on the bottommost level (music data), in step S27, the client program 421 controls the display controller 426 to display the music selection screen shown in FIG. 33 (or FIG. 31 or 32) while the icon indicating the music data that is currently played back is being selected (or while the thumbnail is displayed).

In step S28, the client program 421 determines whether a user's operation has been input based on a signal input from the operation input unit 422.

If it is determined in step S28 that a user's operation has not been input, the client program 421 determines in step S29 whether the playback operation on the music piece which is currently played back is finished. If it is determined in step S29 that the playback operation is not finished, the process returns to step S28, and the subsequent processing is repeated.

If it is determined in step S29 that the playback operation is finished, in step S30, the client program 421 sends a request for music data having the second highest priority in the same hierarchical category (namely, among the music pieces displayed on the currently displayed music selection screen) to the server 401 via the communication unit 423. Then, the server program 411 of the server 401 sends a so-called "melodious portion" or the most characteristic portion of the corresponding music data to the client 402 based on the received request. Accordingly, the process proceeds to step S37.

If it is determined in step S28 that a user's operation has been input, the client program 421 determines in step S31 whether the user's operation has been performed for selecting a different piece of music, that is, whether the user's operation has been performed for changing the position of the cursor line 452 shown in FIG. 31.

If it is determined in step S31 that the user's operation has been performed for selecting a different piece of music, in step S32, the client program 421 sends a request for the selected music data to the server 401. Then, the server program 411 of the server 401 sends a so-called "melodious portion" or the most characteristic portion of the corresponding music data to the client 402 based on the received request. The process then proceeds to step S37.

If it is determined in step S31 that the user's operation is not for selecting a different piece of music, the client program 421 determines in step S33 whether the user's operation has been performed for designating a zoom-out operation. If it is determined in step S33 that the user's operation has been performed for designating a zoom-out operation, the process returns to step S14, and the subsequent processing is repeated.

If it is determined in step S33 that the user's operation is not for designating a zoom-out operation, the client program 421 determines in step S34 whether the user's operation has been performed for giving an instruction to play back music from the beginning.

If it is determined in step S34 that the user's operation is not for giving an instruction to play back music from the beginning, it means that the user's operation is for changing, for example, the volume or the tone. Accordingly, in step S35, the client program 421 performs processing corresponding to the input operation. The process then returns to step S28, and the subsequent processing is repeated.

If it is determined in step S34 that the user's operation has been performed for giving an instruction to play back music from the beginning, in step S36, the client program 421 sends a request to restart music that is currently played back from the beginning to the server 401 via the communication unit 423. Then, the server program 411 of the server 401 sends the whole music data to the client 402 based on the received request.

After step S30, S32, or S36, in step S37, the communication unit 423 receives music data sent from the server 401, and the client program 421 controls the audio data converter 424 and the audio data output controller. 425 to play back the received music data.

In step S38, the client program 421 displays the music selection screen shown in FIG. 33 while the icon indicating the music data that is currently played back is being selected. Alternatively, the client program 421 displays the music selection screen shown in FIG. 31 or 32 while the thumbnail indicating the music data that is currently played back is displayed. Then, the process returns to step S28, and the subsequent processing is repeated.

According to the processing performed by the client 402 described with reference to FIGS. 34 through 36, the user is able to listen to various pieces of music recorded in the server 401 by performing a simple operation, such as vertically moving the cursor line or performing zoom-out or zoom-in operation, while referring to the GUI screens described with reference to FIGS. 27 through 33. When the user changes the music piece to be played back by vertically moving the cursor line, white noise is inserted into the switching portion of two pieces of music, thereby enabling the user to be naturally aware that music is changed without having an unnatural feeling. Since music is played back, not from the beginning, but from a so-called "melodious portion" or the most characteristic portion, the user can immediately recognize a tune if the user knows it, and even if the user does not know the tune, the user can immediately decide whether the user likes it.

Accordingly, the user of the client 402 is able to listen to music pieces of a desired station or a desired hierarchical category by operating, for example, the remote commander 302 while referring to GUIs. If the remote commander 302 is not used, the user is able to listen to so-called "melodious portion" or the most characteristic portions of various pieces of music like BGM, as in, for example, a television or radio guide program for popular music. The user is also able to listen to music like BGM by randomly switching music pieces by operation the remote commander 302.

If it is adapted that the users of a plurality of clients 402 receive and play back music data recorded in the same server 401, music pieces registered by another user may be played back. Thus, if the user happens to listen to an unknown tune and likes it, the user is able to restart the tune from the beginning.

Figure 38:
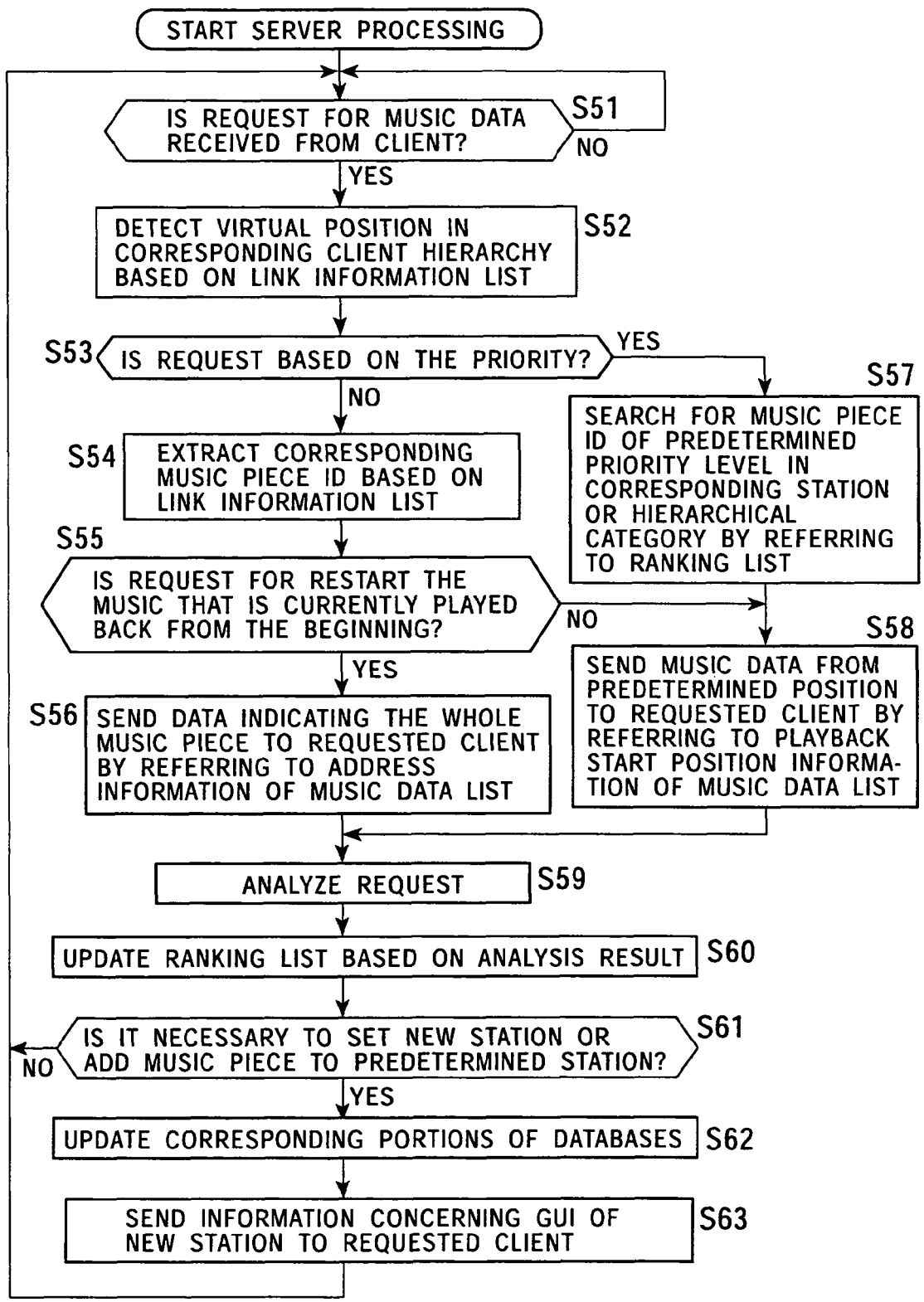
FIG. 38 is a flowchart illustrating the processing by a server.

A description is now given, with reference to the flowchart of FIG. 38, of the processing performed by the server 401, which is concurrently executed with the processing performed by the client 402 described with reference to FIGS. 34 through 36.

Before executing the processing of the server 401 described with reference to FIG. 38, which is concurrently executed with the processing of the client 402, the server program 411 of the server 401 has received the registration of music data, the settings of stations and hierarchical categories, and the setting conditions of new stations from the operation input unit 412.

That is, the server program 411 has registered information required for the music database 415, the link information database 416, and the ranking information database 417 based on an input from the operation input unit 412.

The server program 411 is also able to set new stations based on a request sent from the client 402. A request has been made from the user to the server program 411 so that, for exampled if there are "requests for music pieces to be played back from the beginning three times or more from each client 402 during 7:00 to 9:00' in the morning", a "morning songs" station is newly set, and thereafter, music data satisfying the above condition are registered in the "morning songs" station.

In step S51, the server program 411 determines whether a request for music data has been received from the client 402 based on a signal input from the communication unit 413. If it is determined in step S51 that a request for music data has not been received from the client 402, the processing of step S51 is repeated until it is determined that a request for music data has been received from the client 402.

If it is determined in step S51 that a request for music data has been received from the client 402, in step S52, the server program 411 detects the virtual position of the corresponding music data in the hierarchy of the client 402 that has sent the request based on the request from the client 402 and the link information list registered in the link information database 416.

The server program 411 then determines in step S53 whether the input request has been made based on the priority, i.e., whether the input request has been made when power was supplied, or when the playback operation was finished, or when the station or the hierarchical category was moved.

If it is determined in step S53 that the input request has not been made based on the priority, it means that the request is for music data at the bottommost layer, or the request is for restarting a music piece that is currently played back from the beginning. In this case, in step S54, the server program 411 extracts the music piece ID corresponding to the request based on the link information list registered in the link information database 416.

In step S55, the server program 411 determines whether the input request is for restarting a music piece that is currently played back from the beginning.

If it is determined in step S55 that the input request is for restarting a music piece from the beginning, in step S56, the server program 411 extracts the whole music data based on the music piece ID extracted in step S54 by referring to the address information of the music data list registered in the music database, and sends the whole music data to the client 402 via the communication unit 413.

If it is determined in step S53 that the input request has been made based on the priority, in step S57, the server program 411 searches for the music piece ID having a predetermined priority level (specified in the request) in the corresponding station or the corresponding hierarchical category by referring to the ranking list registered in the ranking information database 417.

If it is determined in step S55 that the input request is not for restarting a music piece from the beginning, or after the processing of step S57, in step S58, the server program 411 extracts music data starting from a predetermined position based on the music piece ID specified in the request or the music piece ID searched in step S57 by referring to the playback start position information of the music data list, and sends the music data to the client 402 via the communication unit 413.

After processing of step S56 or S58, in step S59, the server program 411 analyzes the content of the request received from the client 402. More specifically, the server program 411 extracts information required for updating the link information database 416 or the ranking information database 417, such as the requested music piece ID, the time at which the request was made (or the day of the week or the date), or whether the request is for restarting the music piece from the beginning.

In step S60, the server program 411 updates the ranking list of the ranking information database 417 based on the analysis result obtained in step S59. More specifically, if the request from the client 402 is for restarting the music piece from the beginning, the server program 411 sets the rank of the music data to be a higher level in the ranking list of the ranking information database 417.

In this example, the ranking list is updated according to whether a request has been made for restarting music from the beginning. However, the ranking list may be updated based on another condition.

In step S61, the server program 411 determines whether it is necessary to set a new station or add a music piece to a predetermined station based on the analysis result obtained in step S59. That is, the server program 411 has received from the user a request indicating that, if there are "requests for music pieces to be played back from the beginning three times or more from each client 402 during 7:00 to 9:00 in the morning", a "morning songs" station is newly set, and thereafter, music data satisfying the above condition are registered in the "morning songs" station. Accordingly, the server program 411 determines whether the analysis result in step S59 satisfies a preset condition.

If it is determined in step S61 that it is not necessary to set a new station or add a music piece to a predetermined station, the process returns to step S51, and the subsequent processing is repeated.

If it is determined in step S61 that it is necessary to set a new station or add a music piece to a predetermined station, in step S62, the server program 411 updates the corresponding portions of the link information database 416 and the ranking information database 417.

In step S63, the server program 411 sends information concerning the GUIs of a new station to the client 402 via the communication unit 413 based on the updated content in step S62.

For example, for the client 402 that can display thumbnails 451-1 and 451-2 shown in FIGS. 31 and 32 (for example, the client 402 that can display relatively large GUIs, such as the PDA 11 or the desk-top playback device 13), information indicating the types of thumbnails in a certain station or a certain hierarchical category, or if necessary, image data corresponding to thumbnails, is sent according to the updating content of the databases.

For the client 402 that displays GUIs only by using icons without using thumbnails (for example, the client 402 that can display only relatively small GUIs, such as the cellular telephone 12, the portable playback device 14, or the simplified playback device 15), data indicating the types of icons in a certain station or a certain hierarchical category is sent according to the updating content of the databases.

If the display window 371, such as that shown in FIG. 22, is provided with the simplified playback device 15, it is not necessary to send information concerning GUIs to the corresponding client 402. In this manner data corresponding to a display method for GUIs in the client 402 is sent from the server program 411.

Then, after processing of step S63, the process returns to step S51, and the subsequent processing is repeated.

According to the above-described processing, the server 401 is able to search for music data in response to a request signal from the client 402 and sends the music data. The server 401 is also able to update the link information database 416 and the ranking information database 417 by reflecting favorite information of the users of a plurality of clients 402.

As described above, instead of selecting music data by tracing a hierarchical structure to the bottommost layer (that is, to the level of music data) by performing a zoom-in operation, the user merely changes the station or the hierarchical category. In this case, based on the ranking, which is managed in the server 401, a request for music data is made to the server 401, and the music data is sent from the server 401 to the client 402 and is then played back. That is, while the client 402 is being operated, a certain music piece is always played back. The user is also able to casually listen to melodious portions or characteristic portions of various pieces of music without the need to specify the name of a certain piece, and if the user likes the tune, the user can restart the tune from the beginning. Additionally, by repeating random tuning, the user has an opportunity to listen to unknown pieces of music (for example, music pieces registered by the user of another client 402 for the same server 401).

It has been described that the server 401 and the client 402 send and receive information by wireless communication. However, if the client 402 is placed near the server 401, it may send and receive information to and from the server 401 by wired connection.

It has been described that the client 402 is the PDA 11, the cellular telephone 12, the desk-top playback device 13, the portable playback device 14, or the simplified playback device 15. The client 402 may be any type of device as long as it can send and receive data to and from the server 401 by wired or wireless means and is provided with an operating portion that allows the user to perform tuning, a zoom-out or zoom-in operation, and to give an instruction to play back music data. For example, the client 402 may be a desk-top personal computer, a notebook computer similar to the personal computer 1, a PHS (Personal Handyphone System), or an audio playback device provided with the above-described functions.

Figure 39:
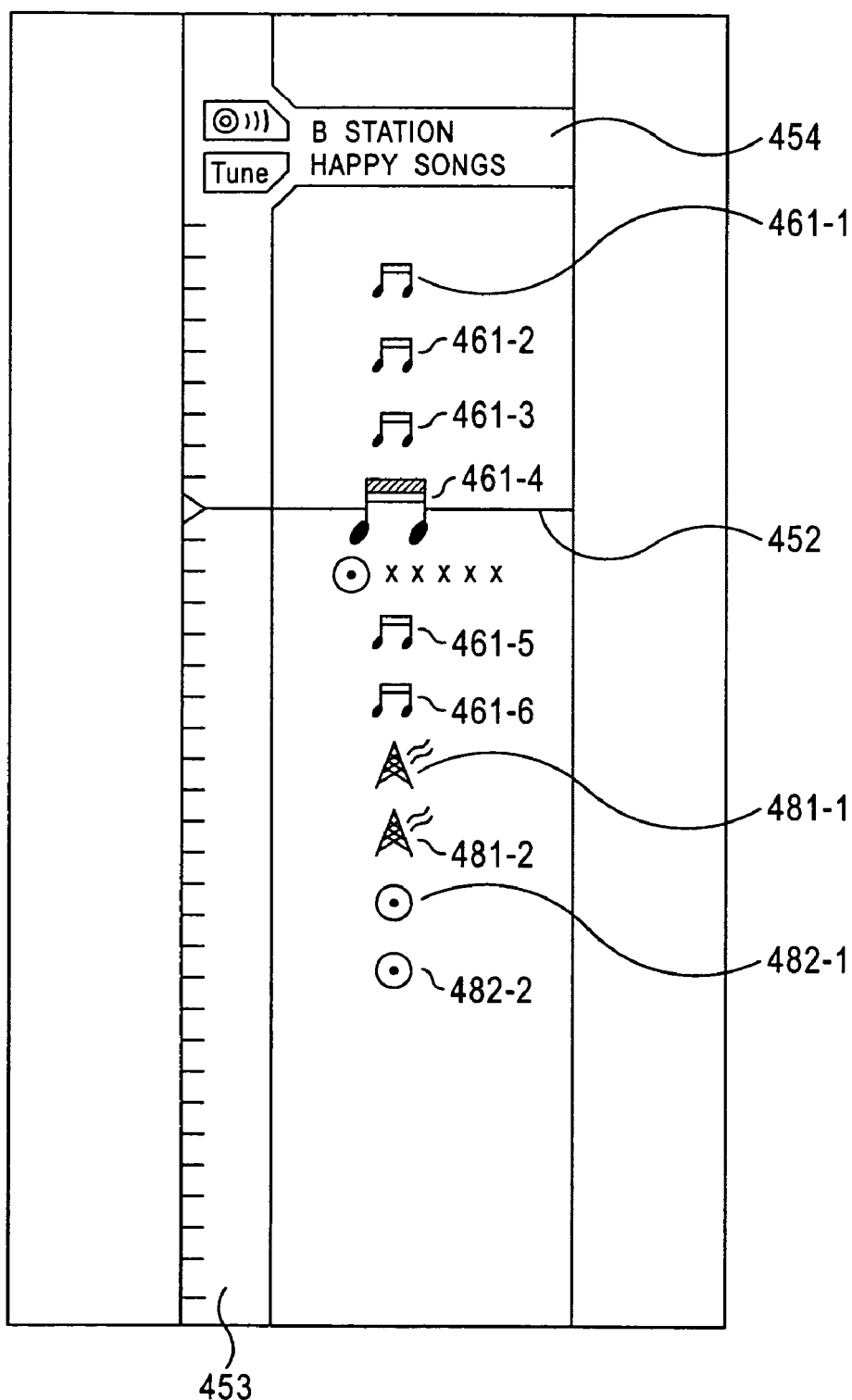
FIG. 39 is a GUI to be displayed.

In the GUI screens shown in FIGS. 27 through 33, only icons or thumbnails in the same rank are displayed in the same level, thereby allowing the user to select one of them. However, as shown in FIG. 39, different icons in different ranks may be displayed in the same display screen.

More specifically, when a zoom-in operation is performed on a certain station to move up to the music data level, icons 481-1 and 481-2 indicating different stations or icons 482-1 and 482-2 indicating different hierarchical categories may be selected in the same level of the icons 461-1 through 461-6 corresponding to the music data.

If different icons in different ranks are displayed in the same GUI display screen, as described with reference to FIG. 39, the user feels as if it is possible to receive programs broadcasted by local radio broadcast stations after precisely performing tuning though the user can initially receive programs broadcasted only by national net radio broadcast stations. Thus, the concept of stations can be developed.

The above-described series of processing can be executed by software. In this case, a software program is installed from a recording medium into a computer built into dedicated hardware or a computer that can perform various functions by installing various programs, for example, a general-purpose computer.

Figure 7:
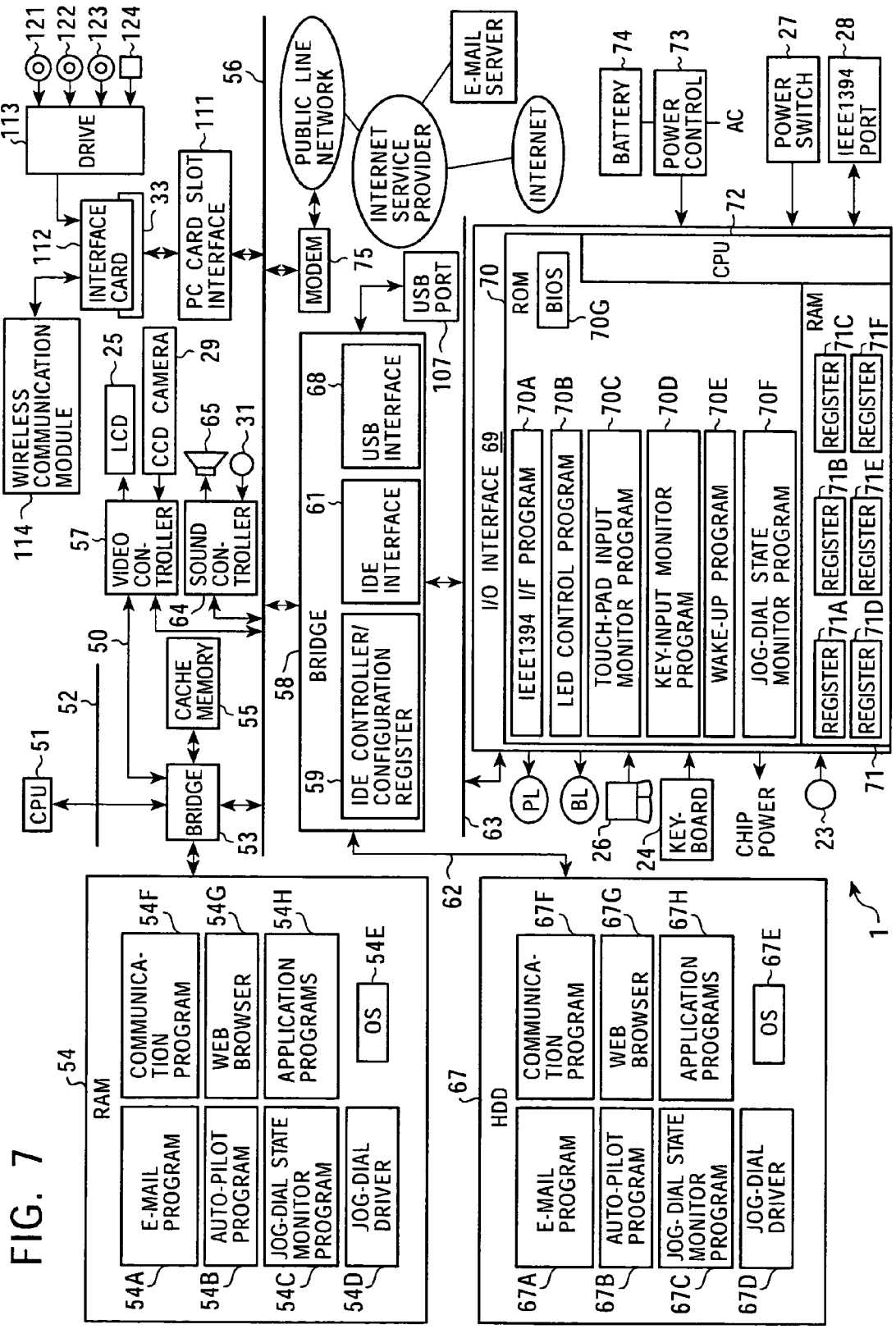
FIG. 7 is a block diagram illustrating an example of the internal configuration of the personal computer shown in FIG. 2.
Figure 11:
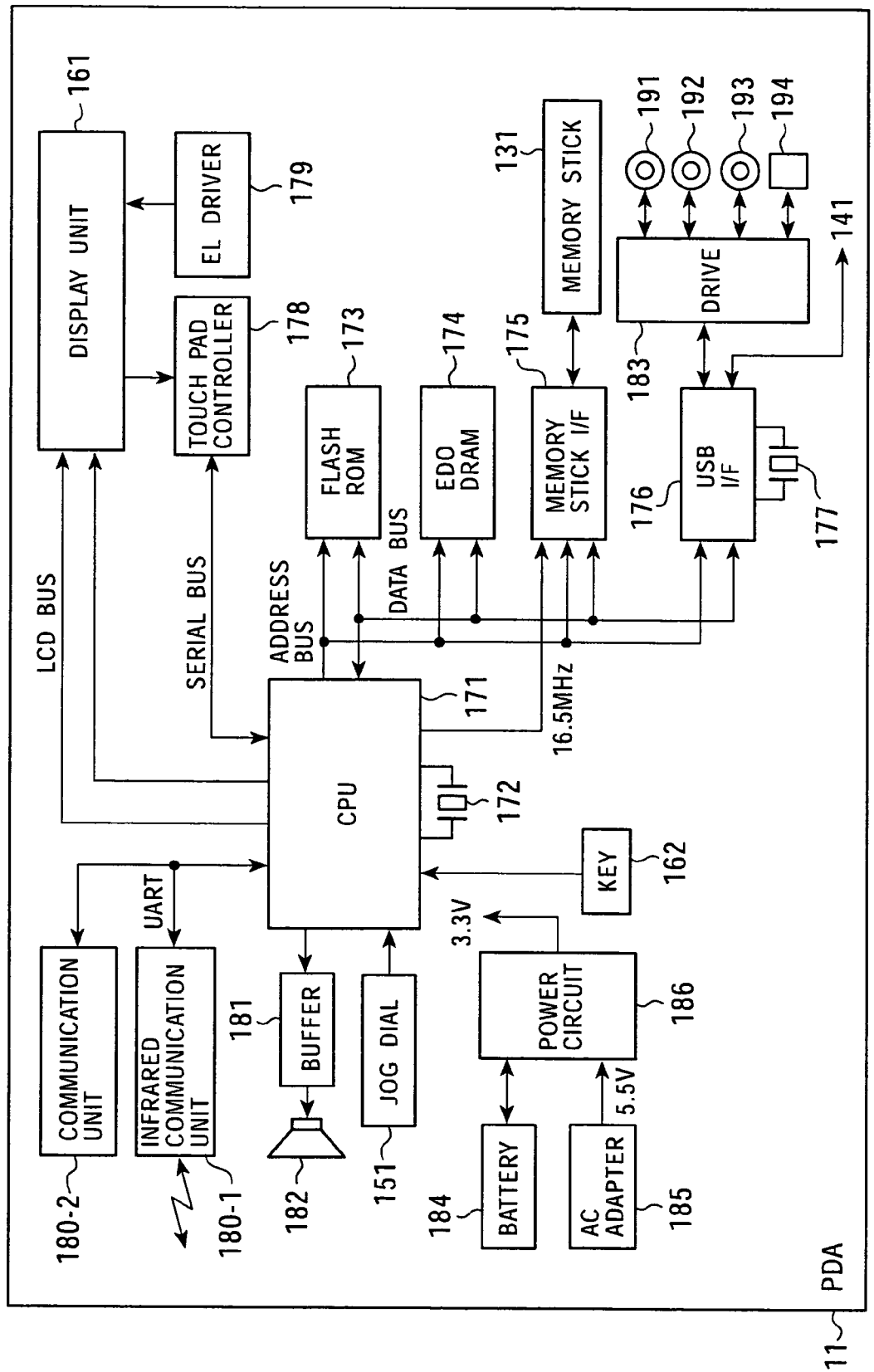
FIG. 11 is a block diagram illustrating the internal configuration of the PDA.

Such a recording medium may include, as shown in FIG. 7, 11, or 16, package media, which are distributed, separately from the computer, for providing the program to the user, and which are formed of the magnetic disk 121, 191, or 321 (including floppy disks), the optical disc 122, 192, or 322 (including CD-ROM (Compact Disk-Read Only Memory) and DVD (Digital Versatile Disk)), the magneto-optical disk 123, 193, or 323 (including MD (Mini-Disk) (tradename)), or the semiconductor memory 124, 194, or 324.

Steps forming the program recorded in a recording medium may be performed in a time-series manner in chronological order described in this specification. Alternatively, they may be performed concurrently or individually.

In the present specification, the system indicates an overall apparatus formed of a plurality of devices.

INDUSTRIAL APPLICABILITY

According to the information processing apparatus, the information processing method, and the program of the present invention, a first operation and a second operation are input from the user, and predetermined data is obtained and is played back based on the operation input by the user. In accordance with a virtual hierarchical structure for classifying the predetermined data, a display screen indicating each hierarchy level and a predetermined mark in the display screen are displayed. While a mark corresponding to the predetermined data which is being played back is being selected, it is displayed in a manner different from other non-selected marks. When the input of the first operation is controlled, the selection of the predetermined mark is changed, and the predetermined data corresponding to the newly selected mark is played back. When the input of the second operation is controlled, a display screen indicating a different hierarchy level is displayed based on the hierarchical structure. Accordingly, the display screen is displayed in accordance with the operation input by the user and the data that is being played back, thereby making it possible to assist the user's input operation.

The invention claimed is:

1. An information processing apparatus comprising:
input means for receiving a first operation and a second operation input by a user;
playback means for obtaining predetermined data to play the predetermined data back based on the operation input by the user from said input means;
display control means for controlling, in correspondence with a virtual hierarchical structure for classifying the predetermined data, a display of a display screen indicating each hierarchy level, and for controlling a display of a predetermined mark in the display screen,
sending means for sending a signal indicating a request to send predetermined data possessed by a different information processing apparatus based on the operation input by the user from said input means; and
receiving means for receiving a predetermined data sent from the different information processing apparatus, wherein
said playback means plays back the predetermined data received by said receiving means,
said display control means controls the display of a display screen indicating each hierarchy level in correspondence with the virtual hierarchical structure for classifying the predetermined data possessed by the different information processing apparatus,
said display control means controls the display of the predetermined mark corresponding to the predetermined data which is played back by said playback means in a manner different from other non-selected marks while the predetermined mark is being selected,
when the first operation is input from said input means, said display control means controls the selection of the predetermined mark to be changed, and said playback means plays back the predetermined data corresponding to the newly selected mark, a portion of said predetermined data that is initially played back is identified by ranking and not by the input means, and
when the second operation is input from said input means, said display control means controls the display of the display screen indicating a different hierarchy level based on the virtual hierarchical structure, wherein
said virtual hierarchical structure does not store predetermined data corresponding to the predetermined mark in a hierarchical structure, but does register the predetermined mark in multiple hierarchical levels.

2. An information processing apparatus according to claim 1, wherein the predetermined mark is an icon.

3. An information processing apparatus according to claim 1, wherein the predetermined mark is a thumbnail of an image corresponding to the predetermined data which is played back by said playback means.

4. An information processing apparatus according to claim 1, wherein said display control means controls only the selected mark to be displayed and the other marks to be unseen.

5. An information processing apparatus according to claim 1, wherein said display control means controls the selected mark to be displayed in an enlarged size.

6. An information processing apparatus according to claim 1, wherein said display control means controls the selected mark to be displayed with an increased level of brightness.

7. An information processing apparatus according to claim 1, wherein the first operation is an operation for designating at least one of a top and a bottom directions in the display screen, or for designating at least one of a left and a right directions in the display screen.

8. An information processing method comprising:
an input control step of controlling an input of a first operation and a second operation by a user;
a playback step of obtaining predetermined data based on the input operation by the user, which is controlled by processing of said input control step; and
a display control step of controlling, in correspondence with a virtual hierarchical structure for classifying the predetermined data, the display of a display screen indicating each hierarchy level, and of controlling the display of a predetermined mark in the display screen,
a sending step of sending a signal indicating a request to send predetermined data possessed by a different information processing apparatus based on the operation input by the user from said input control step; and a receiving step of receiving a predetermined data sent from the different information processing apparatus, wherein said playback step plays back the predetermined data received by said receiving step, said display control step controls the display of a display screen indicating each hierarchy level in correspondence with the virtual hierarchical structure for classifying the predetermined data possessed by the different information processing apparatus, processing of said display control step controls the display of the predetermined mark corresponding to the predetermined data which is played back by processing of said playback step in a manner different from other non-selected marks while the predetermined mark is being selected, when the input of the first operation is controlled by processing of said input control step, processing of said display control step controls the display of the display screen so that the selection of the predetermined mark is changed, and processing of said playback step plays back the predetermined data corresponding to the newly selected mark, a portion of said predetermined data that is initially played back is identified by ranking and not by said input control step, and when the input of the second operation is controlled by processing of said input control step, processing of said display control step controls the display of the display screen indicating a different hierarchy level based on the hierarchical structure, wherein said virtual hierarchical structure does not store predetermined data corresponding to the predetermined mark in a hierarchical structure, but does register the predetermined mark in multiple hierarchical levels.

9. A computer readable tangible storage medium encoded with a computer program configured to cause an information processing apparatus to execute a method, the method comprising:

an input control step of controlling an input of a first operation and a second operation by a user;

a playback step of obtaining predetermined data based on the input operation by the user, which is controlled by processing of said input control step;

a display control step of controlling, in correspondence with a virtual hierarchical structure for classifying the predetermined data, the display of a display screen indicating each hierarchy level, and of controlling the display of a predetermined mark in the display screen, a sending step of sending a signal indicating a request to send predetermined data possessed by a different information processing apparatus based on the operation input by the user from said input control step; and a receiving step of receiving a predetermined data sent from the different information processing apparatus, wherein said playback step plays back the predetermined data received by said receiving step, said display control step controls the display of a display screen indicating each hierarchy level in correspondence with the virtual hierarchical structure for classifying the predetermined data possessed by the different information processing apparatus, processing of said display control step controls the display of the predetermined mark corresponding to the predetermined data which is played back by processing of said playback step in a manner different from other non-selected marks while the predetermined mark is being selected, when the input of the first operation is controlled by processing of said input control step, processing of said display control step controls the display of the display screen so that the selection of the predetermined mark is changed, and processing of said playback step plays back the predetermined data corresponding to the newly selected mark, a portion of said predetermined data that is initially played back is identified by ranking and not by said input control step, and when the input of the second operation is controlled by processing of said input control step, processing of said display control step controls the display of the display screen indicating a different hierarchy level based on the hierarchical structure, wherein said virtual hierarchical structure does not store predetermined data corresponding to the predetermined mark in a hierarchical structure, but does register the predetermined mark in multiple hierarchical levels.

10. An information processing apparatus comprising:

an input configured to receive a first operation and a second operation input by a user;

a playback unit configured to obtain predetermined data and play back said data based on the operation input by the user from said input;

a display control unit configured to control, in correspondence with a virtual hierarchical structure for classifying the predetermined data, a display of a display screen indicating each hierarchy level, and to control a display of a predetermined mark in the display screen, a sending unit configured to send a signal indicating a request to send predetermined data possessed by a different information processing apparatus based on the operation input by the user from said input unit; and a receiving unit configured to receive a predetermined data sent from the different information processing apparatus, wherein said playback unit is configured to play back the predetermined data received by said receiving unit, said display control unit is further configured to control the display of a display screen indicating each hierarchy level in correspondence with the virtual hierarchical structure for classifying the predetermined data possessed by the different information processing apparatus, said display control unit is further configured to control the display of the predetermined mark corresponding to the predetermined data which is played back by said playback unit in a manner different from other non-selected marks while the predetermined mark is being selected, when the first operation is input from said input, said display control unit is further configured to control the selection of the predetermined mark to be changed, and said playback unit is configured to play back the predetermined data corresponding to the newly selected mark, a portion of said predetermined data that is initially played back is identified by ranking and not by said input, and when the second operation is input from said input, said display control unit is further configured to control the display of the display screen indicating a different hierarchy level based on the virtual hierarchical structure, wherein said virtual hierarchical structure does not store predetermined data corresponding to the predetermined mark in a hierarchical structure, but does register the predetermined mark in multiple hierarchical levels.

11. An information processing apparatus according to claim 10, wherein the predetermined mark is an icon.

12. An information processing apparatus according to claim 10, wherein the predetermined mark is a thumbnail of an image corresponding to the predetermined data which is played back by said playback unit.

13. An information processing apparatus according to claim 10, wherein said display control unit is configured to control only the selected mark to be displayed and the other marks to be unseen.

14. An information processing apparatus according to claim 10, wherein said display control unit is further configured to control the selected mark to be displayed in an enlarged size.

15. An information processing apparatus according to claim 10, wherein said display control unit is further configured to control the selected mark to be displayed with an increased level of brightness.

16. An information processing apparatus according to claim 10, wherein the first operation is an operation for designating one of a top and a bottom directions in the display screen, or for designating one of a left and a right directions in the display screen.

* * * * *